(12) United States Patent  (10) Patent No.: US 7,672,952 B2
Isaacson et al.  (45) Date of Patent: Mar. 2, 2010

(54) SYSTEM AND METHOD OF SEMANTIC CORRELATION OF RICH CONTENT

(75) Inventors: Scott Isaacson, Woodland Hills, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 201 days.

(21) Appl. No.: 11/616,154

(22) Filed: Dec. 26, 2006

(65) Prior Publication Data

US 2007/0106651 A1  May 10, 2007

Related U.S. Application Data

(63) Continuation-in-part of application No. 11/563,659, filed on Nov. 27, 2006, and a continuation-in-part of application No. 11/554,476, filed on Oct. 30, 2006, now Pat. No. 7,562,011, which is a continuation-in-part of application No. 11/468,684, filed on Aug. 30, 2006, now abandoned, and a continuation-in-part of application No. 09/691,629, filed on Oct. 18, 2000, now Pat. No. 7,389,225, which is a continuation of application No. 09/653,713, filed on Sep. 5, 2000, now Pat. No. 7,286,977, which is a continuation of application No. 09/615,726, filed on Jul. 13, 2000, now Pat. No. 7,197,451.

(51) Int. Cl.
 *G06F 7/00*  (2006.01)
 *G06F 17/30*  (2006.01)

(52) U.S. Cl. ........................................................ 707/10
(58) Field of Classification Search ...................... None
 See application file for complete search history.

(56) References Cited

U.S. PATENT DOCUMENTS

| 5,276,677 | A | 1/1994 | Ramamurthy et al. |
| 5,278,980 | A | 1/1994 | Pedersen et al. |
| 5,317,507 | A | 5/1994 | Gallant |
| 5,325,298 | A | 6/1994 | Gallant |
| 5,325,444 | A | 6/1994 | Cass et al. |

(Continued)

OTHER PUBLICATIONS

Onyshkevych, et al., "A Lexicon for Knowledge-Based MT", pp. 1-49.

(Continued)

*Primary Examiner*—Mohammad Ali
*Assistant Examiner*—Alexey Shmatov
(74) *Attorney, Agent, or Firm*—Marger Johnson & McCollom PC

(57) ABSTRACT

Content of interest to a user is identified. A first semantic abstract is generated for the content of interest using a state vector representation of the content of interest. The first semantic abstract is compared to a second semantic abstract representing another prospective content. If the first semantic abstract is within a threshold distance of the second semantic abstract, then the prospective content is recommended to the user.

27 Claims, 38 Drawing Sheets

U.S. PATENT DOCUMENTS

| | | | |
|---|---|---|---|
| 5,390,281 | A | 2/1995 | Luciw et al. |
| 5,499,371 | A | 3/1996 | Henninger et al. |
| 5,524,065 | A | 6/1996 | Yagasaki |
| 5,539,841 | A | 7/1996 | Huttenlocher et al. |
| 5,551,049 | A | 8/1996 | Kaplan et al. |
| 5,619,709 | A | 4/1997 | Caid et al. |
| 5,675,819 | A | 10/1997 | Schuetze |
| 5,694,523 | A | 12/1997 | Wical |
| 5,696,962 | A | 12/1997 | Kupiec |
| 5,708,825 | A | 1/1998 | Sotomayor |
| 5,710,834 | A | 1/1998 | Rhoads |
| 5,721,897 | A | 2/1998 | Rubinstein |
| 5,778,362 | A | 7/1998 | Deerwester |
| 5,778,378 | A | 7/1998 | Rubin |
| 5,778,397 | A | 7/1998 | Kupiec et al. |
| 5,794,178 | A | 8/1998 | Caid et al. |
| 5,799,276 | A | 8/1998 | Komissarchik et al. |
| 5,821,945 | A | 10/1998 | Yeo et al. |
| 5,822,731 | A | 10/1998 | Schultz |
| 5,832,119 | A | 11/1998 | Rhoads |
| 5,832,470 | A | 11/1998 | Morita et al. |
| 5,841,978 | A | 11/1998 | Rhoads |
| 5,867,799 | A | 2/1999 | Lang et al. |
| 5,873,056 | A | 2/1999 | Liddy et al. |
| 5,873,079 | A | 2/1999 | Davis, III et al. |
| 5,929,849 | A | 7/1999 | Kikinis |
| 5,934,910 | A | 8/1999 | Ho et al. |
| 5,937,400 | A | 8/1999 | Au |
| 5,940,821 | A | 8/1999 | Wical |
| 5,963,965 | A | 10/1999 | Vogel |
| 5,966,686 | A | 10/1999 | Heidorn et al. |
| 5,970,490 | A | 10/1999 | Morgenstern |
| 5,974,412 | A | 10/1999 | Hazlehurst et al. |
| 5,991,713 | A | 11/1999 | Unger et al. |
| 5,991,756 | A | 11/1999 | Wu |
| 6,006,221 | A | 12/1999 | Liddy et al. |
| 6,009,418 | A | 12/1999 | Cooper |
| 6,015,044 | A | 1/2000 | Peterson |
| 6,061,719 | A | 5/2000 | Bendinelli et al. |
| 6,078,953 | A | 6/2000 | Vaid et al. |
| 6,085,201 | A | 7/2000 | Tso |
| 6,097,697 | A | 8/2000 | Yao et al. |
| 6,105,044 | A | 8/2000 | DeRose et al. |
| 6,108,619 | A | 8/2000 | Carter et al. |
| 6,122,403 | A | 9/2000 | Rhoads |
| 6,122,628 | A | 9/2000 | Castelli |
| 6,134,532 | A * | 10/2000 | Lazarus et al. ............ 705/14 |
| 6,141,010 | A * | 10/2000 | Hoyle ...................... 715/854 |
| 6,166,780 | A | 12/2000 | Bray |
| 6,173,261 | B1 | 1/2001 | Arai et al. |
| 6,205,456 | B1 | 3/2001 | Nakao |
| 6,269,362 | B1 | 7/2001 | Broder et al. |
| 6,286,036 | B1 | 9/2001 | Rhoads |
| 6,289,353 | B1 | 9/2001 | Hazlehurst et al. |
| 6,295,533 | B2 | 9/2001 | Cohen |
| 6,297,824 | B1 | 10/2001 | Hearst et al. |
| 6,311,194 | B1 | 10/2001 | Sheth et al. |
| 6,311,214 | B1 | 10/2001 | Rhoads |
| 6,317,708 | B1 | 11/2001 | Witbrock et al. |
| 6,317,709 | B1 | 11/2001 | Zack |
| 6,324,573 | B1 | 11/2001 | Rhoads |
| 6,343,138 | B1 | 1/2002 | Rhoads |
| 6,356,864 | B1 | 3/2002 | Foltz et al. |
| 6,363,378 | B1 | 3/2002 | Conklin et al. |
| 6,366,680 | B1 | 4/2002 | Brunk et al. |
| 6,408,331 | B1 | 6/2002 | Rhoads |
| 6,411,725 | B1 | 6/2002 | Rhoads |
| 6,415,282 | B1 | 7/2002 | Mukherjea et al. |
| 6,421,070 | B1 | 7/2002 | Ramos et al. |
| 6,446,061 | B1 | 9/2002 | Doerre et al. |
| 6,446,099 | B1 * | 9/2002 | Peairs ...................... 715/210 |
| 6,459,809 | B1 | 10/2002 | Jensen et al. |
| 6,470,307 | B1 | 10/2002 | Turney |
| 6,493,663 | B1 | 12/2002 | Ueda |
| 6,505,160 | B1 | 1/2003 | Levy et al. |
| 6,513,031 | B1 | 1/2003 | Fries et al. |
| 6,523,026 | B1 | 2/2003 | Gillis |
| 6,553,129 | B1 | 4/2003 | Rhoads |
| 6,606,620 | B1 | 8/2003 | Sundaresan et al. |
| 6,614,914 | B1 | 9/2003 | Rhoads et al. |
| 6,615,208 | B1 | 9/2003 | Behrens et al. |
| 6,615,209 | B1 | 9/2003 | Gomes et al. |
| 6,654,480 | B2 | 11/2003 | Rhoads |
| 6,675,159 | B1 | 1/2004 | Lin et al. |
| 6,681,028 | B2 | 1/2004 | Rodriguez et al. |
| 6,694,043 | B2 | 2/2004 | Seder et al. |
| 6,754,873 | B1 | 6/2004 | Law et al. |
| 6,775,392 | B1 | 8/2004 | Rhoads |
| 6,829,368 | B2 | 12/2004 | Meyer et al. |
| 6,867,818 | B2 | 3/2005 | Bray |
| 6,944,298 | B1 | 9/2005 | Rhoads |
| 6,959,100 | B2 | 10/2005 | Rhoads |
| 6,959,386 | B2 | 10/2005 | Rhoads |
| 6,965,682 | B1 | 11/2005 | Davis et al. |
| 6,972,802 | B2 | 12/2005 | Bray |
| 6,975,746 | B2 | 12/2005 | Davis et al. |
| 6,983,051 | B1 | 1/2006 | Rhoads |
| 6,985,600 | B2 | 1/2006 | Rhoads et al. |
| 7,010,144 | B1 | 3/2006 | Davis et al. |
| 7,024,016 | B2 | 4/2006 | Rhoads et al. |
| 7,044,395 | B1 | 5/2006 | Davis et al. |
| 7,058,697 | B2 | 6/2006 | Rhoads |
| 7,076,084 | B2 | 7/2006 | Davis et al. |
| 7,095,871 | B2 | 8/2006 | Jones et al. |
| 7,098,931 | B2 | 8/2006 | Patterson et al. |
| 7,111,170 | B2 | 9/2006 | Hein et al. |
| 7,113,596 | B2 | 9/2006 | Rhoads |
| 7,113,615 | B2 | 9/2006 | Rhoads et al. |
| 7,130,087 | B2 | 10/2006 | Rhoads |
| 7,136,502 | B2 | 11/2006 | Rhoads et al. |
| 7,171,018 | B2 | 1/2007 | Rhoads et al. |
| 7,177,443 | B2 | 2/2007 | Rhoads |
| 7,181,022 | B2 | 2/2007 | Rhoads |
| 7,184,570 | B2 | 2/2007 | Rhoads |
| 7,184,572 | B2 | 2/2007 | Rhoads et al. |
| 7,185,201 | B2 | 2/2007 | Rhoads et al. |
| 7,194,754 | B2 | 3/2007 | Tomsen et al. |
| 7,206,820 | B1 | 4/2007 | Rhoads et al. |
| 7,209,571 | B2 | 4/2007 | Davis et al. |
| 7,224,819 | B2 | 5/2007 | Levy et al. |
| 7,224,995 | B2 | 5/2007 | Rhoads |
| 7,239,734 | B2 | 7/2007 | Alattar et al. |
| 7,242,790 | B2 | 7/2007 | Rhoads |
| 7,246,239 | B2 | 7/2007 | Rodriguez et al. |
| 7,248,717 | B2 | 7/2007 | Rhoads |
| 7,254,249 | B2 | 8/2007 | Rhoads et al. |
| 7,263,203 | B2 | 8/2007 | Rhoads et al. |
| 2002/0042920 | A1 | 4/2002 | Thomas et al. |
| 2004/0210942 | A1 | 10/2004 | Lemmons |
| 2005/0183133 | A1 | 8/2005 | Kelly |

OTHER PUBLICATIONS

Mahesh, "Ontology Development for Machine Translation: Ideology and Method", Computing Research Laboratory, New Mexico State University, 87 pages.

Hutson, et al., "Applications of Functional Analysis and Operator Theory", 1980, table of contents, preface, and index.

Chakrabarti, S., et al., "Hypersearching the Web", Scientific American, Jun. 1999, pp. 54-60.

Bartell, et al. "Latent Semantic Indexing is an Optimal Special Case of Multidimensional Scaling", Department of Computer Science and Engineering, University of California, San Diego, 1992, pp. 161-167, ACM 0-89791-524-0.

Chomsky, "Language and Thought", 1993, pp. 18-19, 22-27, 44-45, and 60-61.
Chomsky, "The Minimalist Program", 1995, pp. 13-127.
Cook, et al., "Chomsky's Universal Grammar—An Introduction", 1988, pp. 40-74 and 131-272.
Culler, "Ferdinand de Saussure—Revised Edition", 1986, pp. 38-57.
Eco, et al. "Meaning and Mental Representations" 1988, p. 221.
Eco, "Semiotics and the Philosophy of Language" 1984, pp. 46-87.
Edwards, "Functional Analysis: Theory and Applications", 1965, pp. 10-13, 32-33, 50-53, 62-65, 88-103, 174-203, and 224-233.
Halmos, "Naive Set Theory", Undergraduate Texts in Mathematics, 1968, pp. 56-57 and 66-69.
Hocking, "Topology", 1961, pp. 6-7, 56-59 and 68-71.
Kahn, "Topology: An Introduction to the Point-Set and Algebraic Areas", 1975, pp. 10-15.
Khare, et al. "Capturing the State of Distributed Systems with XML", Oct. 26, 1997, pp. 1-12.
Lundquist, et al., "Improving Relevance Feedback in the Vector Space Model", 1997, pp. 16-23, ACM 0-89791-970-X.
Mostafa, et al. "A Multilevel Approach to Intelligent Information Filtering: Model, System, and Evaluation", ACM Transactions on Information Systems, vol. 15, No. 4, Oct. 1997, pp. 368-399.
Pesetsky, "Zero Syntax: Experiencers and Cascades", 1995, pp. 1-122.
Pejtersen, "Semantic Information Retrieval", Communications of the ACM, vol. 41, No. 5, Apr. 1998, pp. 90-92.
"Platform for Internet Content Selection (PICS)", http://www.w3.org, pp. 1-8, Jan. 3, 1998.
Singh, "Unifying Heterogeneous Information Models", Tesserae Information Systems, Inc., http://citeseer.ist.psu.edu.com, pp. 1-13.
Smith, "Computers and Human Language", 1991, pp. 204-257.
"WordNet—A Lexical Database for the English Language", Cognitive Science Laboratory, Princeton University, http://www.cogsci.princeton.edu, 2 pages, Feb. 10, 2000.
"Method and apparatus for semantic characterization of general content streams and repositories", U.S. Appl. No. 09/109,084, filed Jul. 2, 1998 (now U.S. Patent No. 6,108,619).
"CANDID Executive Summary"; Nov. 19, 1998; pp. 1-4.
"Methodology"; 1997; pp. 1-5.
Chu et al., "Knowledge-Based image retrieval with spatial and temporal constructs"; IEEE; Nov. 1998; pp. 872-888.
Deng, "Ne Tra-V: Toward on object based video representation"; IEEE; Sep. 1998; pp. 616-627.
EPIC Report, "Faulty Filters: How content filters block access to kid-friendly information on the internet"; 1997; pp. 1-8.
Faudemay et al., "Intelligent delivery of personalized video programmes from a video database"; IEEE; 1997; pp. 172-177.
Geiger et al., "Dynamic programming for detecting, tracking, and matching deformable contours"; 1995; pp. 294-302.
Gudivada et al., "Design and evaluation of algorithms for image retrieval by spatial similarity"; 1995; pp. 116-144.
Han et al., "Image organization and retrieval with automatically constructed feature vectors"; 1996.
Hsu et al., "A Knowledge-Based Approach for retrieving images by content", IEEE; Aug. 1996; pp. 522-532.
"Intelligent Collaboration & Visualization"; pp. 1-16.
Jain et al., "Object matching using deformable templates"; IEEE; 1996; pp. 267-278.
Kupeev et al., "On shape similarity"; IEEE; 1994; pp. 227-231.
Liu et al., "Partial shape classification using contour matching in distance transformation"; IEEE; Nov. 1990; pp. 1072-1080.
Mehrotra et al., "Feature based retrieval of similar shapes"; IEEE; 1993; pp. 108-115.
Mehrotra et al., "Similar-shape retrieval in shape data management"; IEEE; 1995; pp. 57-62.
Meier et al., "Segmentation and tracking of moving objects for content-based video coding"; IEEE; Jun. 1999; pp. 144-150.
Mostafa et al., "A Multilevel Approach to Intelligent Information Filtering: Model. System, and Evaluation"; ACM Transactions on Information Systems, vol. 15, No. 4; Oct. 1997; pp. 368-399.
Nes et al., "Region-based indexing in an image database"; 1997; pp. 1-9.
Ozer et al., "A graph based object description for information retrieval in digital image and video libraries"; IEEE; Jun. 22, 1999; pp. 1-4.
Ravela et al., "Retrieving images by similarity of visual appearance", IEEE; 1997; pp. 67-74.
Saber et al., "Integration of color, shape and texture for image annotation and retrieval"; IEEE; 1996; pp. 851-854.
Smith, et al., "Searching for images and videos on the world-wide web", 1996; pp. 1-20.
Vapillon et al., "Analyzing and filtering contour deformation"; IEEE; 1998; pp. 267-271.
Wired News, "SurfWatch Allowed Key Patent"; Nov. 16, 1998, pp. 1-3.
Yang et al., "A similarity measure of deformable shapes"; IEEE; 1997; pp. 1455-1459.
"What is TVGuardian?", http://tvguardian.com/ghsell.php, Aug. 28, 2007, 1 page.
"Learn More about TVGuardian", http://tvguardian.com/gshell.php?page=LEARN&PHPSESSID=3D0, Aug. 28, 2007, 2 pages.

* cited by examiner

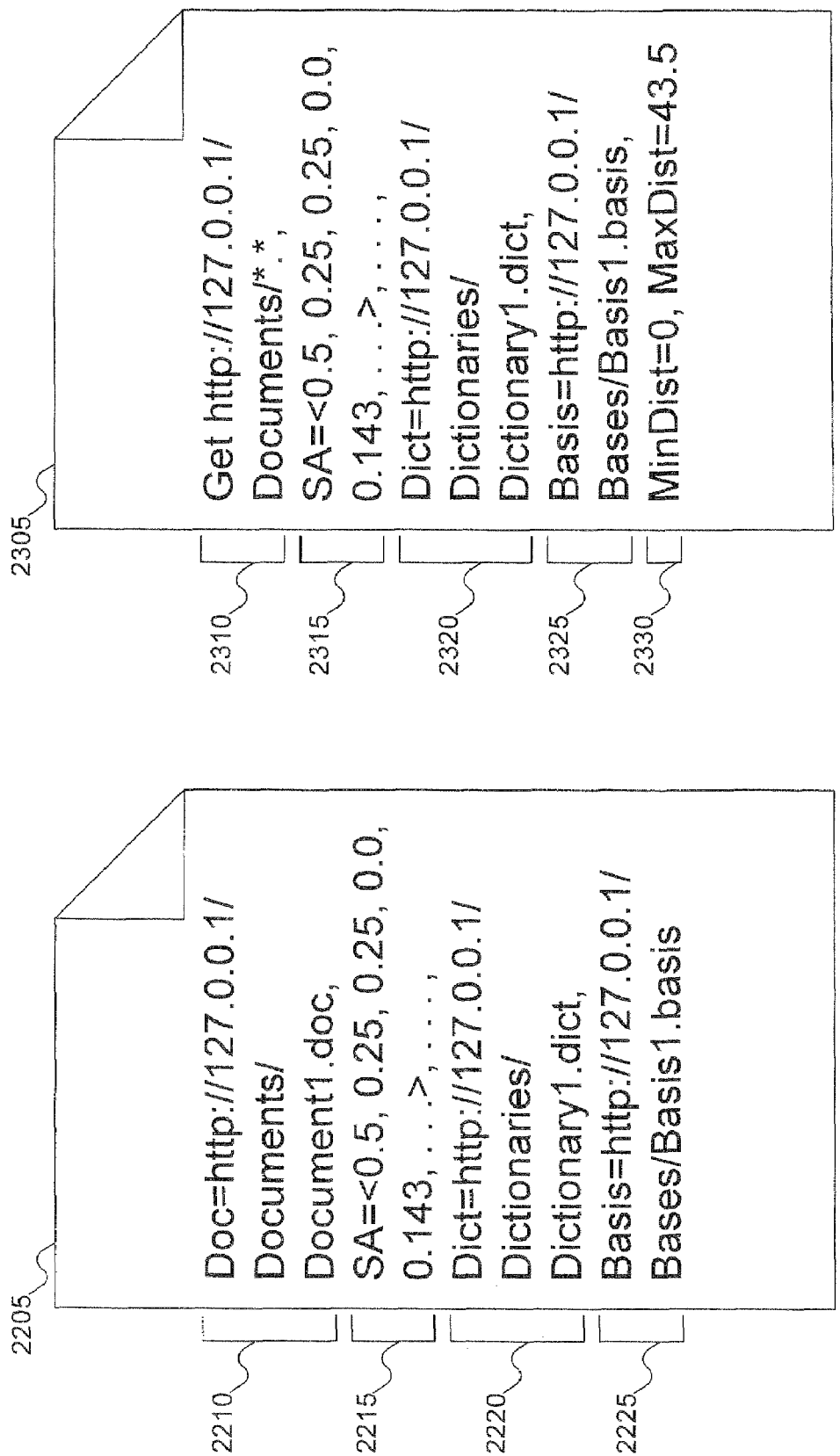

SYSTEM AND METHOD OF SEMANTIC CORRELATION OF RICH CONTENT

RELATED APPLICATION DATA

This application is a continuation-in-part of commonly assigned co-pending U.S. patent application Ser. No. 11/468,684, titled "WEB-ENHANCED TELEVISION EXPERIENCE", filed Aug. 30, 2006, incorporated by reference herein.

This application is also a continuation-in-part of commonly assigned co-pending U.S. patent application Ser. No. 11/563,659, titled, "A METHOD AND MECHANISM FOR THE CREATION, MAINTENANCE, AND COMPARISON OF SEMANTIC ABSTRACTS," filed Nov. 27, 2006, which is a continuation of U.S. patent application Ser. No. 09/615,726, titled "A METHOD AND MECHANISM FOR THE CREATION, MAINTENANCE, AND COMPARISON OF SEMANTIC ABSTRACTS," filed Jul. 13, 2000, incorporated by reference herein.

This application is also a continuation-in-part of commonly assigned co-pending U.S. patent application Ser. No. 09/691,629, titled "METHOD AND MECHANISM FOR SUPERPOSITIONING STATE VECTORS IN A SEMANTIC ABSTRACT" filed Oct. 18, 2000, incorporated by reference herein.

This application is also a continuation-in-part of co-pending U.S. patent application Ser. No. 11/554,476, titled "INTENTIONAL-STANCE CHARACTERIZATION OF A GENERAL CONTENT STREAM OF REPOSITORY", filed Oct. 30, 2006, which is a continuation of U.S. patent application Ser. No. 09/653,713, titled "INTENTIONAL-STANCE CHARACTERIZATION OF A GENERAL CONTENT STREAM OF REPOSITORY", filed Sep. 5, 2000, incorporated by reference herein.

This application is related to commonly assigned U.S. Pat. No. 6,108,619, titled "METHOD AND APPARATUS FOR SEMANTIC CHARACTERIZATION," issued Aug. 22, 2000. This application is also related to commonly assigned co-pending U.S. patent application Ser. No. 11/562,337, titled "CONSTRUCTION, MANIPULATION, AND COMPARISON OF A MULTI-DIMENSIONAL SEMANTIC SPACE" filed Nov. 21, 2006, and incorporated by reference herein, which is a continuation of U.S. Pat. No. 7,152,031, titled "CONSTRUCTION, MANIPULATION, AND COMPARISON OF A MULTI-DIMENSIONAL SEMANTIC SPACE," issued Dec. 19, 2006.

FIELD OF THE INVENTION

The invention pertains to recommending content to a user, and more particularly to recommending content that is semantically similar to a first content of interest to a user.

BACKGROUND OF THE INVENTION

In the past, the television (TV) experience was simply that of a TV set receiving a broadcast over the airwaves and presenting the broadcast to viewers. Today, television has evolved. Cable and satellite transmission have dramatically increased the number of broadcast channels. In addition, televisions are often connected to video cassette recorders (VCRs), digital video recorders (DVRs), or other such devices that enable users to record TV programs and play them back at other times.

Television is frequently thought of as a source of entertainment. But television is also used to provide information. Even programs that are primarily designed to entertain can also include informative segments. For example, even though a sitcom is intended for entertainment, serious topics can be addressed in a sitcom. After raising the topic in the sitcom, a public service announcement can direct viewers to an organization to get involved or find out more information. Information is also presented on TV in the form of news programs. Finally, advertisements that occur during program breaks also present information to the viewer.

The information that is presented in a TV broadcast is limited by constraints of the format. For each channel of broadcast, the television limits what kind of data can be presented to the viewer to visual and auditory data. More and more, programmers and advertisers are supplementing the information that is broadcast over television by directing viewers to an Internet website for more information. For example, a TV advertiser might refer viewers to a website for information about a special offer. Or a TV show might itself have an associated website where viewers can find out more about characters on the show or even participate in a contest. It is the job of the viewer to then note the website, and at their convenience visit the website for more information. But by the time the viewer is finished watching the TV broadcast, the viewer has likely forgotten all about the website.

In addition, a TV broadcast might have a related web page, without referring to the web page in the TV broadcast. In this case, the user is likely unaware of the related web page. The user might also be unaware of other available content that is related, or similar, to a TV broadcast. Even though the user would like to see related information, the user cannot see the related content if the user does not know how to identify the related content.

Accordingly, a need exists to be able to identify and recommend a content that is semantically similar to another content of interest to a user.

SUMMARY OF THE INVENTION

Content of interest to a user is identified. A first semantic abstract is generated for the content of interest using a state vector representation of the content of interest. The first semantic abstract is compared to a second semantic abstract representing another prospective content. If the first semantic abstract is within a threshold distance of the second semantic abstract, then the prospective content is recommended to the user.

The foregoing and other features, objects, and advantages of the invention will become more readily apparent from the following detailed description, which proceeds with reference to the accompanying drawings.

BRIEF DESCRIPTION OF THE DRAWINGS

FIG. 22 shows a saved semantic abstract for a document according to the preferred embodiment.

FIG. 23 shows a document search request according to the preferred embodiment.

DETAILED DESCRIPTION OF THE PREFERRED EMBODIMENT

Commonly assigned co-pending U.S. patent application Ser. No.11/468,684, titled "WEB-ENHANCED TELEVISION EXPERIENCE", filed Aug. 30, 2006, and incorporated by reference herein, describes monitoring a television or other content to identify text such as a URL. By identifying a content's text, a semantic abstract of the content can be created. Commonly assigned co-pending U.S. patent application Ser. No. 11/563,659, titled "A METHOD AND MECHANISM FOR THE CREATION, MAINTENANCE, AND COMPARISON OF SEMANTIC ABSTRACTS," filed Nov. 27, 2006, incorporated by reference herein, and referred to as "the Semantic Abstract application", describes creating a semantic abstract for a document. If a user is interested in receiving a second content similar to a first content, once a semantic abstract is created for the first content, that semantic abstract can be used to identify a second content that has a similar semantic abstract.

Figure 1:
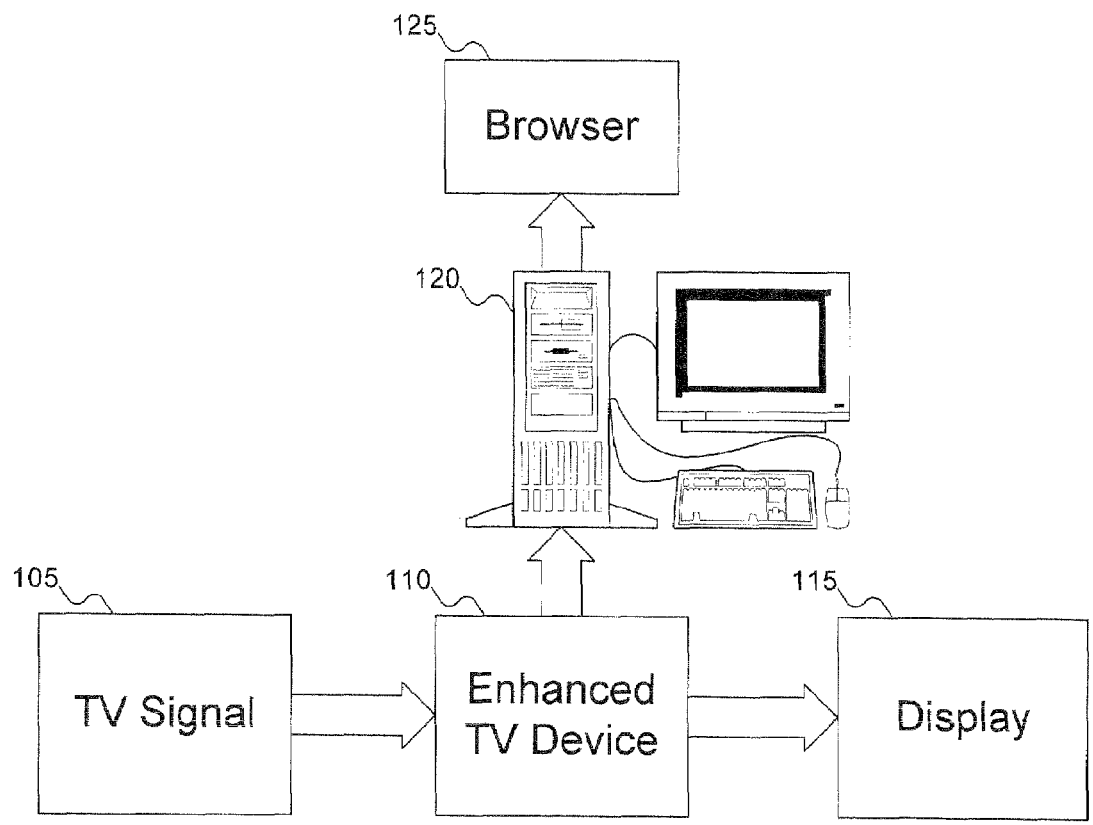
FIG. 1 shows a system including an enhanced TV device connected to a computer with a web browser, the enhanced TV device to detect a URL from a broadcast TV signal, according to an embodiment of the invention.

FIG. 1 shows a system including an enhanced television (TV) device connected to a computer with a web browser, the enhanced TV device to detect a uniform resource locator (URL) from a broadcast TV signal, according to an embodiment of the invention. As TV programmers try to incorporate new ways for advertisers to reach viewers, one technique advertisers use is to include a URL in the TV broadcast that directs users to a website where the user can get more information than is feasible to be broadcast over TV signal 105. In addition, using the Internet to deliver content allows the user to view the amount of content that the user considers valuable. Some users might want to see high level information at a single website, while others could spend hours following different links available from URL included in TV signal 105.

The URLs that are presented in TV signal 105 could be promotional URLs that inform TV viewers of a sale on an advertised product. Or a URL could be a link to a website for a particular program that is broadcast, where a fan of the program can see additional information about the program, such as behind the scenes footage, participate in chat about the program, etc. Television viewers that are not expecting a URL might not be able to write down or remember the name of a particular website. Also, the viewer might forget to look up the URL in the future. In addition, as digital video recorders become more popular, advertisers and television stations are concerned that viewers are skipping the advertisements. As a result, some advertisers are creating incentives for viewers to watch their commercials in slow motion, to see "hidden" features of the commercial, such as a promotional item that is obtained by visiting a particular website. While a viewer might prefer to fast forward through a commercial, the same viewer might also like to be able to refer to any supplemental information that is accessed at a website as identified by a URL.

By detecting the URLs that are in TV signal 105 and loading the URLs in a web browser, users do not have to pay such close attention to the broadcast to identify the URL in the first place. Even if a user happens to notice a URL that the user might be interested in following up with, by the time the user is finished watching the program, the user might have forgotten about the URL. If the URL is loaded in a user's browser, then the user is automatically reminded about the web content, because the content is already loaded on the user's computer.

Enhanced TV device 110 receives TV signal 105. TV signal 105 can be any type of content stream for televised display. For example, TV signal 105 can originate from TV transmitters, satellite, and recorded video (both digital and analog). Enhanced TV device 110 then routes TV signal 105 to display 115. Display 115 can be any display capable of presenting the content in TV signal 105 to a viewer. For example, display 115 can be a traditional television set, a computer monitor, a flat panel display, a portable display, a high definition display, a liquid crystal display, etc. Display 115 typically presents the audio and visual components of TV signal 105 to the viewer. In addition, other components of TV signal 105 can be accessed by the viewer. For example, TV signal 105 can include other ancillary data such as closed-captioning, where the audio portion of TV signal 105 is (entirely or in large part) presented as text that can be read on display 115.

In addition to routing TV signal 105 to display 115, enhanced TV device 110 scans the content broadcast in TV signal 105 to see if there is a URL included in the broadcast. An example of an existing technology that scans TV signal 105 is a product called the TV Guardian, which evaluates the closed-captioning stream of text, looking for profanity or sexually explicit language. In a similar manner, enhanced TV device 110 can scan the content in TV signal 105 for URLs or other computer-accessible information. A URL is identified when there is text that is in the format of a URL. For example, text that has words concatenated and separated with periods or forward slashes, as well as including a top level domain name, such as ".com" or ".edu", etc., can be identified as a URL.

In another embodiment of the invention, enhanced TV device 110 can use a voice recognition component to identify a URL in an audio stream of TV signal. The audio signal is scanned for audio directing a user to a URL. The voice recognition module can receive sample audio for identifying a URL. For example, a user can train the enhanced TV device to recognize the audio for words such as "companyA.com" and then create a text based representation of the URL, as "companyA.com" to be loaded in a browser. By scanning the audio stream, URLs that are not presented in the closed-captioning stream can still be identified and loaded into the user's browser.

If a URL is identified in TV signal 105, enhanced TV device 110 can direct computer 120 to load the URL in browser 125. If browser 125 supports tabbed browsing, the URL can be loaded in a new tab in browser 125. Computer 120 can be a computer, laptop, personal digital assistant, or other portable device. Computer 120 includes typical elements of a computer, such as a central processor, memory, bus, disk space, etc. Computer 120 and enhanced TV device 110 can be connected by a network (not shown in FIG. 1) that can utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

In some embodiments of the invention, computer 120 can include a TV tuner to enable the monitor of computer 120 to display the broadcast transmitted by TV signal 105. In this embodiment, TV signal 105 can be input into computer 120. In addition, in some embodiments of the invention, enhanced TV device 110 can be installed on computer 120 and perform the functions as described above. Thus, for example, it is possible that computer 120 can include all the necessary hardware and/or software to perform all of the functions described above, without requiring any externally separate hardware.

Figure 2:
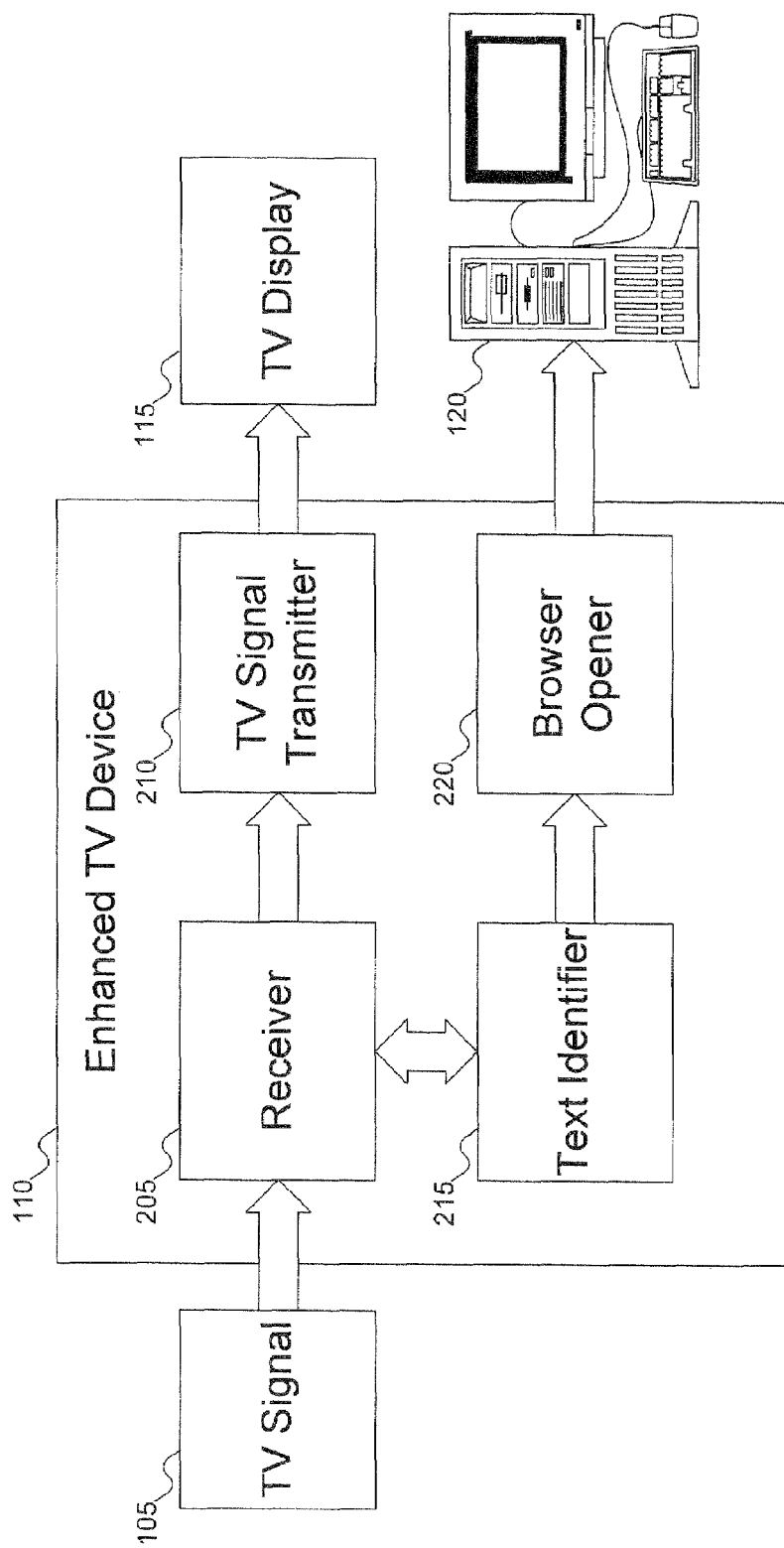
FIG. 2 shows components of the enhanced TV device shown in FIG. 1.

FIG. 2 shows components of the enhanced TV device shown in FIG. 1. Enhanced TV device 110 includes TV signal receiver 205 to receive TV signal 105. TV signal transmitter 210 then transmits TV signal 105 to display 115. Enhanced TV device 110 also includes text identifier 215 that is able to identify text in TV signal 105. In an embodiment of the invention, text identifier 215 scans ancillary data, such as a closed-captioning stream or a sideband channel of TV signal 105. In another embodiment of the invention, text identifier 215 scans the audio stream of TV signal 105 using voice recognition techniques. When text identifier 215 identifies a URL in TV signal 105, browser opener 220 is triggered to direct computer 120 to load the identified URL in a browser. Although FIG. 2 shows each of the components of enhanced TV device 110 as separate components, a person skilled in the art will recognize that some of the components can be combined together, or additional components can also be in enhanced TV device 110.

Figure 3:
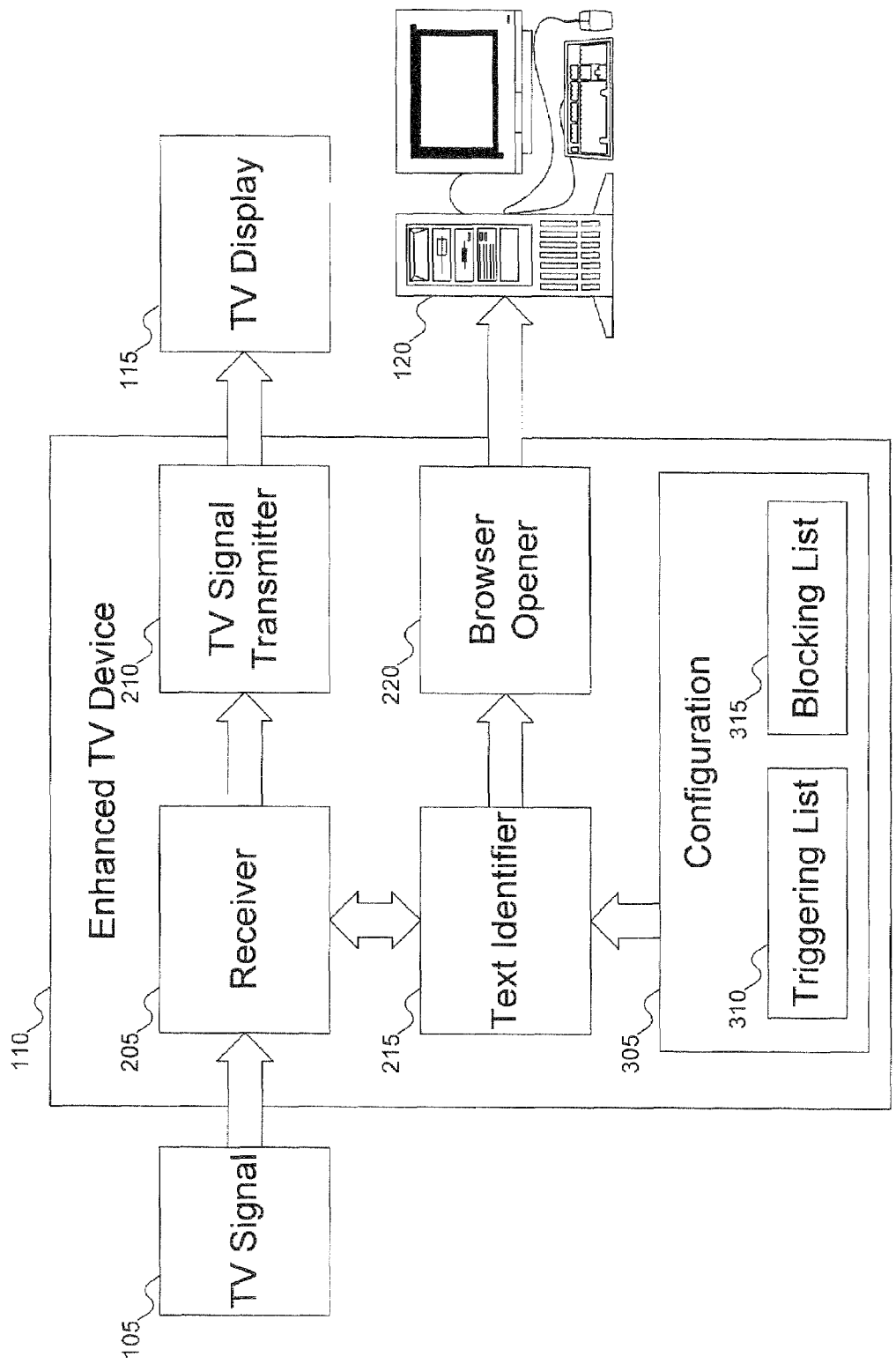
FIG. 3 shows the system of FIG. 2 with a configuration including triggering words and blocking words the enhanced TV device.

FIG. 3 shows the enhanced TV device of FIG. 2 with configuration data including triggering words and blocking words. Configuration 305 includes settings that allow users to specify the types of URLs to open a browser to, or settings enabling users to prevent the loading of a detected URL in a browser. For example, one user might desire that all identified URLs be loaded in a web browser, while other users might instead like to have some control over the URLs that get loaded.

In some embodiments of the invention, a user can enter words into triggering list 310, so that when a word in triggering list 310 is identified in the TV signal, a URL is loaded. A user can also use blocking list 315 to prevent a URL from being loaded. The use of triggering list 310 and blocking list 315 are optional. In an embodiment of the invention, if no words are entered into either list, then all identified URLs are loaded in an Internet browser for the user. The use of triggering list 310 and blocking list 315 are discussed in greater detail below with reference to FIG. 4.

Figure 4:
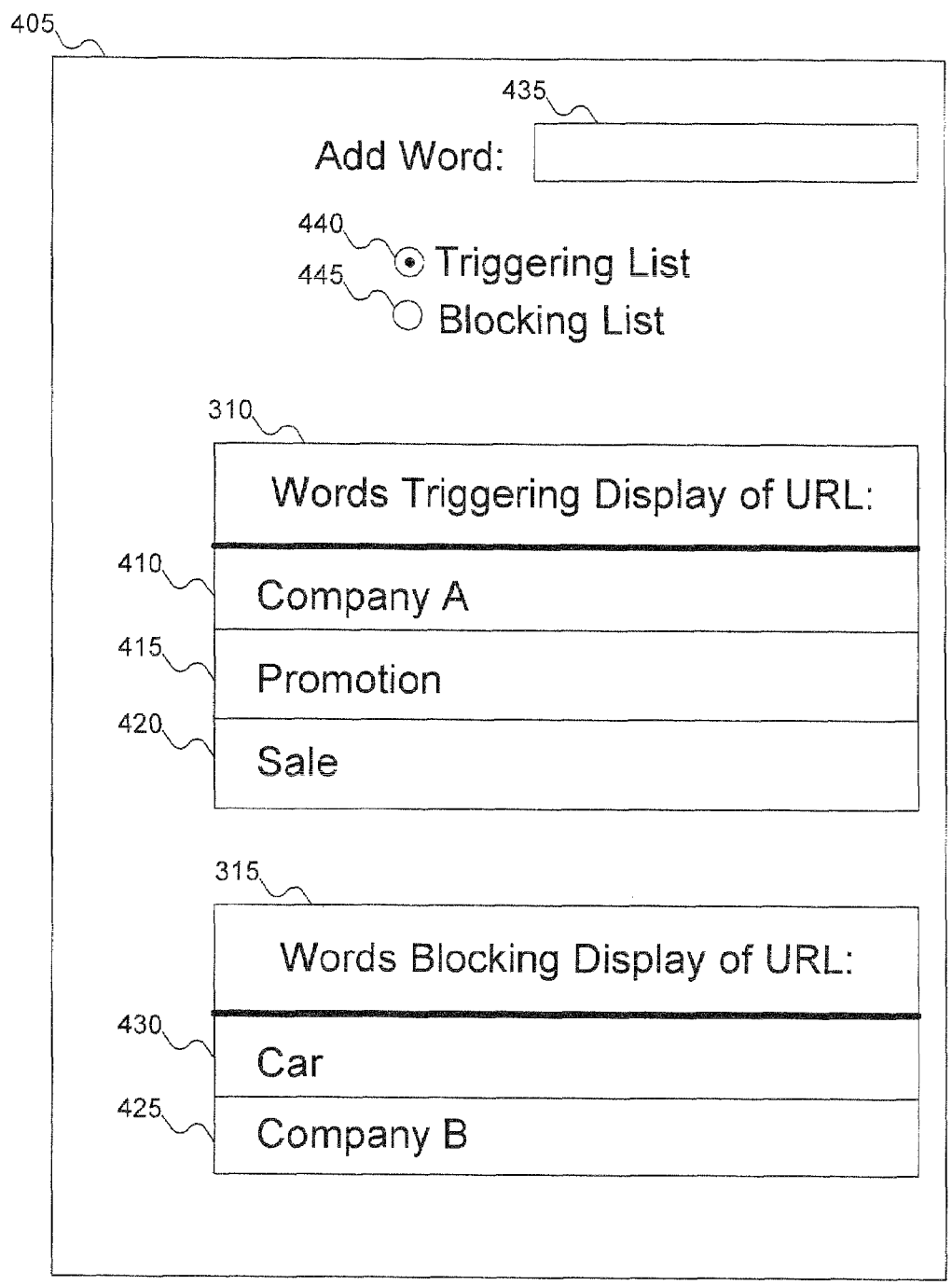
FIG. 4 shows a configuration interface for the enhanced TV device of FIG. 3 with words entered for triggering and blocking the display of a URL.

FIG. 4 shows a configuration interface for the enhanced TV device of FIG. 3 with words entered for triggering and blocking the display of a URL. Configuration interface 405 shows words included in triggering list 310 and blocking list 315. By showing the user what words are included in which list, the user is able to track how enhanced TV device 110 works to open up a URL identified in a TV broadcast in a web browser.

If triggering list 310 includes at least one word and blocking list 315 is empty, then URLs that are appropriately near the words included in triggering list 310 are loaded in a browser. For example, a user might prefer that a URL be loaded only when a particular company name is identified near the URL, and all other URLs should be ignored. The user can enter "Company A" in triggering list 310 as shown in entry 410. Or a user might be interested in all URLs that are related to a sale or a promotion. These words are shown in entries 415 and 420 in triggering list 310. As a URL is identified in the TV broadcast stream, the TV broadcast stream can be investigated further to see if the word "sale" or "promotion" is included near the URL. In this example, it is less important to the user who is offering the sale, than the mere fact that there is a sale. If a word from triggering list 310 is included in the URL, then the URL is loaded in a browser on computer 120.

In another embodiment of the invention, a user might want to receive most URLs, but not all URLs. If blocking list 315 is used and triggering list 310 is not used, then a URL is loaded provided that no words in blocking list 315 are identified near the URL. Use of blocking list 315 without using triggering list 310 allows the loading of all URLs that do not have a word listed in blocking list 315 in or near the URL. For example, a user might be interested in not seeing web content for a particular company or on a particular product. By using blocking list 315, the user can filter out URLs based on entry of the company or product entered in blocking list 315. Suppose a user has had a negative experience with a product from Company B, and has no interest in receiving any new information for this product. This user can add "Company B" to blocking list 315 as shown in entry 425. Then, when a URL is identified in the TV broadcast stream near "Company B", rather than loading the URL in a browser on computer 120, the enhanced TV device instead takes no action.

In an embodiment of the invention, if both triggering list 310 and blocking list 315 are used, a URL is loaded if there is a triggering word near the URL, as long as there is also not a blocking word near the URL. In this embodiment, the words in blocking list 315 trump the words in triggering list 310. For example, a URL can be identified in a closed-captioning stream near the words "car" and "sale". Although "sale" is included in entry 420 of triggering list 310, "car" is included in entry 430 of blocking list 315. In an embodiment where words in blocking list 315 trump words in triggering list 310, then the proximity of "car" to the URL means that the URL is not loaded, even though the word "sale" is also near the URL.

However, a user might prefer that in some instants a word in triggering list 310 always triggers the loading of a URL that is near that word. In another embodiment of the invention, the user can identify a word in triggering list 310 as being one that always triggers the loading of URL, even if there is a blocking word that would normally block the loading of the URL. For example, "Company A" as represented by entry 410 can be specified to always trigger the loading of a URL. If a URL is then identified near the words "Company A" and "Company B", then the URL is loaded into a browser in this configuration. Note that a setting allowing all entries in triggering list 310 to trump entries in blocking list 315 would in effect produce the same results as a configuration with words entered into triggering list 310 and not blocking list 315.

Another example can further illustrate how configuration interface 405 can be used to identify the URLs the user is most interested in having loaded on the user's browser. If a user is interested in Web content for one department store, and not interested in Web content for another department store, the first department store can be entered in triggering list 310. It would then not be necessary to enter the other department store name in blocking list 315. However this configuration would also mean that only the URLs near the name of the first department store have URLs loaded, and no other URLs are loaded in the user's Internet browser.

But if the user would like to have other URLs also loaded in the browser, instead of adding the first company name to triggering list 310, the user can add the second company name to blocking list 315. By configuring enhanced TV device in this manner, the user prevents URLs that are near the second company name from being loaded, but still allows URLs with or near the first company name to be loaded. In addition, any other URLs that may or may not be related to department stores are still loaded in the browser on computer 120.

In an embodiment of the invention, the words in triggering list 310 and blocking list 315 can be embedded in the URL or near the URL. Although not shown in FIG. 4, configuration interface 405 can include a setting specifying how close to a URL a triggering word or blocking word is to be in order to initiate the triggering or blocking of the loading of the URL. In an embodiment of the invention, the user can even specify a number indicating the proximity of a word in on one of the lists to the URL. For example, a default setting could provide that a word within five words to a URL is close enough to the URL to implicate the loading or blocking of the URL. A particular word in triggering list 310 can then be also be configured so that if that word is within ten words of the URL, the URL should be loaded into a browser.

In an embodiment of the invention, a thesaurus can be used to identify words that are similar to the words in triggering list 310 (or blocking list 315). A user can identify words where use of a thesaurus is appropriate. For example, if the word "car" in entry 420 of blocking list 315 is marked to use the thesaurus, then it is unnecessary to also add the words "auto" or "vehicle" to blocking list 315. Words in triggering list 310 can similarly employ the use of the thesaurus. In addition, configuration interface 405 can allow a user to utilize the thesaurus for each entry in triggering list 310 and 315, or a user select individual words where the use of a thesaurus would be appropriate.

Finally, configuration interface 405 includes entry field 435 for users to add words to triggering list 310 and blocking list 315. For example, a user can enter the word that is to be added, and select either radio button 440 or radio button 445, depending on the list the word should be added to. Of course, this is but one example user interface. In another embodiment, a word can be added directly to the appropriate list for the word. A person skilled in the art will recognize other means of adding a word to triggering list 310 and blocking list 315 that can also be employed.

In an embodiment of the invention configuration interface 405 can be shown on the display used to present the TV broadcast to the viewer. In this embodiment, a user can interact with configuration interface 405 by using a remote control. The remote control can enable a user to move between fields, as well as enable the user to enter words in triggering list 310 and blocking list 315 by selecting letters shown on the display. In another embodiment, configuration interface 405 can be presented to the user via the user's computer. The user can then use standard input/output devices such as a keyboard and mouse to interact with configuration interface 405.

Figure 5:
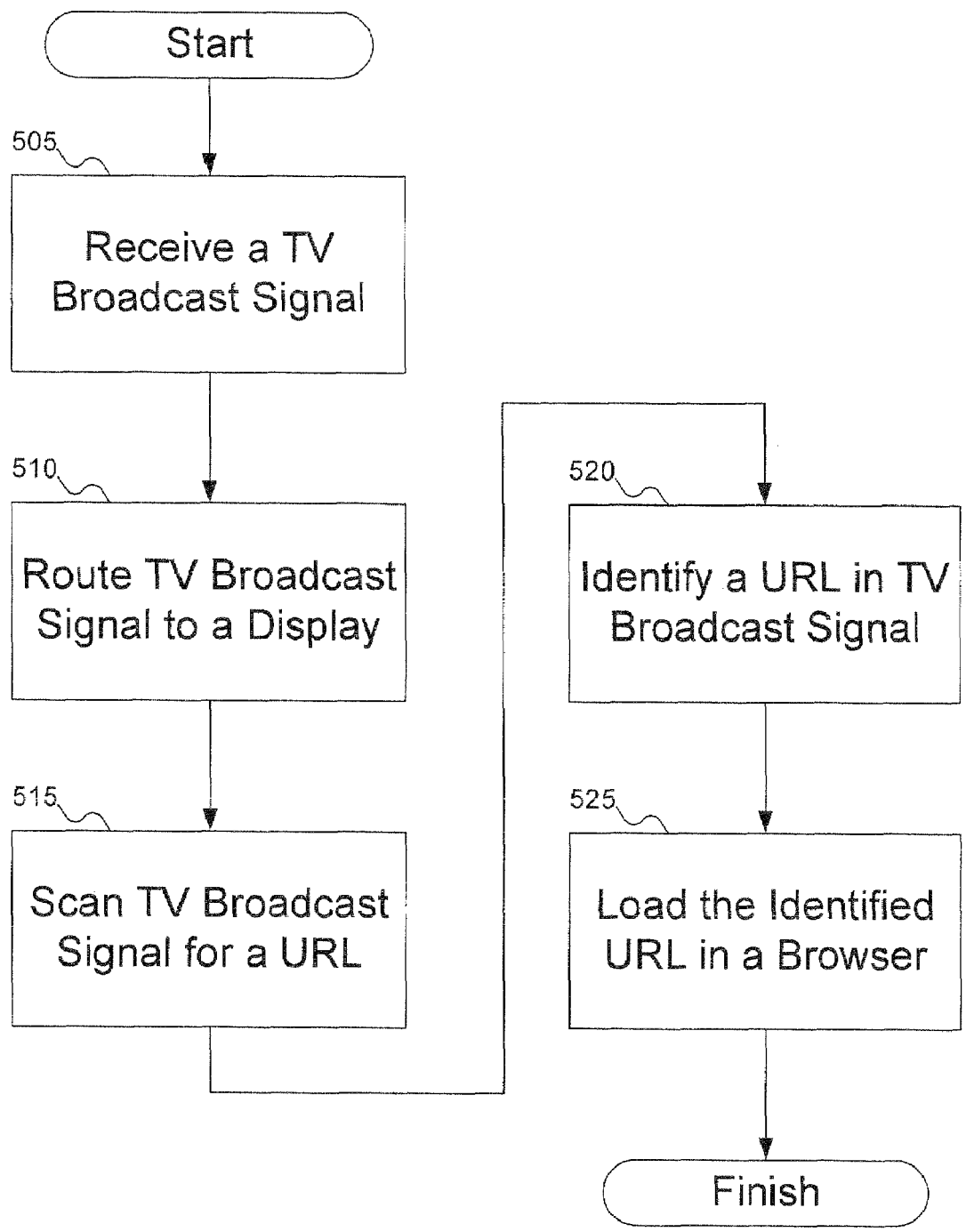
FIG. 5 shows a flowchart of the process of the enhanced TV device of FIG. 1 for detecting a URL in ancillary data of a TV broadcast signal, and loading the detected URL in a browser.

FIG. 5 shows a flowchart of the process of the enhanced TV device of FIG. 1 for detecting a URL in ancillary data of a TV broadcast signal and opening up a web page for the detected URL in a browser. At step 505, a TV broadcast signal is received. At step 510, the TV broadcast signal is routed to a display. At step 515, the TV broadcast signal is scanned for identification of a URL. Note that while step 510 is shown as occurring before step 515, in practice both steps can occur effectively simultaneously. Also, the routing step 510 and the scanning a URL step 515 are both perpetual processes, rather than steps that are performed once and then considered complete. At step 520, a URL is identified in the TV broadcast signal. In an embodiment of the invention, the URL is identified in ancillary data of the TV broadcast signal, such as closed-captioning. In another embodiment of the invention, the URL is identified by using voice recognition techniques on the audio stream. After a URL is identified, at step 525 the URL is launched in a browser. The URL can be loaded in a browser and presented to the user on the display for the TV broadcast, or in a display for a computer. In addition, in an embodiment of the invention, an instance of an Internet browser can be opened with the URL. In another embodiment of the invention, if there is already a browser running on the computer and the browser supports tabbed browser, the browser can load the URL, in a new tab. A person skilled in the art will recognize that there are other ways for a URL to be loaded in a browser.

Figure 6:
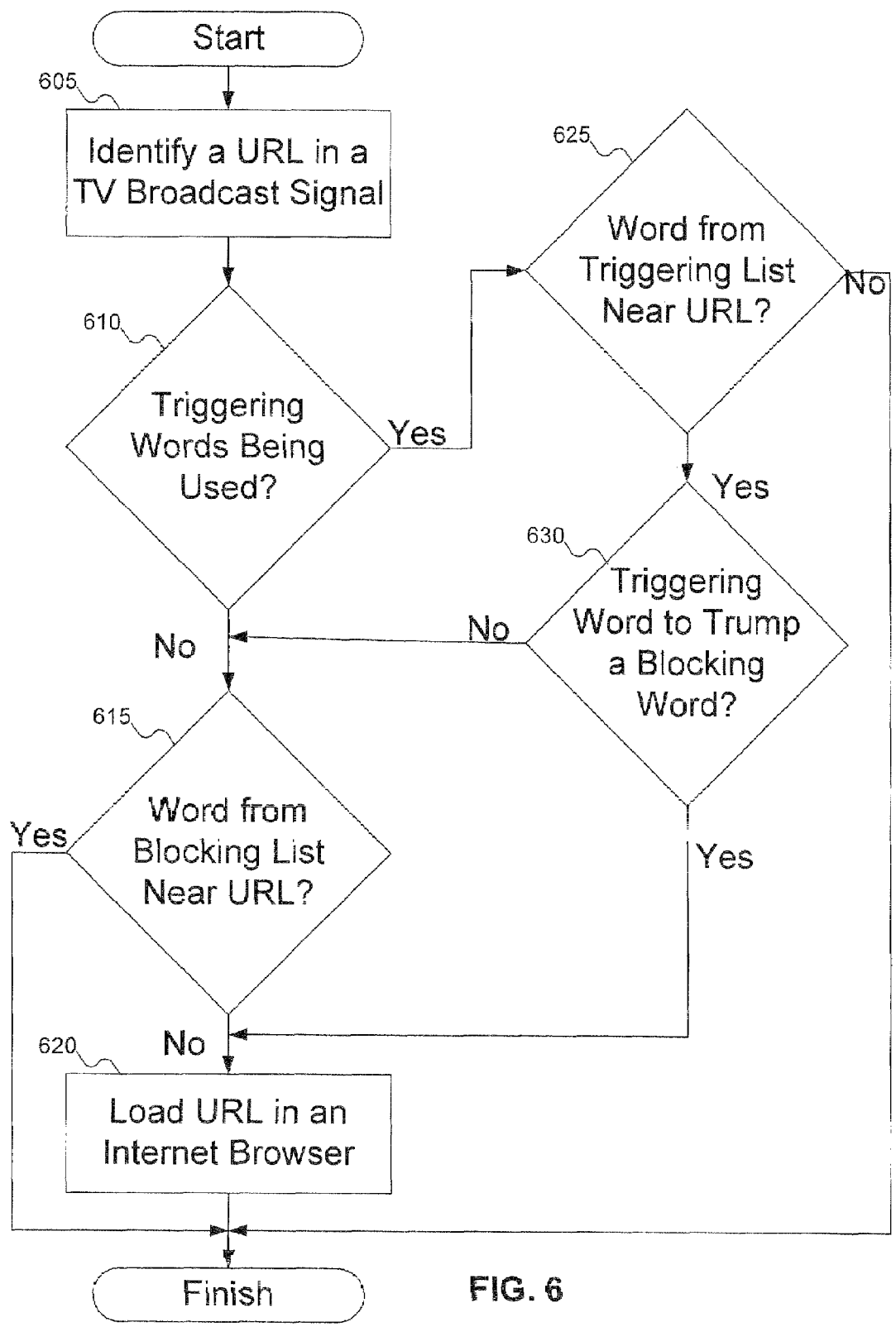
FIG. 6 shows a flowchart of the process of the enhanced TV device of FIG. 3 with a configuration including triggering words and blocking words.

In contrast to FIG. 5 which shows a process where all identified URLs are loaded into a browser, FIG. 6 shows a flowchart of the process where triggering words and blocking words are used to filter the URLs that are loaded in the browser. As previously described with reference to FIGS. 13-14, a user can use triggering words to identify a subset of identified URLs for loading. Or a user can use blocking words to identify a subset of identified URLs that should not be displayed. Although not shown, steps 505-515 from FIG. 5 are performed in the flowchart of FIG. 6. Then, like step 520 shown in FIG. 5, at step 605, a URL is identified in a TV broadcast signal.

Decision block 610 determines if triggering words are being used to identify what URLs should be opened in a user's web browser. For example, there can be a configuration setting that determines the use of triggering words. Or the configuration of the enhanced TV device can be set up so that if there are no words in the triggering list, then triggering words are not used. If at decision block 610 triggering words are not being used, then at decision block 615, it is determined if any words from the blocking list are identified near the URL. In an embodiment of the invention, a blocking word can have a default proximity to the URL that will put the force of the blocking word into effect or the user can specify in the configuration how near the blocking word should be to the URL. If at decision block 615 there is no word from the blocking list, then at step 620 the URL is loaded in the Internet browser. However, if at decision block 615 a word from the blocking list is identified near the URL, then the process finishes without the URL being loaded in the browser.

Returning to decision block 610, if triggering words are being used, then decision block 625 determines if a word from the triggering list is identified near the URL. As with the blocking words, a default proximity of a word to a URL can be used, or a user can specify how near to the URL, a word should be in order to trigger the loading of a URL. If at decision block 625 no words from the triggering list are identified near the URL, then the process finishes without loading the URL in the browser. However, if at decision block 625 a word from the triggering list is identified near the URL, then the process continues at decision block 630.

At decision block 630, if the triggering word is set up to trump any blocking word, then the process continues at step 620 where the URL is loaded in an Internet browser. Recall that a user can configure the enhanced TV device to provide that the identification of a word in the triggering list is to trigger the loading of a URL regardless of whether a word in the blocking list is identified near the URL. If at decision block 630, the triggering word does not trump any blocking word, then the process continues at decision block 615 where the enhanced TV device determines if there is a blocking word near the URL as discussed above.

After the URL is loaded in a browser at step 620, the process involving that particular URL is complete. However, in practice the procedure outlined in FIG. 6 is ongoing, and additional URLs might be identified in the TV broadcast. As another URL is identified, the process begins anew at step 605.

Determining Semantic Abstracts

A semantic abstract representing the content of the document can be constructed as a set of vectors within the topological vector space. (The construction of state vectors in a topological vector space is described in U.S. patent application Ser. No. 11/562,337, titled "CONSTRUCTION, MANIPULATION, AND COMPARISON OF A MULTI-DIMENSIONAL SEMANTIC SPACE," filed Nov. 21, 2006, and referred to as "the Construction application.") FIGS. 7-10 and the accompanying description are copied from that application.

Figure 7:
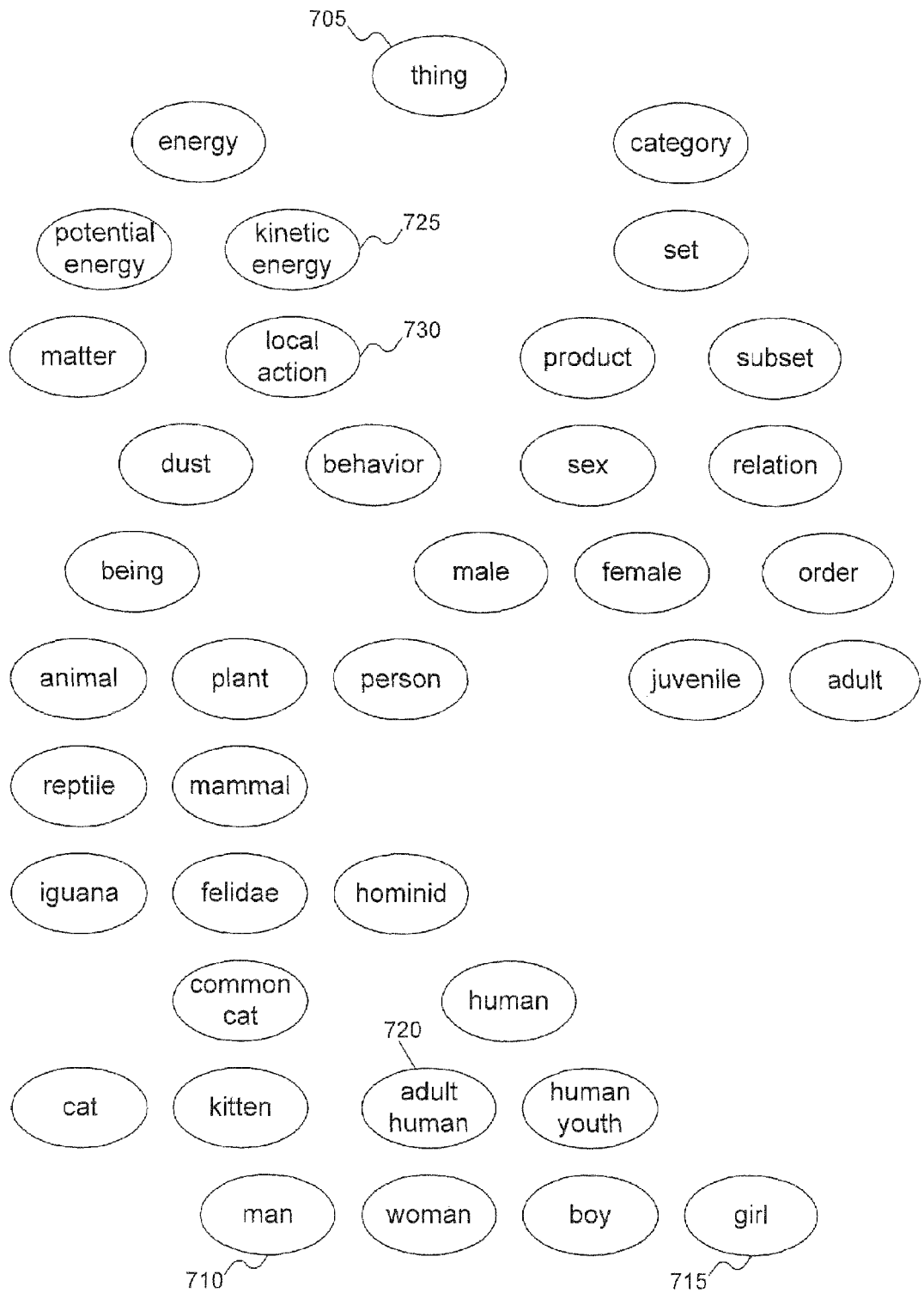
FIG. 7 shows an example of set of concepts that can form a directed set.

FIG. 7 shows a set of concepts, including "thing" 705, "man" 710, "girl" 715, "adult human" 720, "kinetic energy" 725, and "local action" 730. "Thing" 705 is the maximal element of the set, as every other concept is a type of "thing." Some concepts, such as "man" 710 and "girl" 715 are "leaf concepts," in the sense that no other concept in the set is a type of "man" or "girl." Other concepts, such as "adult human" 720, "kinetic energy" 725, and "local action" 730 are "internal concepts," in the sense that they are types of other concepts (e.g., "local action" 730 is a type of "kinetic energy" 725) but there are other concepts that are types of these concepts (e.g., "man" 710 is a type of "adult human" 720).

Figure 8:
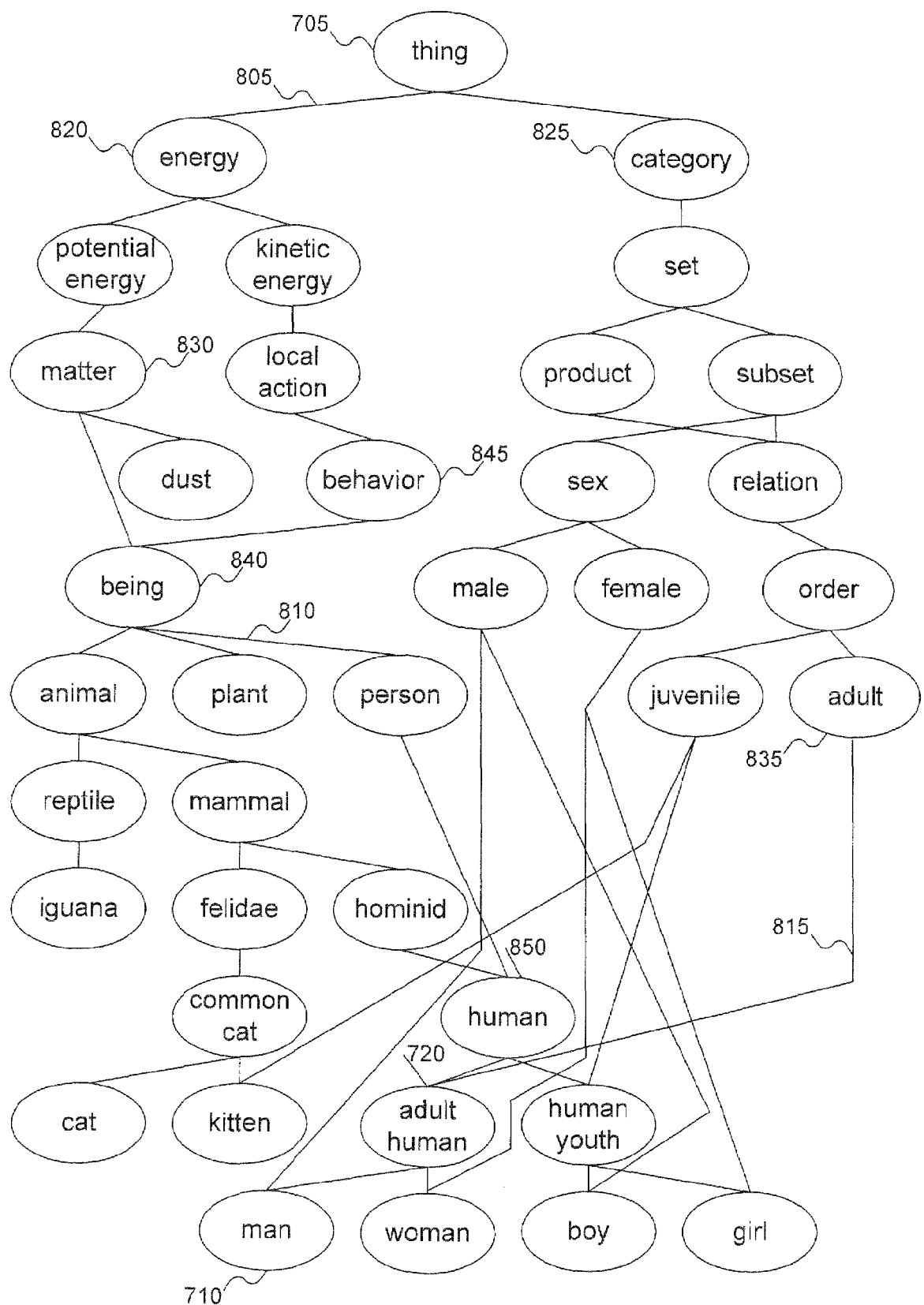
FIG. 8 shows a directed set constructed from the set of concepts of FIG. 7 in a preferred embodiment of the invention.

FIG. 8 shows a directed set constructed from the concepts of FIG. 7. For each concept in the directed set, there is at least one chain extending from maximal element "thing" 705 to the concept. These chains are composed of directed links, such as links 805, 810, and 815, between pairs of concepts. In the directed set of FIG. 8, every chain from maximal element "thing" must pass through either "energy" 820 or "category" 825. Further, there can be more than one chain extending from maximal element "thing" 705 to any concept. For example, there are four chains extending from "thing" 705 to "adult human" 720: two go along link 810 extending out of "being" 840, and two go along link 815 extending out of "adult" 835.

Some observations about the nature of FIG. 8:

First, the model is a topological space.

Second, note that the model is not a tree. In fact, it is an example of a directed set. For example, concepts "being" 840 and "adult human" 720 are types of multiple concepts higher in the hierarchy. "Being" 840 is a type of "matter" 830 and a type of "behavior" 845; "adult human" 720 is a type of "adult" 835 and a type of "human" 850.

Third, observe that the relationships expressed by the links are indeed relations of hyponymy.

Fourth, note particularly—but without any loss of generality—that "man" 710 maps to both "energy" 820 and "category" 825 (via composite mappings) which in turn both map to "thing" 705; i.e., the (composite) relations are multiple valued and induce a partial ordering. These multiple mappings are natural to the meaning of things and critical to semantic characterization.

Finally, note that "thing" 705 is maximal; indeed, "thing" 705 is the greatest element of any quantization of the lexical semantic field (subject to the premises of the model).

Metrizing S

Figure 9A:
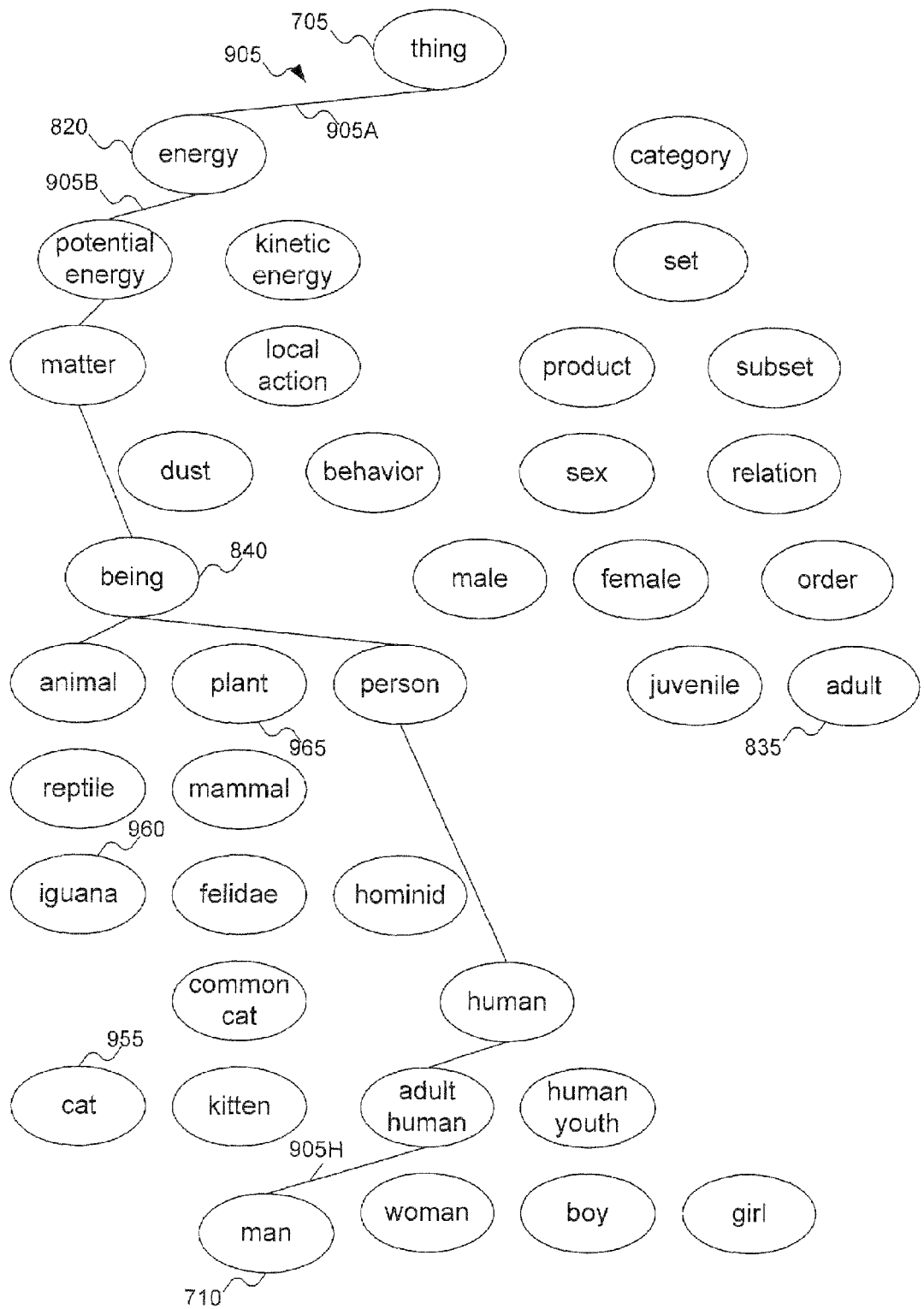
FIGS. 9A-9G show eight different chains in the directed set of FIG. 8 that form a basis for the directed set.
Figure 9B:
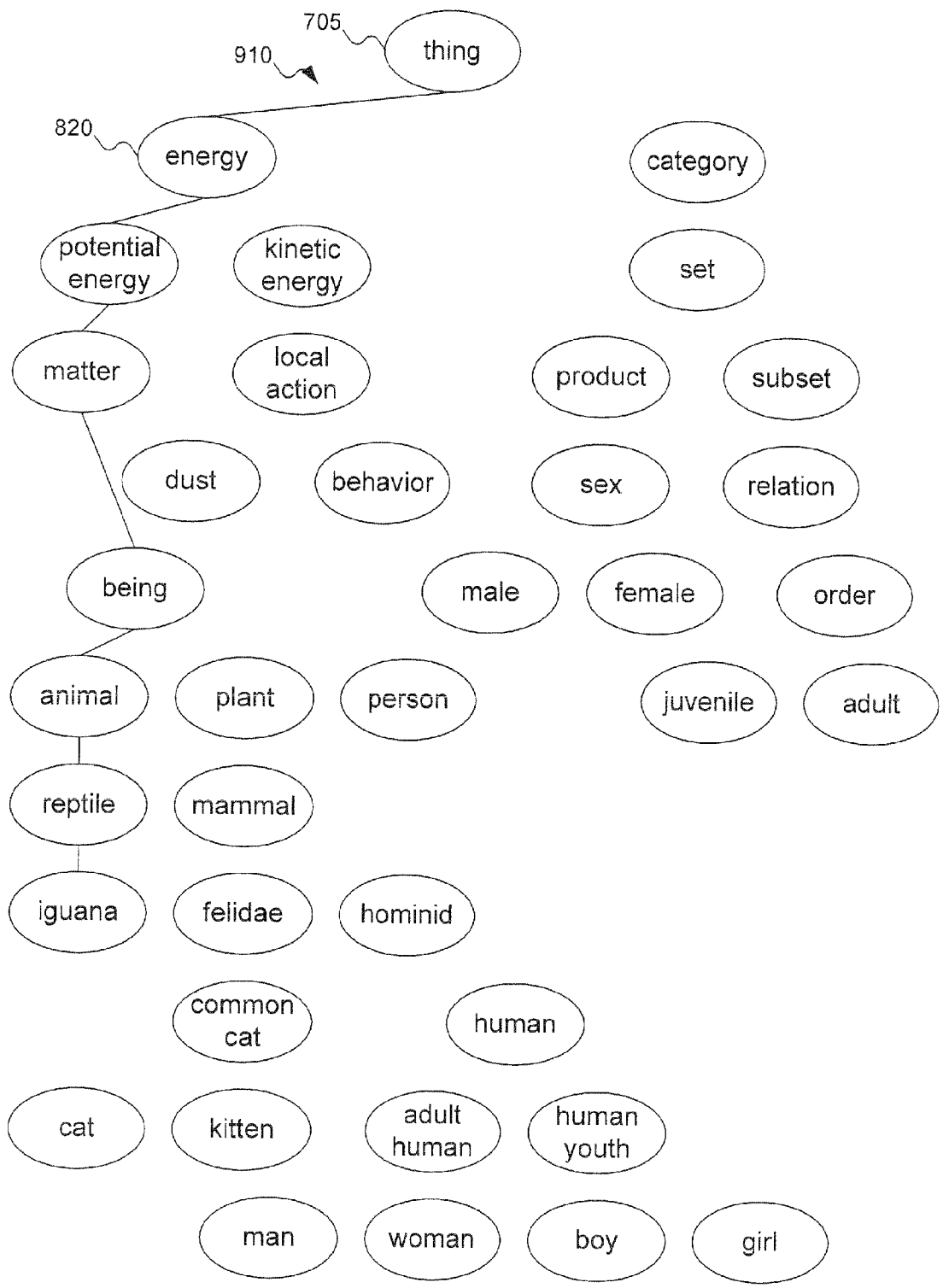
Figure 9C:
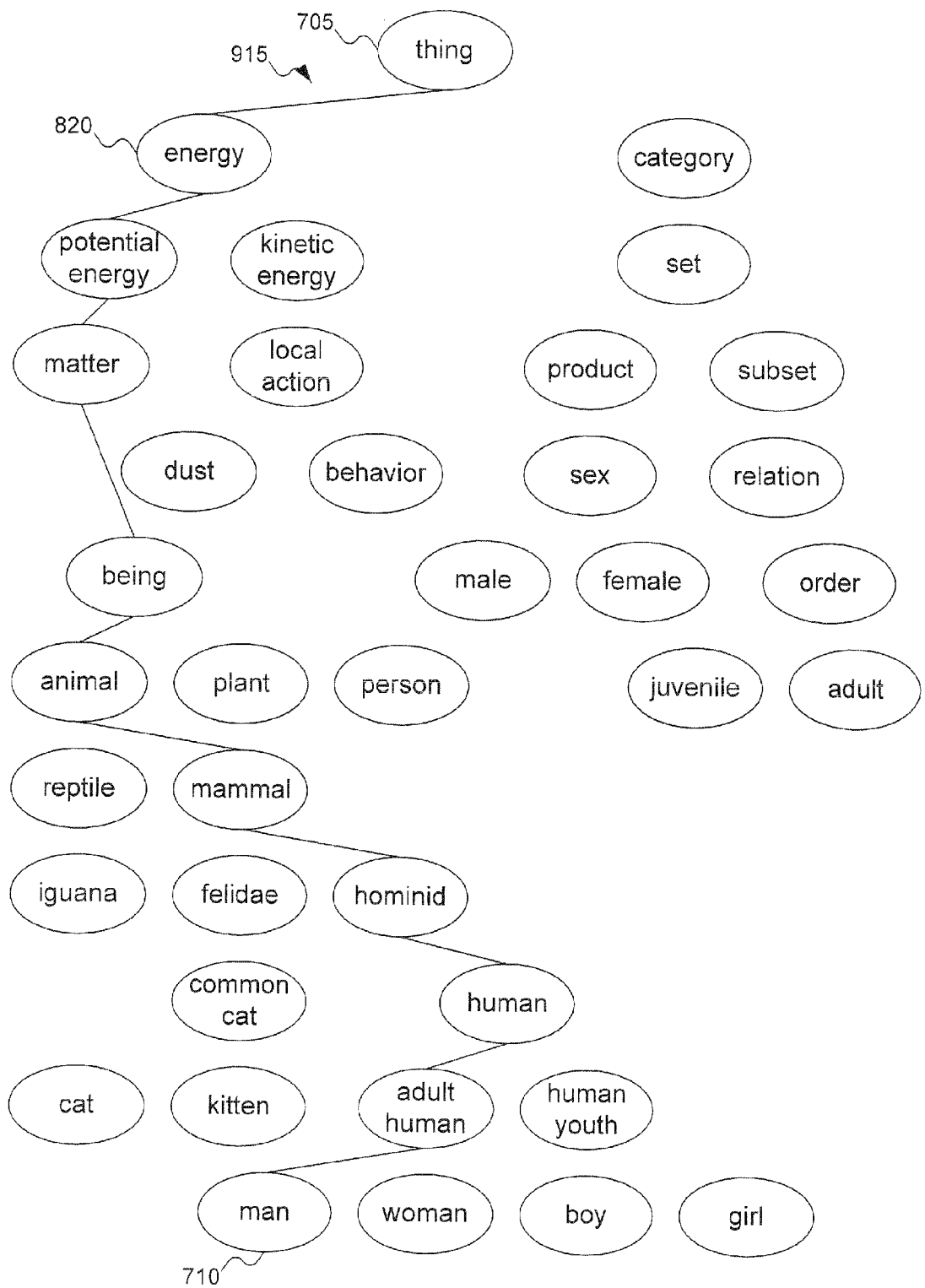
Figure 9D:
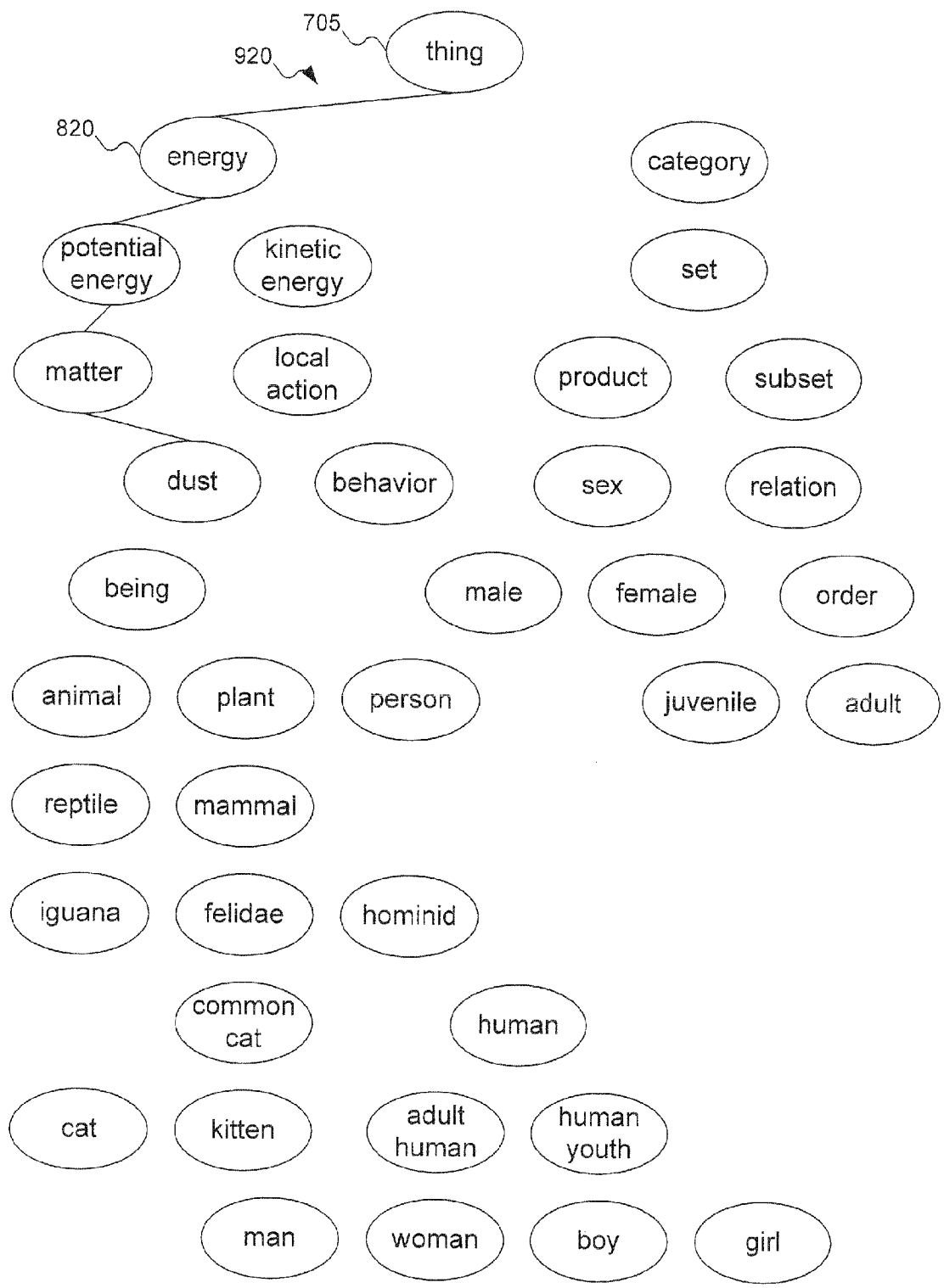
Figure 9E:
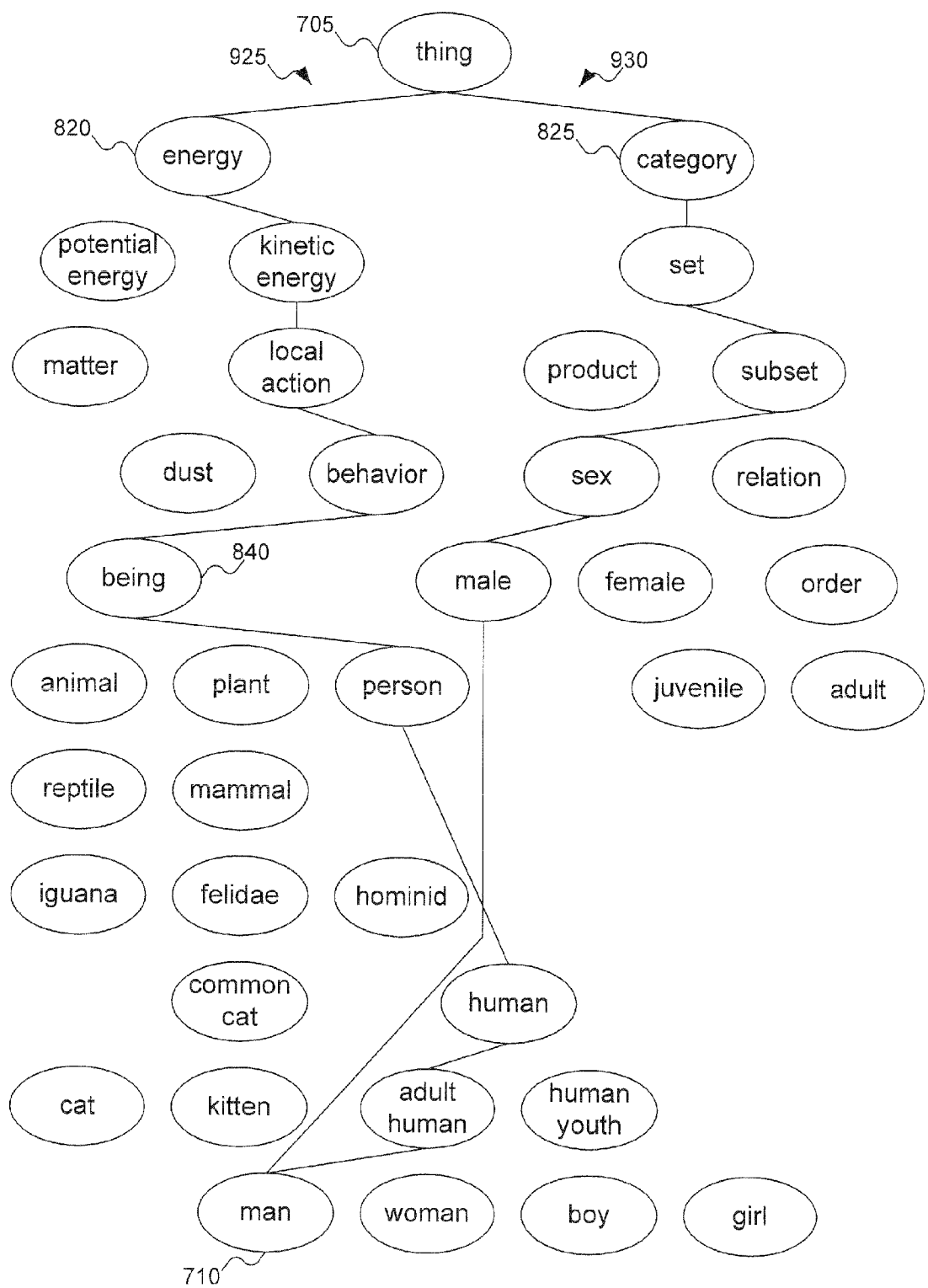
Figure 9F:
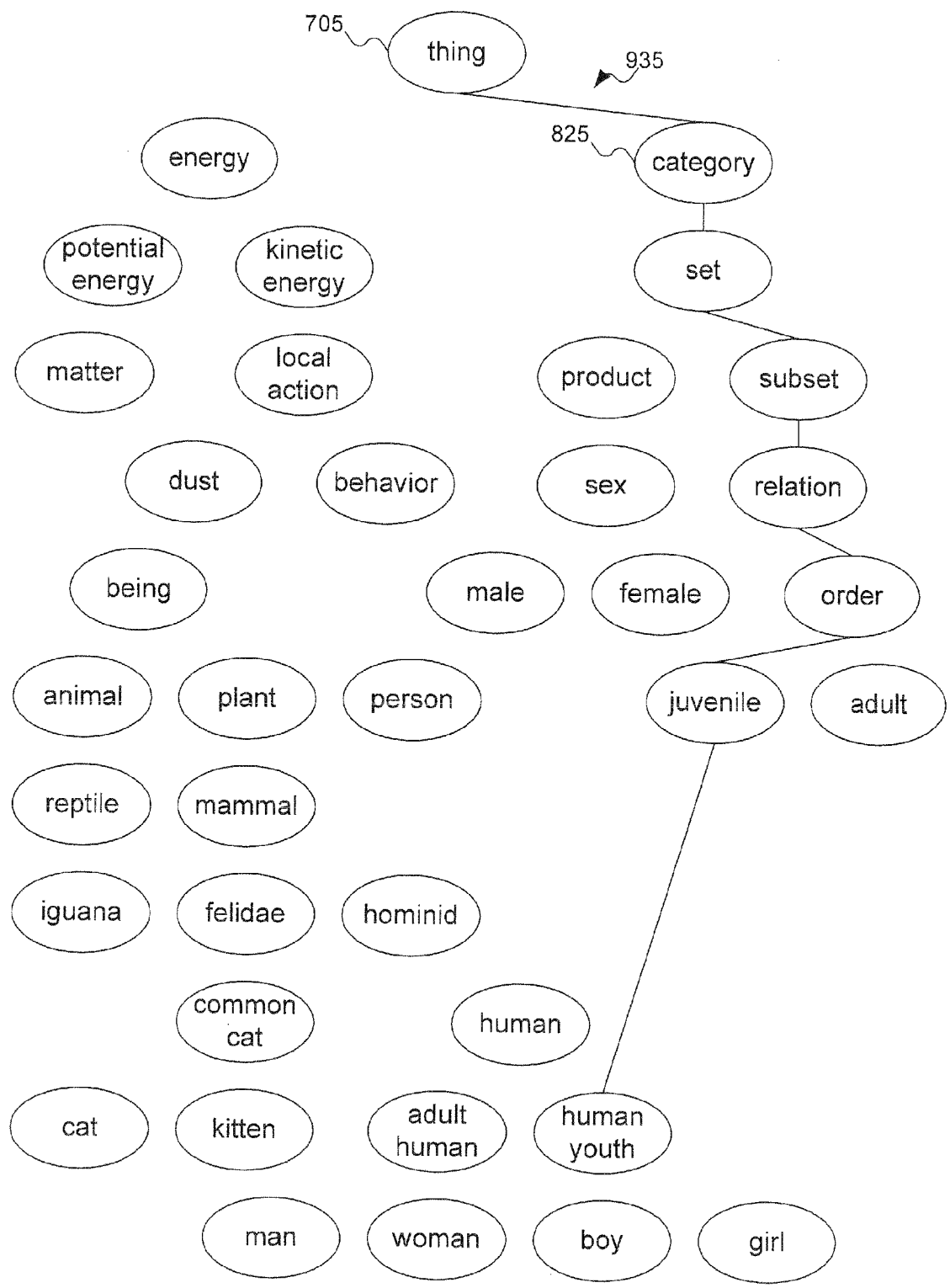
Figure 9G:
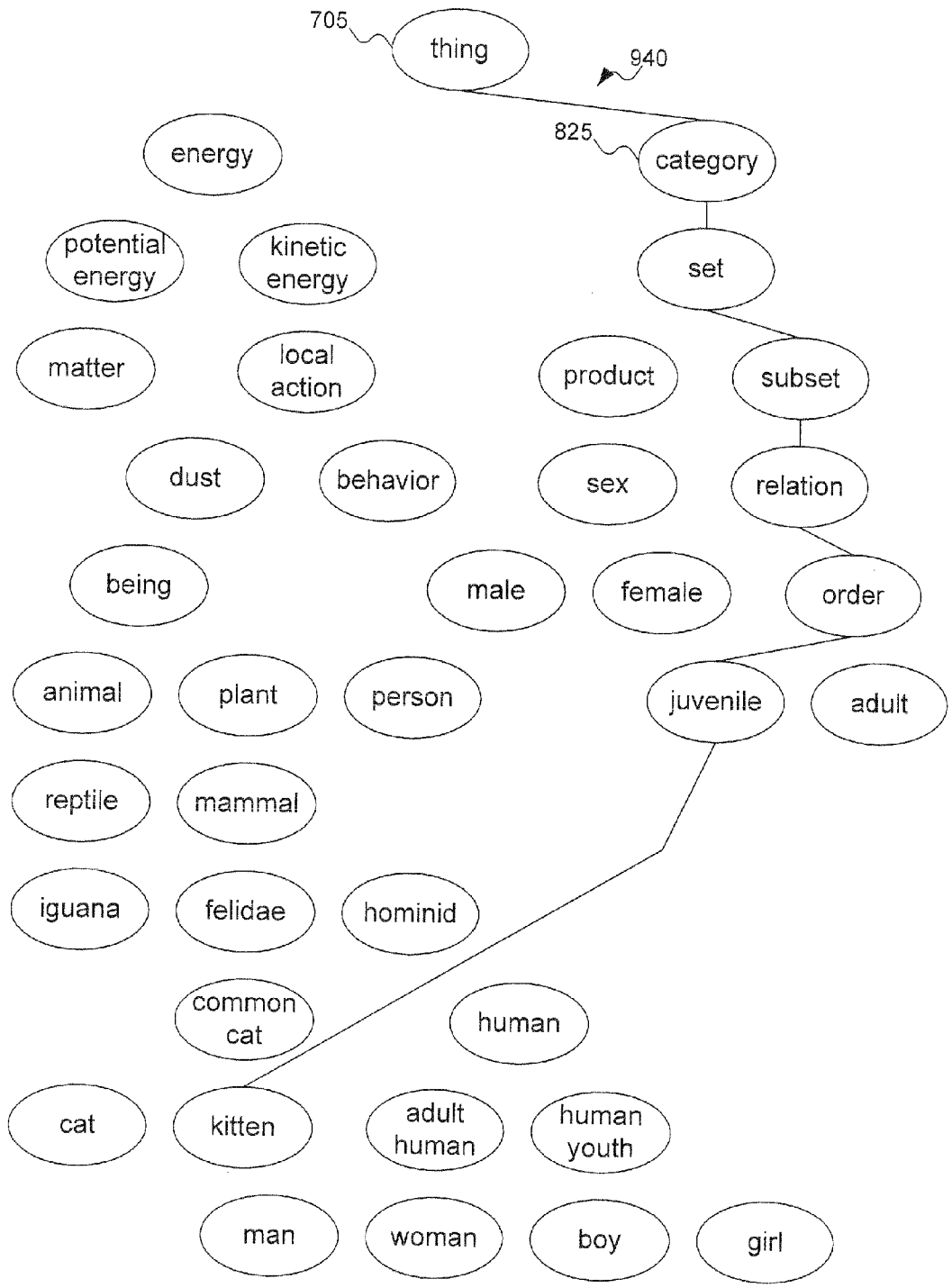

FIGS. 9A-9G show eight different chains in the directed set that form a basis for the directed set. FIG. 9A shows chain 905, which extends to concept "man" 710 through concept "energy" 820. FIG. 9B shows chain 910 extending to concept "iguana." FIG. 9C shows another chain 915 extending to concept "man" 710 via a different path. FIGS. 9D-9G show other chains.

Figure 10:
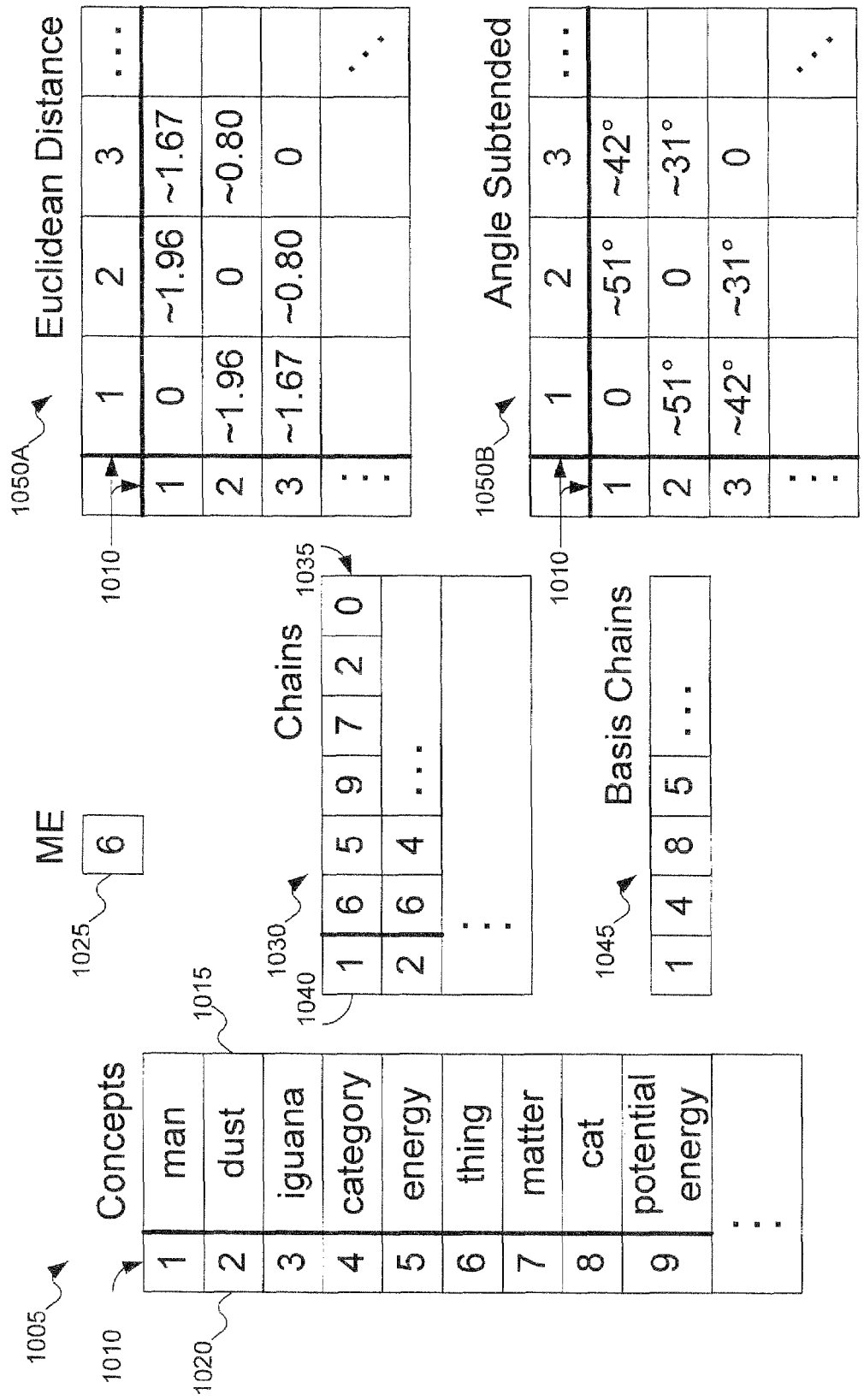
FIG. 10 shows data structures for storing a directed set, chains, and basis chains, such as the directed set of FIG. 7, the chains of FIG. 8, and the basis chains of FIGS. 9A-9G.

FIG. 10 shows a data structure for storing the directed set of FIG. 7, the chains of FIG. 8, and the basis chains of FIGS. 9A-9G. In FIG. 10, concepts array 1005 is used to store the concepts in the directed set. Concepts array 1005 stores pairs of elements. One element identifies concepts by name; the other element stores numerical identifiers 1010. For example, concept name 1015 stores the concept "dust," which is paired with numerical identifier "2" 1020. Concepts array 1005 shows 9 pairs of elements, but there is no theoretical limit to the number of concepts in concepts array 1005. In concepts array 1005, there should be no duplicated numerical identifiers 1010. In FIG. 10, concepts array 1005 is shown sorted by numerical identifier 1010, although this is not required. When concepts array 1005 is sorted by numerical identifier 1010, numerical identifier 1010 can be called the index of the concept name.

Maximal element (ME) 1025 stores the index to the maximal element in the directed set. In FIG. 10, the concept index to maximal element 1025 is "6," which corresponds to concept "thing," the maximal element of the directed set of FIG. 8.

Chains array 1030 is used to store the chains of the directed set. Chains array 1030 stores pairs of elements. One element identifies the concepts in a chain by index; the other element stores a numerical identifier. For example, chain 1035 stores a chain of concept indices "6", "5", "9", "7", and "2," and is indexed by chain index "1" (1040). (Concept index 0,which does not occur in concepts array 1005, can be used in chains array 1030 to indicate the end of the chain. Additionally, although chain 1035 includes five concepts, the number of concepts in each chain can vary.) Using the indices of concepts array 1005, this chain corresponds to concepts "thing," "energy," "potential energy," "matter," and "dust." Chains array 1030 shows one complete chain and part of a second chain, but there is no theoretical limit to the number of chains stored in chain array 1030. Observe that, because maximal element 1025 stores the concept index "6," every chain in chains array 1030 should begin with concept index "6." Ordering the concepts within a chain is ultimately helpful in measuring distances between the concepts. However concept order is not required. Further, there is no required order to the chains as they are stored in chains array 1030.

Basis chains array 1045 is used to store the chains of chains array 1030 that form a basis of the directed set. Basis chains array 1045 stores chain indices into chains array 1030. Basis chains array 1045 shows four chains in the basis (chains 1, 4, 8, and 5), but there is no theoretical limit to the number of chains in the basis for the directed set.

Euclidean distance matrix 1050A stores the distances between pairs of concepts in the directed set of FIG. 8. (How distance is measured between pairs of concepts in the directed set is discussed below. But in short, the concepts in the directed set are mapped to state vectors in multi-dimensional space, where a state vector is a directed line segment starting at the origin of the multi-dimensional space and extending to a point in the multi-dimensional space.) The distance between the end points of pairs of state vectors representing concepts is measured. The smaller the distance is between the state vectors representing the concepts, the more closely related the concepts are. Euclidean distance matrix 1050A uses the indices 1010 of the concepts array for the row and column indices of the matrix. For a given pair of row and column indices into Euclidean distance matrix 1050A, the entry at the intersection of that row and column in Euclidean distance matrix 1050A shows the distance between the concepts with the row and column concept indices, respectively. So, for example, the distance between concepts "man" and "dust" can be found at the intersection of row 1 and column 2 of Euclidean distance matrix 1050A as approximately 1.96 units. The distance between concepts "man" and "iguana" is approximately 1.67, which suggests that "man" is closer to "iguana" than "man" is to "dust." Observe that Euclidean distance matrix 1050A is symmetrical: that is, for an entry in Euclidean distance matrix 1050A with given row and column indices, the row and column indices can be swapped, and Euclidean distance matrix 1050A will yield the same value. In words, this means that the distance between two concepts is not dependent on concept order: the distance from concept "man" to concept "dust" is the same as the distance from concept "dust" to concept "man."

Angle subtended matrix 1050B is an alternative way to store the distance between pairs of concepts. Instead of measuring the distance between the state vectors representing the concepts (see below), the angle between the state vectors representing the concepts is measured. This angle will vary between 0 and 90 degrees. The narrower the angle is between the state vectors representing the concepts, the more closely related the concepts are. As with Euclidean distance matrix 1050A, angle subtended matrix 1050B uses the indices 1010 of the concepts array for the row and column indices of the matrix. For a given pair of row and column indices into angle subtended matrix 1050B, the entry at the intersection of that row and column in angle subtended matrix 1050B shows the angle subtended the state vectors for the concepts with the row and column concept indices, respectively. For example, the angle between concepts "man" and "dust" is approximately 51 degrees, whereas the angle between concepts "man" and "iguana" is approximately 42 degrees. This suggests that "man" is closer to "iguana" than "man" is to "dust." As with Euclidean distance matrix 1050A, angle subtended matrix 1050B is symmetrical.

Not shown in FIG. 10 is a data structure component for storing state vectors (discussed below). As state vectors are used in calculating the distances between pairs of concepts, if the directed set is static (i.e., concepts are not being added or removed and basis chains remain unchanged), the state vectors are not required after distances are calculated. Retaining the state vectors is useful, however, when the directed set is dynamic. A person skilled in the art will recognize how to add state vectors to the data structure of FIG. 10.

Although the data structure for concepts array 1005, maximal element 1025 chains array 1030, and basis chains array 1045 in FIG. 10 are shown as arrays, a person skilled in the art will recognize that other data structures are possible. For example, concepts array could store the concepts in a linked list, maximal element 1025 could use a pointer to point to the maximal element in concepts array 1005, chains array 1030 could use pointers to point to the elements in concepts array, and basis chains array 1045 could use pointers to point to chains in chains array 1030. Also, a person skilled in the art will recognize that the data in Euclidean distance matrix 1050A and angle subtended matrix 1050B can be stored using other data structures. For example, a symmetric matrix can be represented using only one half the space of a full matrix if only the entries below the main diagonal are preserved and the row index is always larger than the column index. Further space can be saved by computing the values of Euclidean distance matrix 1050A and angle subtended matrix 1050B "on the fly" as distances and angles are needed.

Returning to FIGS. 9A-9G, how are distances and angles subtended measured? The chains shown in FIGS. 9A-9G suggest that the relation between any node of the model and the maximal element "thing" 705 can be expressed as any one of a set of composite functions; one function for each chain from the minimal node μ to "thing" 705 (the $n^{th}$ predecessor of μ along the chain):

$$f: \mu \Rightarrow thing = f_1 \circ f_2 \circ f_3 \circ \ldots \circ f_n$$

where the chain connects n+1 concepts, and $f_j$: links the $(n-j)^{th}$ predecessor of μ with the $(n+1-j)^{th}$ predecessor of μ, $1 \leq j \leq n$. For example, with reference to FIG. 9A, chain 905 connects nine concepts. For chain 905, $f_1$ is link 905A, $f_2$ is link 905B, and so on through $f_8$ being link 905H.

Consider the set of all such functions for all minimal nodes. Choose a countable subset $\{f_k\}$ of functions from the set. For each $f_k$ construct a function $g_k: S \Rightarrow I^1$ as follows. For $s \in S$, s is in relation (under hyponymy) to "thing" 705. Therefore, s is in relation to at least one predecessor of μ, the minimal element of the (unique) chain associated with $f_k$. Then there is a predecessor of smallest index (of μ), say the $m^{th}$, that is in relation to s. Define:

$$g_k(s) = (n-m)/n \qquad \text{Equation (1)}$$

This formula gives a measure of concreteness of a concept to a given chain associated with function $f_k$.

As an example of the definition of $g_k$, consider chain 905 of FIG. 9A, for which n is 8. Consider the concept "cat" 920. The smallest predecessor of "man" 710 that is in relation to "cat" 920 is "being" 840. Since "being" 840 is the fourth predecessor of "man" 710, m is 4, and $g_k$("cat" 920)=(8−4)/8=½. "Iguana" 925 and "plant" 925 similarly have $g_k$ values of ½. But the only predecessor of "man" 710 that is in relation to "adult" 835 is "thing" 705 (which is the eighth predecessor of "man" 710), so m is 8, and $g_k$("adult" 835)=0.

Finally, define the vector valued function $\phi: S \Rightarrow \mathbb{R}^k$ relative to the indexed set of scalar functions $\{g_1, g_2, g_3, \ldots, g_k\}$ (where scalar functions $\{g_1, g_2, g_3, \ldots, g_k\}$ are defined according to Equation (1)) as follows:

$$\phi(s) = \langle g_1(s), g_2(s), g_3(s), g_k(s) \rangle \qquad \text{Equation (2)}$$

This state vector φ(s) maps a concept s in the directed set to a point in k-space ($\mathbb{R}^k$). One can measure distances between the points (the state vectors) in k-space. These distances provide measures of the closeness of concepts within the directed set. The means by which distance can be measured include distance functions, such as those shown Equations (3a) (Euclidean distance), (3b) ("city block" distance), or (3c) (an example of another metric). In Equations (3a), (3b), and (3c), $\rho_1 = (n_1, p_1)$ and $\rho_2 = (n_2, p_2)$.

$$|\rho_2 - \rho_1| = (|n_2 - n_1|^2 + |p_2 - p_1|^2)^{1/2} \qquad \text{Equation (3a)}$$

$$|\rho_2 - \rho_1| = |n_2 - n_1| + |p_2 - p_1| \qquad \text{Equation (3b)}$$

$$(\Sigma(\rho_{2,i} - \rho_{1,i})^n)^{1/n} \qquad \text{Equation (3c)}$$

Further, trigonometry dictates that the distance between two vectors is related to the angle subtended between the two vectors, so means that measure the angle between the state vectors also approximates the distance between the state vectors. Finally, since only the direction (and not the magnitude) of the state vectors is important, the state vectors can be normalized to the unit sphere. If the state vectors are normalized, then the angle between two state vectors is no longer an approximation of the distance between the two state vectors, but rather is an exact measure.

The functions $g_k$ are analogous to step functions, and in the limit (of refinements of the topology) the functions are continuous. Continuous functions preserve local topology; i.e., "close things" in S map to "close things" in $\mathbb{R}^k$, and "far things" in S tend to map to "far things" in $\mathbb{R}^k$.

Example Results

The following example results show state vectors φ(s) using chain 905 as function $g_1$, chain 910 as function $g_2$, and so on through chain 930 as function $g_8$.

φ("boy") ⇒⟨3/4, 5/7, 4/5, 3/4, 7/9, 5/6, 1, 6/7⟩

φ("dust") ⇒⟨3/8, 3/7, 3/10, 1, 1/9, 0, 0, 0⟩

φ("iguana") ⇒⟨1/2, 1, 1/2, 3/4, 5/9, 0, 0, 0⟩

φ("woman") ⇒⟨7/8, 5/7, 9/10, 3/4, 8/9, 2/3, 5/7, 5/7⟩

φ("man") ⇒⟨1, 5/7, 1, 3/4, 1, 1, 5/7, 5/7⟩

Using these state vectors, the distances between concepts and the angles subtended between the state vectors are as follows:

| Pairs of Concepts | Distance (Euclidean) | Angle Subtended |
|---|---|---|
| "boy" and "dust" | ~1.85 | ~52° |
| "boy" and "iguana" | ~1.65 | ~46° |
| "boy" and "woman" | ~0.41 | ~10° |
| "dust" and "iguana" | ~0.80 | ~30° |
| "dust" and "woman" | ~1.68 | ~48° |
| "iguana" and "woman" | ~1.40 | ~39° |
| "man" and "woman" | ~0.39 | ~07° |

From these results, the following comparisons can be seen:
"boy" is closer to "iguana" than to "dust."
"boy" is closer to "iguana" than "woman" is to "dust."
"boy" is much closer to "woman" than to "iguana" or "dust."
"dust" is further from "iguana" than "boy" to "woman" or "man" to "woman."
"woman" is closer to "iguana" than to "dust."
"woman" is closer to "iguana" than "boy" is to "dust."
"man" is closer to "woman" than "boy" is to "woman."
All other tests done to date yield similar results.

Figure 11:
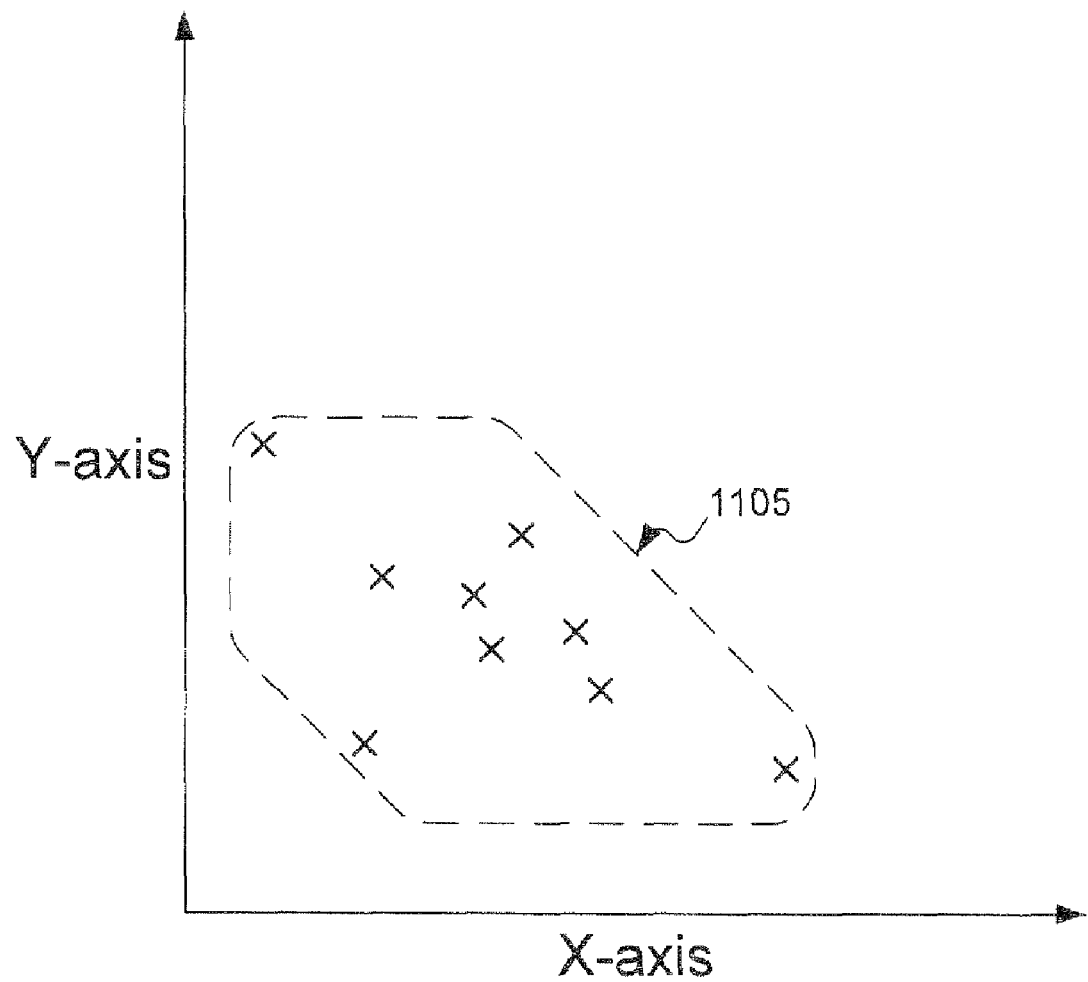
FIG. 11 shows a two-dimensional topological vector space in which state vectors are used to determine a semantic abstract for a document.

FIG. 11 shows a two-dimensional topological vector space in which state vectors are used to construct a semantic abstract for a document. (FIG. 11 and FIGS. 12 and 13 to follow, although accurate representations of a topological vector space, are greatly simplified for example purposes, since most topological vector spaces will have significantly higher dimensions.) In FIG. 11, the "x" symbols locate the heads of state vectors for terms in the document. (For clarity, the line segments from the origin of the topological vector space to the heads of the state vectors are not shown in FIG. 11.) Semantic abstract 1105 includes a set of vectors for the document. As can be seen, most of the state vectors for this document fall within a fairly narrow area of semantic abstract 1105. Only a few outliers fall outside the main part of semantic abstract 1105.

Now that semantic abstracts have been defined, two questions remain: what words are selected to be mapped into state vectors in the semantic abstract, and how is distance measured between semantic abstracts. The first question will be put aside for the moment and returned to later.

Revisiting Semantic Distance

Recall that in the Construction application it was shown that $\mathcal{H}(S)$ is the set of all compact (non-empty) subsets of a metrizable space S. The Hausdorff distance h is defined as follows: Define the pseudo-distance ξ(x, u) between the point x ∈ S and the set u ∈ ℝ(S) as $$\xi(x, u) = \min\{d(x, y): y \in u\}.$$

Using ξ define another pseudo-distance λ(u, v) from the set u ∈ ℋ(S) to the set v ∈ ℋ(S):

$$\lambda(u, v) = \max\{\xi(x, v): x \in u\}.$$

Note that in general it is not true that λ(u, v)=λ(v, u). Finally, define the distance h(u, v) between the two sets u, v ∈ ℋ(S) as $$h(u, v) = \max\{\lambda(u, v), \lambda(v, u)\}.$$

The distance function h is called the Hausdorff distance. Note that $$h(u, v) = h(v, u),$$

$$0 < h(u, v) < \infty \text{ for all } u, v \in \mathcal{H}(S), u \neq v,$$

$$h(u, u) = 0 \text{ for all } u \in \mathcal{H}(S), \text{ and}$$

$$h(u, v) \leq h(u, w) + h(w, v) \text{ for all } u, v, w \in \mathcal{H}(S).$$

Measuring Distance Between Semantic Abstracts

Figure 12:
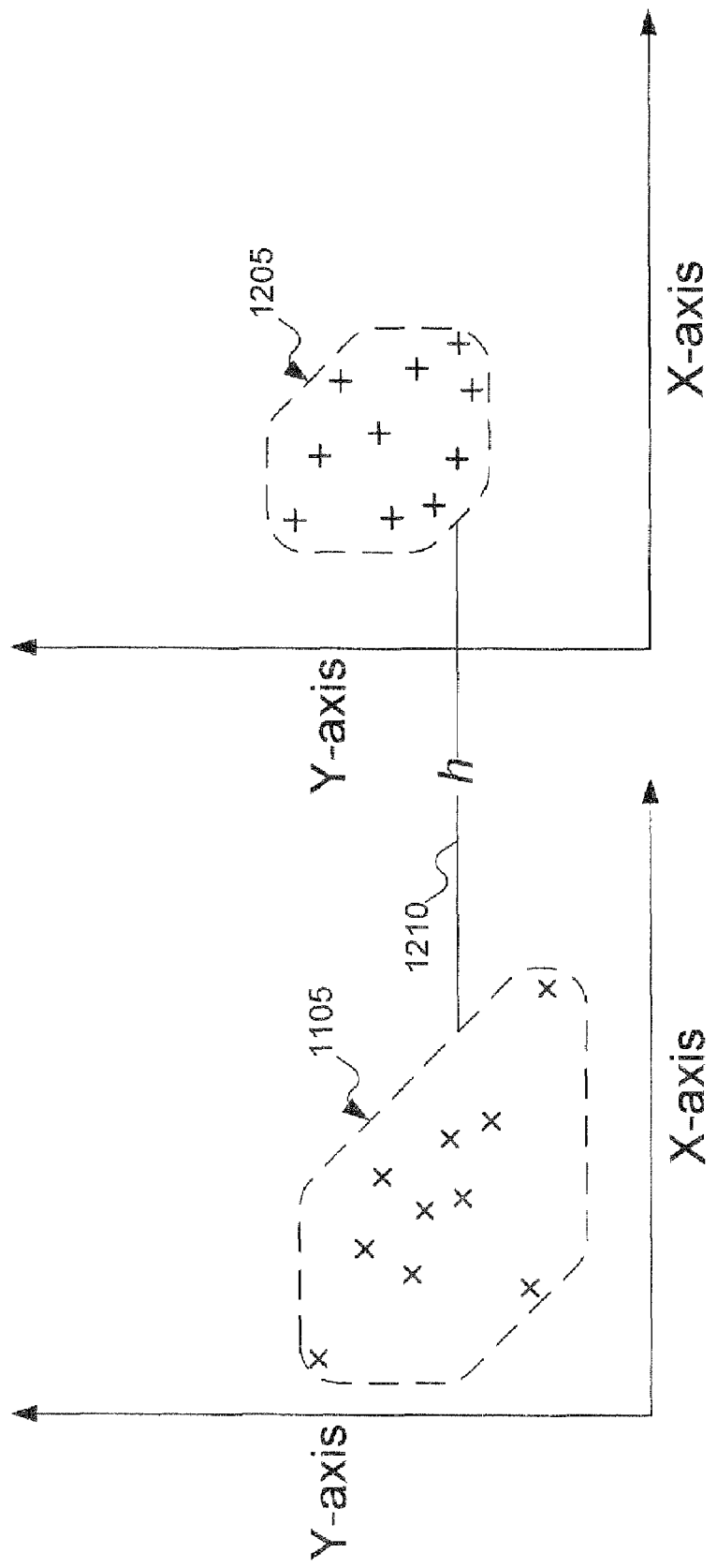
FIG. 12 shows a two-dimensional topological vector space in which semantic abstracts for two documents are compared by measuring the Hausdorff distance between the semantic abstracts.

If ℋ(S) is the topological vector space and u and v are semantic abstracts in the topological vector space, then Hausdorff distance function h provides a measure of the distance between semantic abstracts. FIG. 12 shows a two-dimensional topological vector space in which semantic abstracts for two documents are compared. (To avoid clutter in the drawing, FIG. 12 shows the two semantic abstracts in different graphs of the topological vector space. The reader can imagine the two semantic abstracts as being in the same graph.) In FIG. 12, semantic abstracts 1105 and 1205 are shown. Semantic abstract 1105 can be the semantic abstract for the known document; semantic abstract 1205 can be a semantic abstract for a document that may be similar to the document associated with semantic abstract 1105. Using the Hausdorff distance function h, the distance 1210 between semantic abstracts 1105 and 1205 can be quantified. Distance 1210 can then be compared with a classification scale to determine how similar the two documents are.

Figure 13:
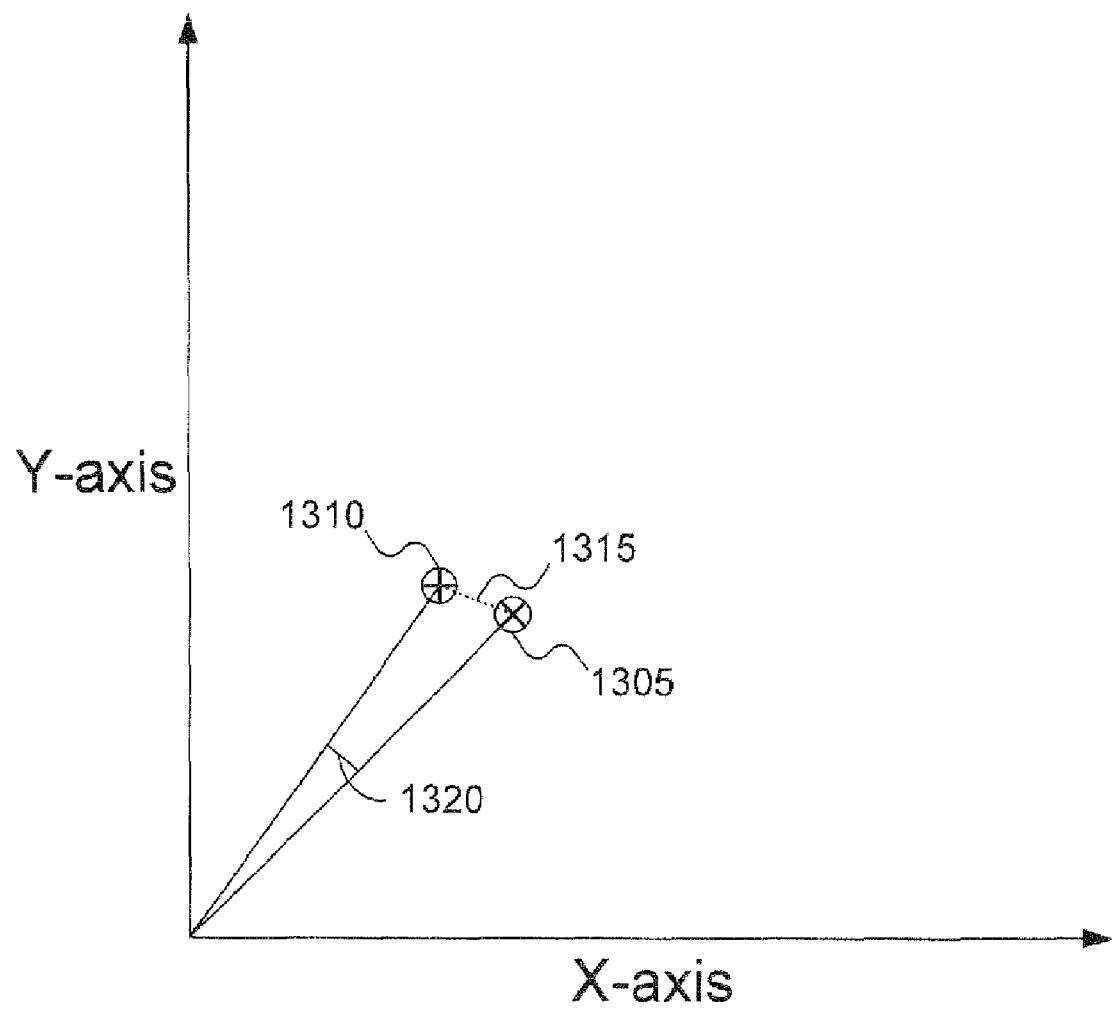
FIG. 13 shows a two-dimensional topological vector space in which the semantic abstracts for the documents of FIG. 12 are compared by measuring the angle and/or distance between centroid vectors for the semantic abstracts.

Although the preferred embodiment uses the Hausdorff distance function h to measure the distance between semantic abstracts, a person skilled in the art will recognize that other distance functions can be used. For example, FIG. 13 shows two alternative distance measures for semantic abstracts. In FIG. 13, the semantic abstracts 1105 and 1205 have been reduced to a single vector. Centroid 1305 is the center of semantic abstract 1105, and centroid 1310 is the center of semantic abstract 1205. (Centroids 1305 and 1310 can be defined using any measure of central tendency.) The distance between centroids 1305 and 1310 can be measured directly as distance 1315, or as angle 1320 between the centroid vectors.

As discussed in the Construction application, different dictionaries and bases can be used to construct the state vectors. It may happen that the state vectors comprising each semantic abstract are generated in different dictionaries or bases and therefore are not directly comparable. But by using a topological vector space transformation, the state vectors for one of the semantic abstracts can be mapped to state vectors in the basis for the other semantic abstract, allowing the distance between the semantic abstracts to be calculated. Alternatively, each semantic abstract can be mapped to a normative, preferred dictionary/basis combination.

Which Words?

Now that the question of measuring distances between semantic abstracts has been addressed, the question of selecting the words to map into state vectors for the semantic abstract can be considered.

In one embodiment, the state vectors in semantic abstract 1105 are generated from all the words in the document. Generally, this embodiment will produce a large and unwieldy set of state vectors. The state vectors included in semantic abstract 1105 can be filtered from the dominant context. A person skilled in the art will recognize several ways in which this filtering can be done. For example, the state vectors that occur with the highest frequency, or with a frequency greater than some threshold frequency, can be selected for semantic abstract 1105. Or those state vectors closest to the center of the set can be selected for semantic abstract 1105. Other filtering methods are also possible. The set of state vectors, after filtering, is called the dominant vectors.

In another embodiment, a phrase extractor is used to examine the document and select words representative of the context of the document. These selected words are called dominant phrases. Typically, each phrase will generate more than one state vector, as there are usually multiple lexemes in each phrase. But if a phrase includes only one lexeme, it will map to a single state vector. The state vectors in semantic abstract 1105 are those corresponding to the selected dominant phrases. The phrase extractor can be a commercially available tool or it can be designed specifically to support the invention. Only its function (and not its implementation) is relevant to this invention. The state vectors corresponding to the dominant phrases are called dominant phrase vectors.

The semantic abstract is related to the level of abstraction used to generate the semantic abstract. A semantic abstract that includes more detail will generally be larger than a semantic abstract that is more general in nature. For example, an abstract that measures to the concept of "person" will be smaller and more abstract than one that measures to "man," "woman," "boy," "girl," etc. By changing the selection of basis vectors and/or dictionary when generating the semantic abstract, the user can control the level of abstraction of the semantic abstract.

Despite the fact that different semantic abstracts can have different levels of codified abstraction, the semantic abstracts can still be compared directly by properly manipulating the dictionary (topology) and basis vectors of each semantic space being used. All that is required is a topological vector space transformation to a common topological vector space. Thus, semantic abstracts that are produced by different authors, mechanisms, dictionaries, etc. yield to comparison via the invention.

Systems for Building and Using Semantic Abstracts

Figure 14:
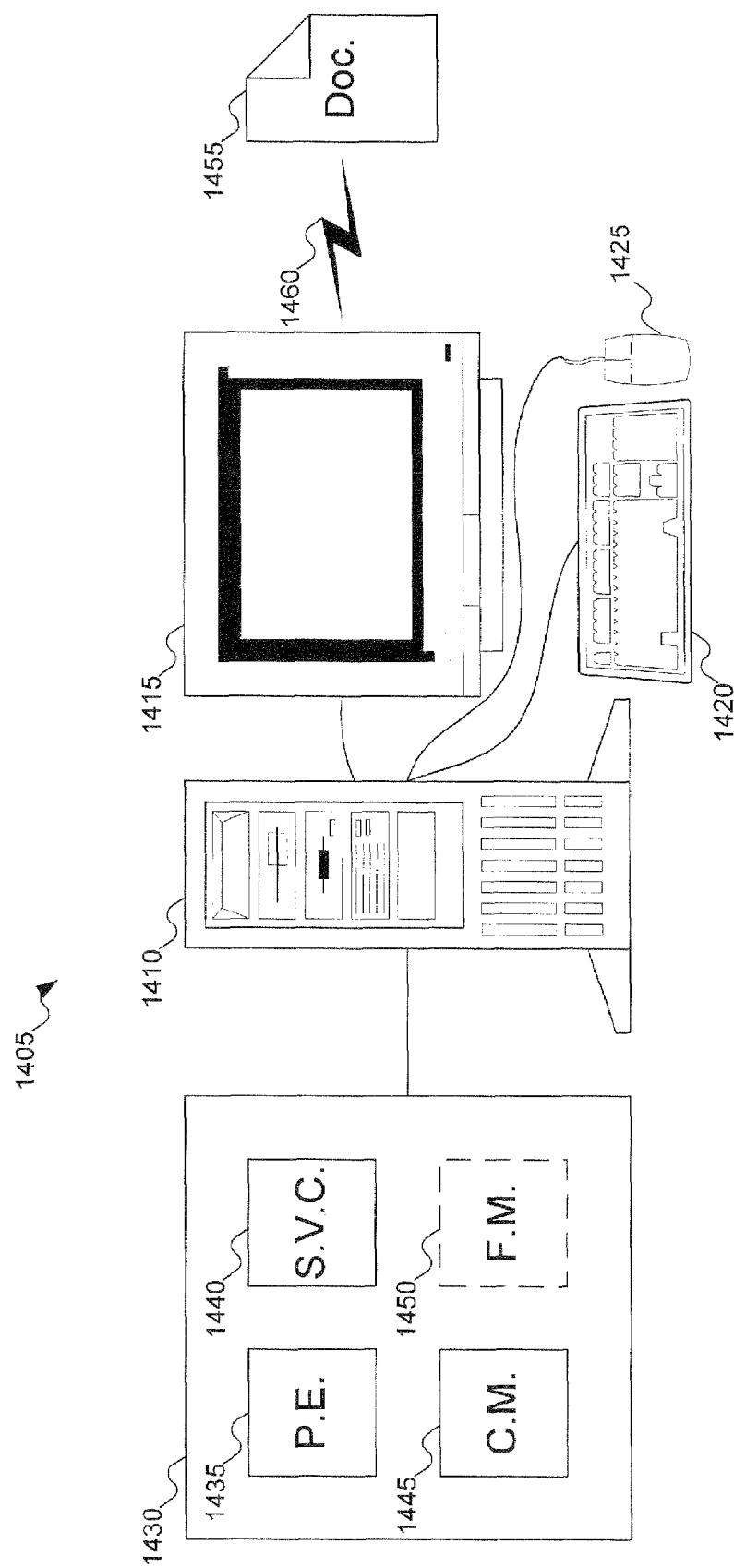
FIG. 14 shows a computer system on which the invention can operate to construct semantic abstracts.

FIG. 14 shows a computer system 1405 on which a method and apparatus for using a multi-dimensional semantic space can operate. Computer system 1405 conventionally includes a computer 1410, a monitor 1415, a keyboard 1420, and a mouse 1425. But computer system 1405 can also be an Internet appliance, lacking monitor 1415, keyboard 1420, or mouse 1425. Optional equipment not shown in FIG. 14 can include a printer and other input/output devices. Also not shown in FIG. 14 are the conventional internal components of computer system 1405: e.g., a central processing unit, memory, file system, etc.

Computer system 1405 further includes software 1430. In FIG. 14, software 1430 includes phrase extractor 1435, state vector constructor 1440, and collection means 1445. Phrase extractor 1435 is used to extract phrases from the document. Phrases can be extracted from the entire document, or from only portions (such as one of the document's abstracts or topic sentences of the document). Phrase extractor 1435 can also be a separate, commercially available piece of software designed to scan a document and determine the dominant phrases within the document. Commercially available phrase extractors can extract phrases describing the document that do not actually appear within the document. The specifics of how phrase extractor 1435 operates are not significant to the invention: only its function is significant. Alternatively, phrase extractor can extract all of the words directly from the document, without attempting to determine the "important" words.

State vector constructor 1440 takes the phrases determined by phrase extractor 1435 and constructs state vectors for the phrases in a topological vector space. Collection means 1445 collects the state vectors and assembles them into a semantic abstract.

Computer system 1405 can also include filtering means 1450. Filtering means 1450 reduces the number of state vectors in the semantic abstract to a more manageable size. In the preferred embodiment, filtering means 1450 produces a model that is distributed similarly to the original state vectors in the topological vector space: that is, the probability distribution function of the filtered semantic abstract should be similar to that of the original set of state vectors.

It is possible to create semantic abstracts using both commercially available phrase extractors and the words of the document. When both sources of phrases are used, filtering means 1450 takes on a slightly different role. First, since there are three sets of state vectors involved (those generated from phrase extractor 1435, those generated from the words of the document, and the final semantic abstract), terminology can be used to distinguish between the two results. As discussed above, the phrases extracted by the commercially available phrase extractor are called dominant phrases, and the state vectors that result from the dominant phrases are called dominant phrase vectors. The state vectors that result from the words of the document are called dominant vectors. Filtering means 1450 takes both the dominant phrase vectors and the dominant vectors, and produces a set of vectors that constitute the semantic abstract for the document. This filtering can be done in several ways. For example, the dominant phrase vectors can be reduced to those vectors with the highest frequency counts within the dominant phrase vectors. The filtering can also reduce the dominant vectors based on the dominant phrase vectors. The dominant vectors and the dominant phrase vectors can also be merged into a single set, and that set reduced to those vectors with the greatest frequency of occurrence. A person skilled in the art will also recognize other ways the filtering can be done.

Although the document operated on by phrase extractor 1435 can be found stored on computer system 1405, this is not required. FIG. 14 shows computer system 1405 accessing document 1455 over network connection 1460. Network connection 1460 can include any kind of network connection. For example, network connection 1460 can enable computer system 1405 to access document 1455 over a local area network (LAN), a wide area network (WAN), a global internetwork, or any other type of network. Similarly, once collected, the semantic abstract can be stored somewhere on computer system 1405, or can be stored elsewhere using network connection 1460.

Figure 15:
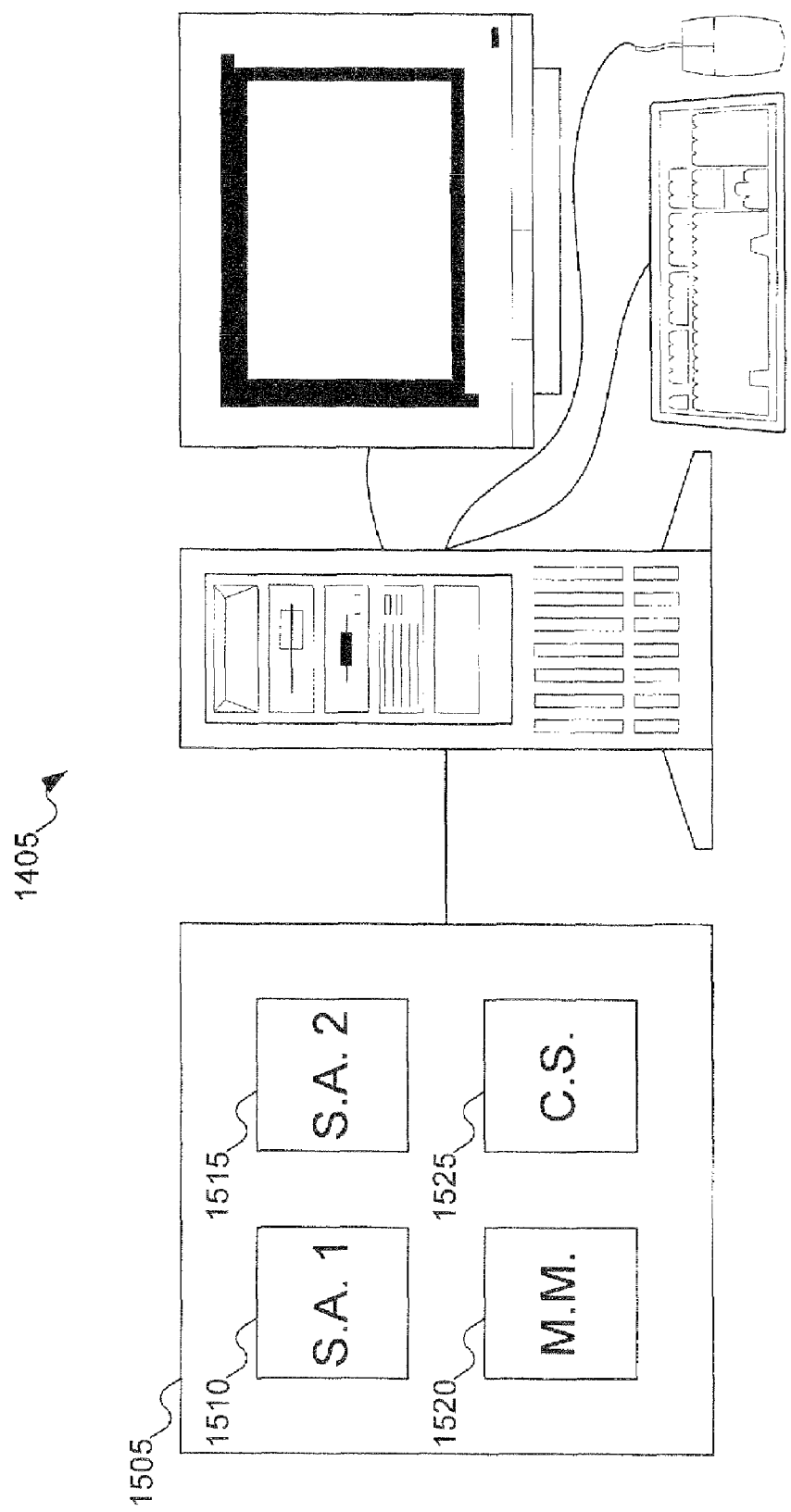
FIG. 15 shows a computer system on which the invention can operate to compare the semantic abstracts of two documents.

FIG. 15 shows computer system 1405 equipped with software 1505 to compare semantic abstracts for two documents. Software 1505 includes semantic abstracts 1510 and 1515 for the two documents being compared, measurement means 1520 to measure the distance between the two semantic abstracts, and classification scale 1525 to determine how "similar" the two semantic abstracts are.

Procedural Implementation

Figure 16:
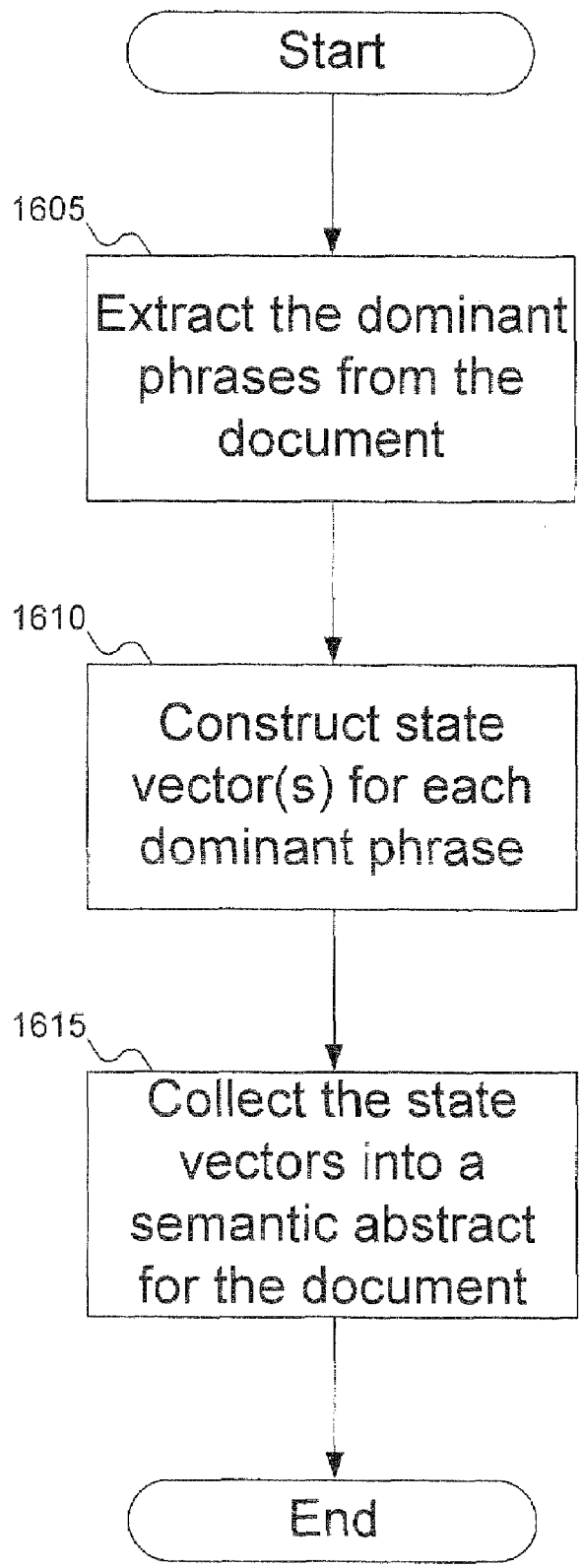
FIG. 16 shows a flowchart of a method to determine a semantic abstract for a document in the system of FIG. 14 by extracting the dominant phrases from the document.

FIG. 16 is a flowchart of a method to construct a semantic abstract for a document in the system of FIG. 14 based on the dominant phrase vectors. At step 1605, phrases (the dominant phrases) are extracted from the document. As discussed above, the phrases can be extracted from the document using a phrase extractor. At step 1610, state vectors (the dominant phrase vectors) are constructed for each phrase extracted from the document. As discussed above, there can be more than one state vector for each dominant phrase. At step 1615, the state vectors are collected into a semantic abstract for the document.

Note that phrase extraction (step 1605) can be done at any time before the dominant phrase vectors are generated. For example, phrase extraction can be done when the author generates the document. In fact, once the dominant phrases have been extracted from the document, creating the dominant phrase vectors does not require access to the document at all. If the dominant phrases are provided, the dominant phrase vectors can be constructed without any access to the original document.

Figure 17:
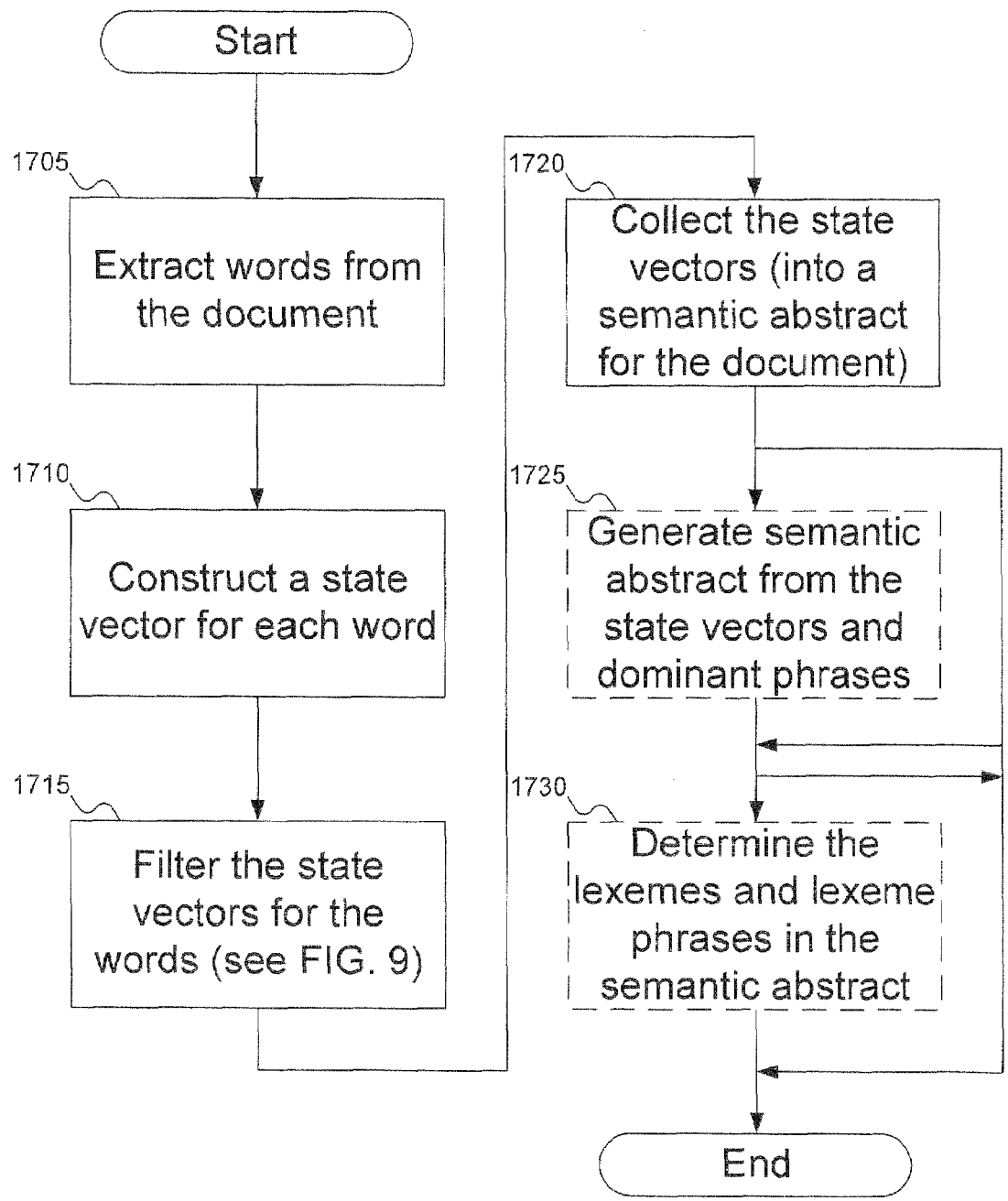
FIG. 17 shows a flowchart of a method to determine a semantic abstract for a document in the system of FIG. 14 by determining the dominant context of the document.

FIG. 17 is a flowchart of a method to construct a semantic abstract for a document in the system of FIG. 14 based on the dominant vectors. At step 1705, words are extracted from the document. As discussed above, the words can be extracted from the entire document or only portions of the document (such as one of the abstracts of the document or the topic sentences of the document). At step 1710, a state vector is constructed for each word extracted from the document. At step 1715, the state vectors are filtered to reduce the size of the resulting set, producing the dominant vectors. Finally, at step 1720, the filtered state vectors are collected into a semantic abstract for the document.

As also shown in FIG. 17, two additional steps are possible, and are included in the preferred embodiment. At step 1725, the semantic abstract is generated from both the dominant vectors and the dominant phrase vectors. As discussed above, the semantic abstract can be generated by filtering the dominant vectors based on the dominant phrase vectors, by filtering the dominant phrase vectors based on the dominant vectors, or by combining the dominant vectors and the dominant phrase vectors in some way. Finally, at step 1730, the lexeme and lexeme phrases corresponding to the state vectors in the semantic abstract are determined. Since each state vector corresponds to a single lexeme or lexeme phrase in the dictionary used, this association is easily accomplished.

As discussed above regarding phrase extraction in FIG. 16, the dominant vectors and the dominant phrase vectors can be generated at any time before the semantic abstract is created. Once the dominant vectors and dominant phrase vectors are created, the original document is not required to construct the semantic abstract.

Figure 18:
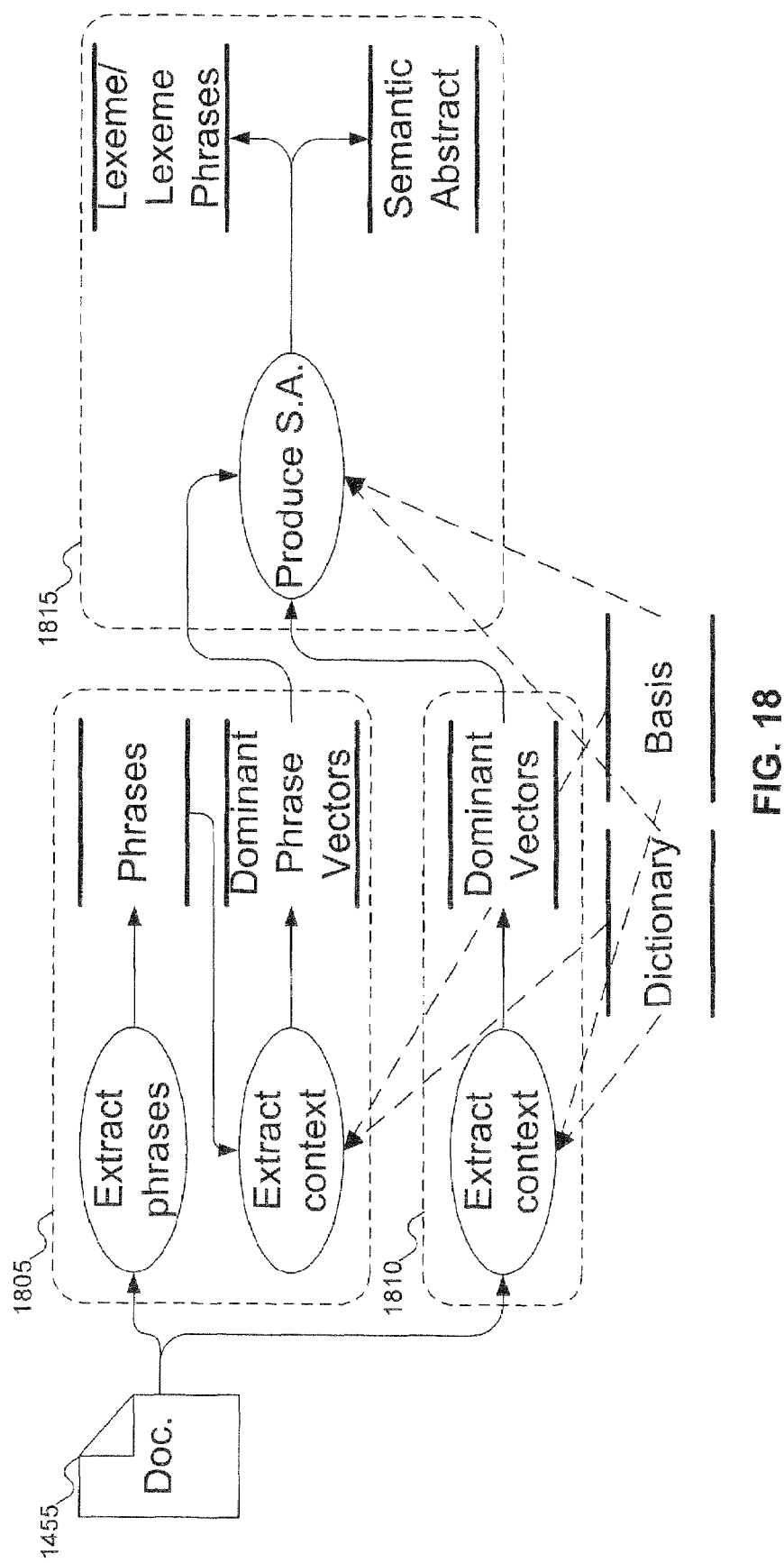
FIG. 18 shows a dataflow diagram for the creation of a semantic abstract as described in FIG. 7.

FIG. 18 shows a dataflow diagram showing how the flowcharts of FIGS. 16 and 17 operate on document 1455. Operation 1805 corresponds to FIG. 16. Phrases are extracted from document 1455, which are then processed into dominant phrase vectors. Operation 1810 corresponds to steps 1705, 1710, and 1715 from FIG. 17. Words in document 1455 are converted and filtered into dominant vectors. Finally, operation 1815 corresponds to steps 1720, 1725, and 1730 of FIG. 17. The dominant phrase vectors and dominant vectors are used to produce the semantic abstract and the corresponding lexemes and lexeme phrases.

Figure 19:
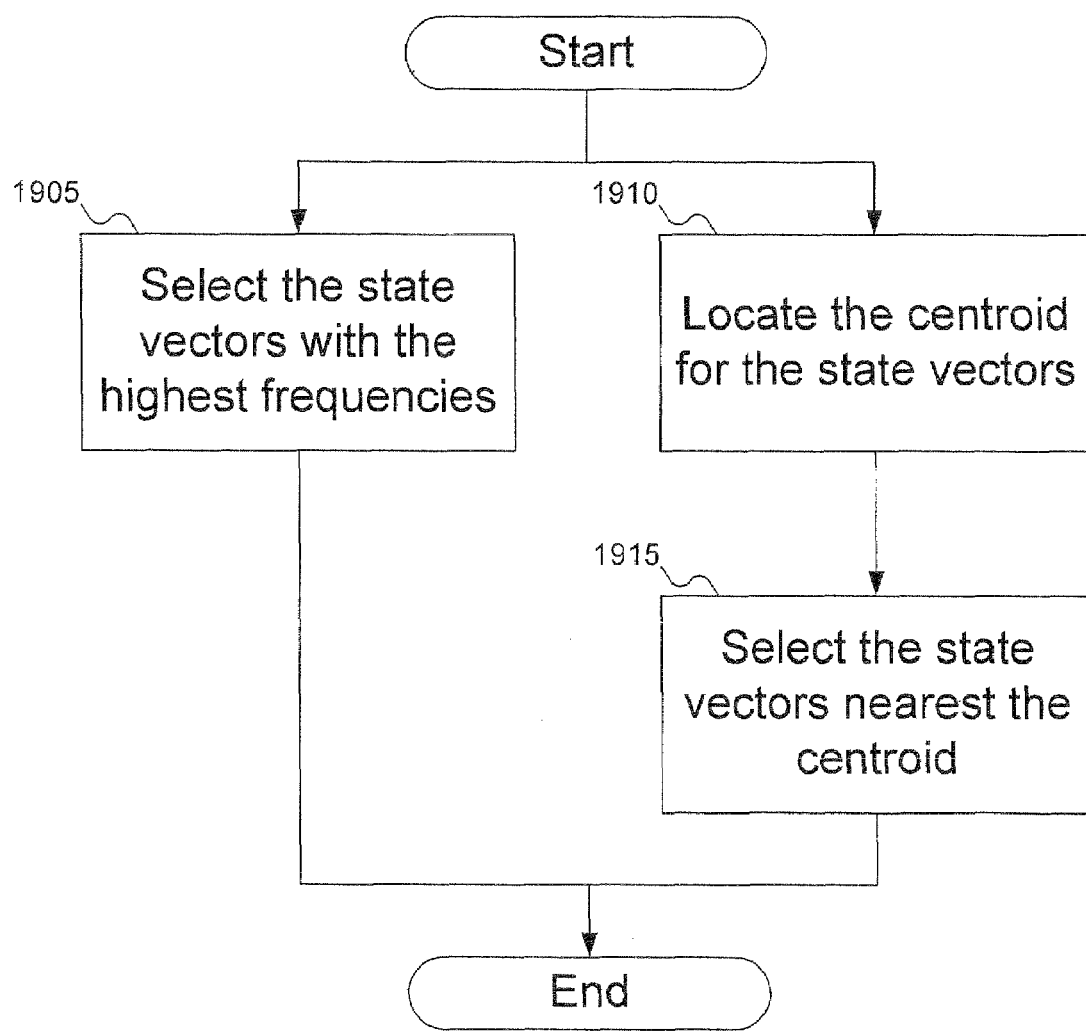
FIG. 19 shows a flowchart showing detail of how the filtering step of FIG. 17 can be performed.

FIG. 19 shows more detail as to how the dominant vectors are filtered in step 1715 of FIG. 17. As shown by step 1905, the state vectors with the highest frequencies can be selected. Alternatively, as shown by steps 1910 and 1915, the centroid of the set of state vectors can be located, and the vectors closest to the centroid can be selected. (As discussed above, any measure of central tendency can be used to locate the centroid.) A person skilled in the art will also recognize other ways the filtering can be performed.

Figure 20:
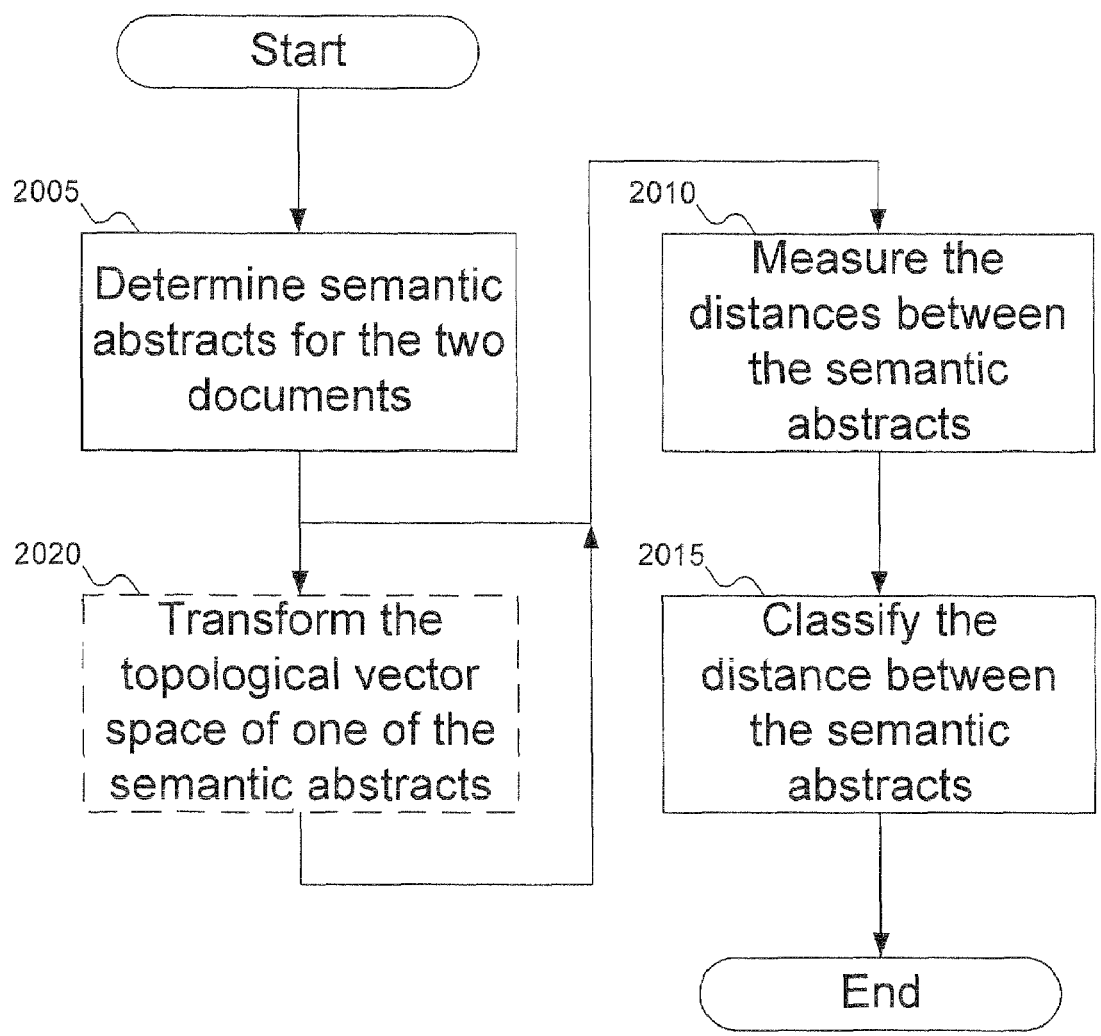
FIG. 20 shows a flowchart of a method to compare two semantic abstracts in the system of FIG. 15.

FIG. 20 is a flowchart of a method to compare two semantic abstracts in the system of FIG. 15. At step 2005 the semantic abstracts for the documents are determined. At step 2010, the distance between the semantic abstracts is measured. As discussed above, distance can be measured using the Hausdorff distance function h. Alternatively, the centroids of the semantic abstracts can be determined and the distance or angle measured between the centroid vectors. Finally, at step 2015, the distance between the state vectors is used with a classification scale to determine how closely related the contents of the documents are.

As discussed above, the state vectors may have been generated using different dictionaries or bases. In that case, the state vectors cannot be compared without a topological vector space transformation. This is shown in step 2020. After the semantic abstracts have been determined and before the distance between them is calculated, a topological vector space transformation can be performed to enable comparison of the semantic abstracts. One of the semantic abstracts can be transformed to the topological vector space of the other semantic abstract, or both semantic abstracts can be transformed to a normative, preferred basis.

Figure 21:
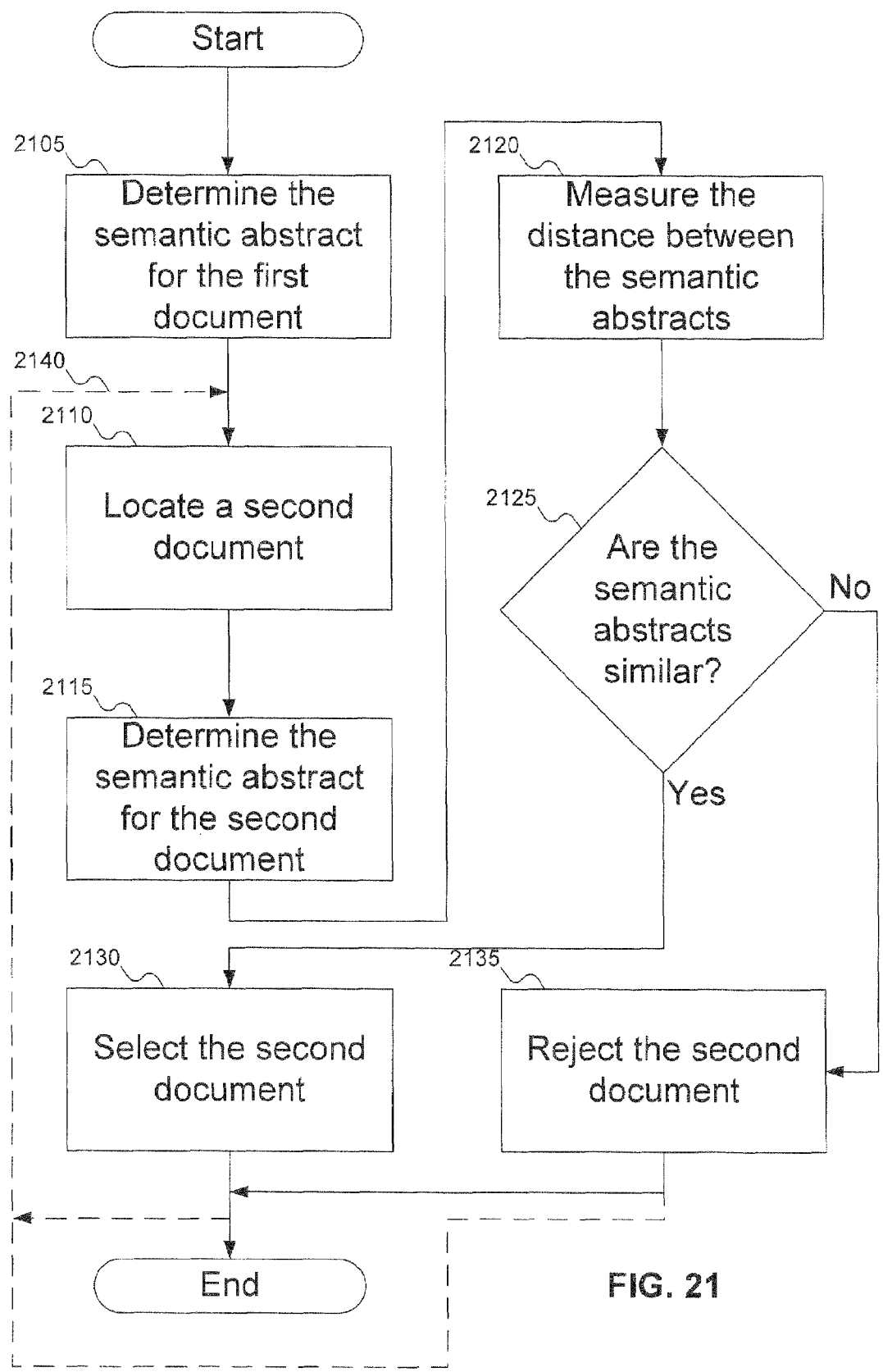
FIG. 21 shows a flowchart of a method in the system of FIG. 14 to locate a document with content similar to a given document by comparing the semantic abstracts of the two documents in a topological vector space.

FIG. 21 is a flowchart of a method to search for documents with semantic abstracts similar to a given document in the system of FIG. 15. At step 2105, the semantic abstract for the given document is determined. At step 2110, a second document is located. At step 2115, a semantic abstract is determined for the second document. At step 2120, the distance between the semantic abstracts is measured. As discussed above, the distance is preferably measured using the Hausdorff distance function h, but other distance functions can be used. At step 2125, the distance between the semantic abstracts is used to determine if the documents are similar. If the semantic abstracts are similar, then at step 2130 the second document is selected. Otherwise, at step 2135 the second document is rejected.

Whether the second document is selected or rejected, the process can end at this point. Alternatively, the search can continue by returning to step 2110, as shown by dashed line 2140. If the second document is selected, the distance between the given and second documents can be preserved. The preserved distance can be used to rank all the selected documents, or it can be used to filter the number of selected documents. A person skilled in the art will also recognize other uses for the preserved distance.

Note that, once the semantic abstract is generated, it can be separated from the document. Thus, in FIG. 21, step 2105 may simply include loading the saved semantic abstract. The document itself may not have been loaded or even may not be locatable. FIG. 22 shows saved semantic abstract 2205 for a document. In FIG. 22, semantic abstract 2205 is saved; the semantic abstract can be saved in other formats (including proprietary formats). Semantic abstract 2205 includes document reference 2210 from which the semantic abstract was generated, vectors 2215 comprising the semantic abstract, and dictionary reference 2220 and basis reference 2225 used to generate vectors 2215. Document reference 2210 can be omitted when the originating document is not known.

FIG. 23 shows document search request 2305. Document search request 2305 shows how a search for documents with content similar to a given document can be formed. Document search request 2305 is formed using HTTP, but other formats can be used. Document search request 2305 includes list 2310 of documents to search, vectors 2315 forming the semantic abstract, dictionary reference 2320 and basis reference 2325 used to generate vectors 2315, and acceptable distances 2330 for similar documents. Note that acceptable distances 2330 includes both minimum and maximum acceptable distances. But a person skilled in the art will recognize that only a minimum or maximum distance is necessary, not both.

Figure 24:
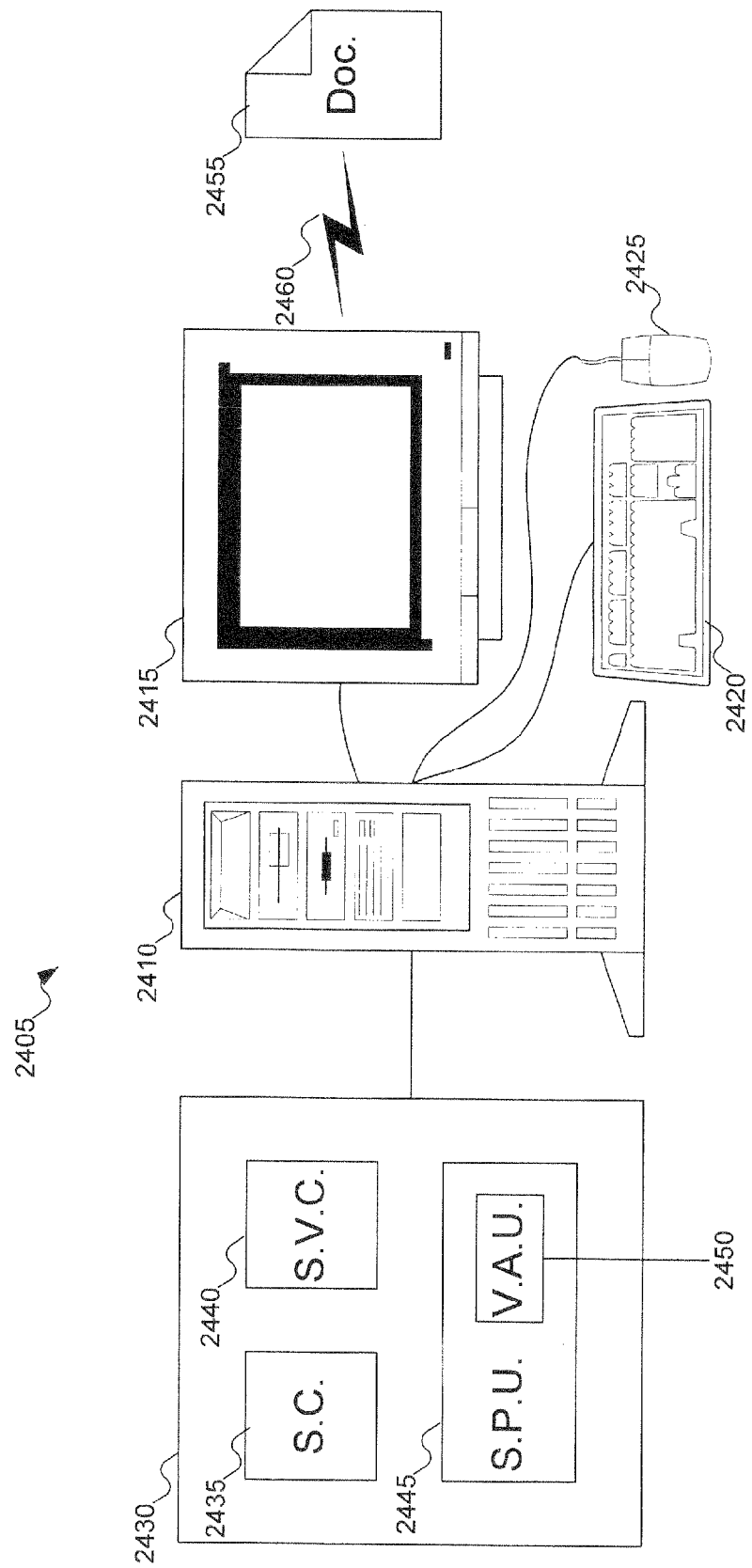
FIG. 24 shows a computer system on which the invention can operate to construct a single vector semantic abstract.

FIG. 24 shows a computer system 2405 on which a method and apparatus for using a multi-dimensional semantic space can operate. Computer system 2405 conventionally includes a computer 2410, a monitor 2415, a keyboard 2420, and a mouse 2425. Optional equipment not shown in FIG. 24 can include a printer and other input/output devices. Also not shown in FIG. 24 are the conventional internal components of computer system 2405: e.g., a central processing unit, memory, file system, etc.

Computer system 2405 further includes software 2430. In FIG. 24, software 2430 includes semantic content 2435, state vector constructor 2440, and superposition unit 2445. State vector constructor 2440 takes lexemes and lexeme phrases from semantic content 2435 and constructs state vectors for the lexemes/lexeme phrases in a topological vector space. Superposition unit 2445 takes the state vectors constructed by state vector constructor 2440 and superpositions them into a single vector for the semantic abstract. In the preferred embodiment, superposition unit 2445 includes vector algebra unit 2450. Vector algebra unit 2450 adds the state vectors together to construct the single vector for the semantic abstract.

Although the above description of software 2430 creates a single vector from state vectors in the topological vector space, the state vectors can be divided into groups, or clumps. This produces a minimal set of state vectors, as opposed to a single vector, which avoids distant lexemes/lexeme phrases from being superpositioned and losing too much context.

Figure 29:
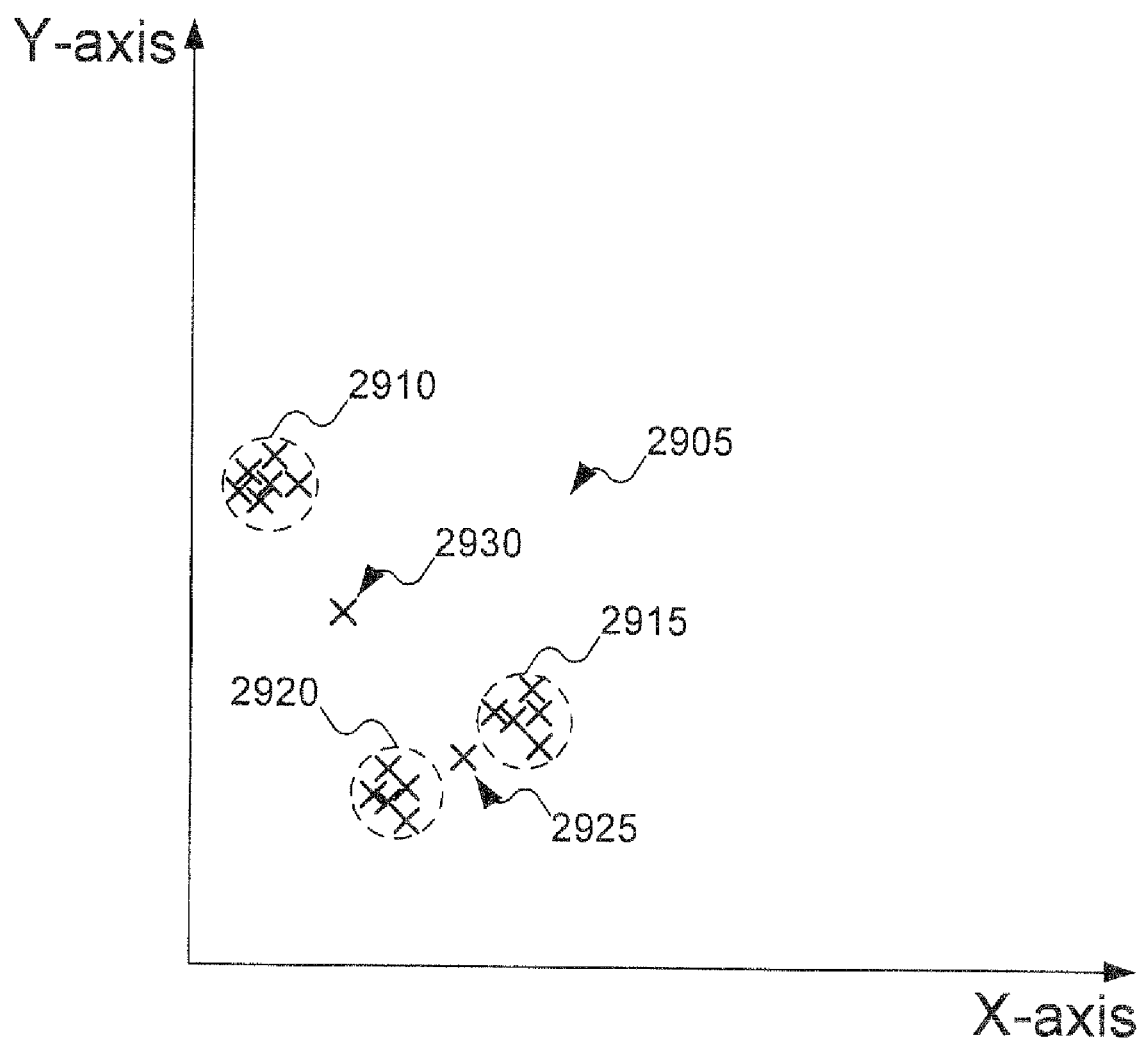
FIG. 29 shows a two-dimensional topological vector space in which state vectors have been clumped.

In the preferred embodiment, clumps are located by performing vector quantization, which determines a distance between each pair of state vectors; vectors sufficiently close to each other can then be clumped together. For example, a vector can be determined to be in a clump if its distance is no greater than a threshold distance to any other vector in the clump. FIG. 29 shows a two-dimensional topological vector space in which state vectors have been clumped. In FIG. 29, state vectors 2905 have been grouped into three clumps 2910, 2915, and 2920. The state vectors in each of clumps 2910, 2915, and 2920 can then be superpositioned as described below, and the resulting three vectors grouped into a semantic abstract. Note that, in FIG. 29, not every state vector is part of a clump. For example, state vector 2925, although close to vectors in both of clumps 2915 and 2920, is not sufficiently close to all of the vectors in either clump, and is excluded from both. Similarly, vector 2930 is too far from any clump to be included, and is excluded from all clumps.

A person skilled in the art will recognize that other techniques can be used to locate clumps: for example, by dividing the vectors in groups so that each vector in a particular group has an angle within a certain range. The remainder of this invention description assumes that the state vectors form only a single clump and vector quantization is not required; a person skilled in the art will recognize how the invention can be modified when vector quantization is used.

Although the document from which semantic content 2435 is determined can be found stored on computer system 2405, this is not required. FIG. 24 shows computer system 2405 accessing document 2455 over network connection 2460. Network connection 2460 can include any kind of network connection. For example, network connection 2460 can enable computer system 2405 to access document 2455 over a local area network (LAN), a wide area network (WAN), a global internetwork, a wireless network or broadcast network, or any other type of network. Similarly, once collected, the semantic abstract can be stored somewhere on computer system 2405, or can be stored elsewhere using network connection 2460.

Figure 25:
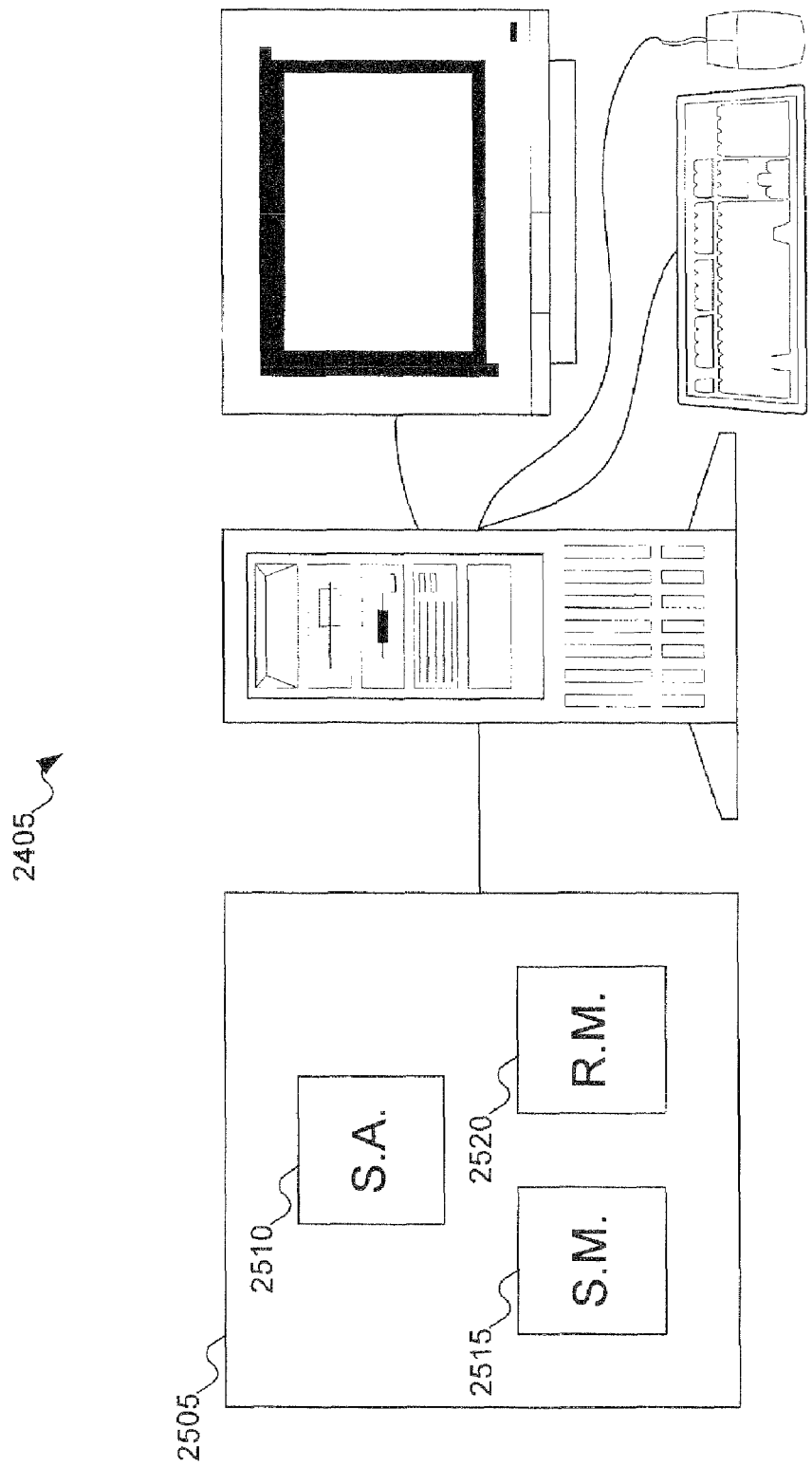
FIG. 25 shows a computer system on which the invention can operate to search for documents with content similar to a given semantic abstract.

FIG. 25 shows computer system 2405 programmed with a different software package. In FIG. 25, computer system 2405 includes software 2505 to use semantic abstract 2510 to find documents with similar content. Search means 2515 searches the topological vector space for documents with semantic abstracts that are "similar" to semantic abstract 2510. In the preferred embodiment, search means 2515 is implemented as software to query the vector space for semantic abstracts close to the single vector in semantic abstract 2510. What semantic abstracts qualify as "similar" to a given semantic abstract will be revisited with reference to FIG. 27 below. Retrieval means 2520 retrieves the documents with semantic abstracts in the topological vector space similar to semantic abstract 2510.

On the Meaning of the Meaning of Meaning

Recall the definition of a vector space. A nonempty set V is said to be a vector space over a field F if V is an abelian group under an operation denoted by +, and if for every $\alpha, \beta \in F$, $v, w \in V$ the following are satisfied:

$$\alpha(v+w) = \alpha v + \alpha w$$

$$(\alpha+\beta)v = \beta v + \beta v$$

$$\alpha(\beta v) = (\alpha\beta)v$$

$$1v = v$$

where "1" represents the unit element of F under multiplication.

As shown in co-pending U.S. patent application Ser. No. 11/562,337, titled "CONSTRUCTION, MANIPULATION, AND COMPARISON OF A MULTI-DIMENSIONAL SEMANTIC SPACE," filed Nov. 21, 2006, a set S of lexemes can be represented as a vector space. This representation is accomplished by introducing a topology $\tau$ on S that is compatible with the sense of the lexemes, building a directed set from the lexemes, and then (given the separation axioms) showing an explicit one-to-one, continuous, open mapping $\theta$ from S to a subspace of the Hilbert coordinate space—a defacto vector space. This open mapping $\theta$ is continuous and open with respect to $\tau$, of course.

How is $\theta$ expressed? By the coordinate functions $g_k: S \Rightarrow I^1$. And how are the $g_k$ defined? By applying Urysohn's lemma to the $k^{th}$ chain of the directed set, where A={S–root}, B=$\overline{n_m}$ (the closure of the minimal node of the chain), and the intermediate nodes of the chain take the role of the separating sets (used to define the function predicted by Urysohn's lemma) C(r/2″), U(r/2″). (Of course in practice the continuous functions $g_k$ can only be approximated with step functions, the resolution being constrained by the chain length.) In other words, the $k^{th}$ chain provides a natural mechanism for defining $g_k$. Or to put it another way the $k^{th}$ chain identifies $g_k$.

As is well known, functions that are nicely behaved can form a vector space, and it so happens that step functions are very well behaved indeed. Consider the vector space Q spanned by the coordinate functions $g_k$, where $q \in Q$ is of the form $\Sigma \lambda_k g_k$, $\lambda_k \in \mathbb{R}$ (the real numbers). Define an inner product on Q, of the form $\langle q_1, q_2 \rangle = \int q_1 \cdot q_2$, where it is understood that we integrate over S in a topologically consistent manner.

Given an inner product space Q, Q is a function space. In fact, Q is the function space spanned by the functions $g_k$. The functions $g_k$ are defined by their corresponding chains. In fact the $k^{th}$ chain uniquely identifies $g_k$, so that $\{g_k\}$ is more than simply a spanning set; it is a basis of Q.

Having built the metric space Q in such a way as to entail the topology on S, the next step is to coherently leverage S into a metric space via Q's structure. With the two metrics (of S and Q) commensurable, the goal of quantifying the notion of near and far in S will be accomplished.

By definition, if V is a vector space then its dual space is Hom(V, F). Hom(V, F) is the set of all vector space homomorphisms of V into F, also known as the space of linear functionals. So, the dual of Q (i.e., Hom(Q, $\mathbb{R}$)) is a function space on a function space.

Now, consider that for any $s \in S$, the function $\epsilon_s$ associates the function $g_k$ with an element of the real field: $\epsilon_s(g_k) = g_k(s)$. A simple check shows linearity, i.e., $\epsilon_s(g_k + g_n) = (g_k + g_n)(s) = g_k(s) + g_n(s) = \epsilon_s(g_k) + \epsilon_s(g_n)$. The reader can similarly verify scalar multiplication. So, what does this show? It shows that every element of S corresponds to an element of the dual of Q. The notations $\epsilon_s(g_k)$ and $s(g_k)$ are used interchangeably.

Now the notion of the dual of Q is "properly restricted" (limited to a proper subspace) to those linear functionals in the span of S: $\Sigma \lambda_k s_k$, $\lambda_k \in \mathbb{R}$, where it is understood that $(\lambda_i s_i + \lambda_j s_j) g_k = \lambda_i s_i (g_k) + \lambda_j s_j (g_k)$. When properly restricted, it can be shown that Q and its dual are isomorphic. Indeed, for the finite dimensional case it is very easy to prove that a vector space and its dual are isomorphic. So the dimension of the dual space of Q—i.e., the dimension of the space spanned by S in its new role as a set of linear functionals—is equal to the dimension of Q. And what does the linear functional s "look" like? Well, s is the linear functional that maps $g_1$ to $g_1(s)$, $g_2$ to $g_2(s)$, ... and $g_k$ to $g_k(s)$. In other words, metrized $s = (g_1(s), g_2(s), \ldots g_k(s), \ldots)$. This last expression is nothing more or less than the result of the Construction application. But notice: deriving the result this way requires constructing the dual of Q, characterized as $\Sigma \lambda_k s_k$, $\lambda \in \mathbb{R}$, $s \in S$. In other words, the expression $(\lambda_i s_j + \lambda_j s_j)$ now has meaning in a way that is consistent with the original topology $\tau$ defined on S. The last statement above is the keystone for much that is to be developed below.

The point of all this discussion is that simple algebraic operations on the elements of S, namely vector addition and scalar multiplication, can be confidently done.

On the Plausibility of the Norm $\|q\| = \int |q|$

A general line of attack to show that the metrics of S and Q are commensurable is to look for a norm on Q: a norm defined by the notion of the integral $\int |q|$ with respect to the topology $\tau$ on S. To firm up this notion, consider the following points:

Do the elements of $Q = \{q: S \to R, q = \Sigma \lambda_k g_k\}$ have compact support: that is, do the elements of Q map to a non-zero value in R? Yes, because $g_k$ is presumably continuous and open in some extension S' of S and some refinement $\tau'$ of $\tau$; S' being some kind of ultimate lexicon.

Is $\epsilon_s$ a positive Radon measure (a measure from utility theory)? Yes. Informally, one might consider any sequence of compact sets $C_k$ where $\cap_k = s$, where s is interior to $C_k$. The characteristic functions $X_{C_k}$ converge weakly (in the dual):

$$\varepsilon_s(q) = \lim_{k \to \infty} q(s) X_{C_k}(s).$$

The linear form $\epsilon_s$ is often called the Dirac measure at the point s. Note that we have implicitly adopted the premise that S is locally compact.

Given a positive Radon measure $\mu$ on S, $\mu$ can be extended to the upper integral $\mu^*$ for positive functions on S. This leads to the definition of a semi-norm for functions on S, which in turn leads to the space $\mathcal{L}^1(S, \mu)$ (by completing Q with respect to the semi-norm). The norm on $\mathcal{L}^1(S, \mu)$ then reflects back (via duality) into S as $\|s\|=\lim \int |q \, X_{Ck}|$.

Note that if Q is convex, then S spans a set that sits on the convex hull of Q, just as one would expect that the so-called "pure" states should.

The point of all this discussion is that simple algebraic operations on the elements of S that are metric preserving can now be confidently performed: namely vector addition and scalar multiplication.

On the Nature of the Elements of S

Consider the lexemes $s_i$="mother" and $s_j$="father." What is $(s_i+s_j)$? And in what sense is this sum compatible with the original topology $\tau$?

$(s_i+s_j)$ is a vector that is very nearly co-linear with $s_n$="parent," and indeed "parent" is an element (of the dual of Q) that is entailed by both "mother" and "father." One might say that $s_n$ carries the potential to be instantiated as either $s_i$ or $s_j$. Viewing the elements of S as state vectors, and adducing from this (and other examples), it becomes apparent that vector addition can be interpreted as corresponding to a superposition of states.

While the vector sum "mother" +"father" intuitively translates to the concept of "parent," other vector sums are less intuitively meaningful. Nevertheless, vector summation still operates to combine the vectors. What is "human"+"bird". How about "turtle"+"electorate"? Even though these vector sums do not translate to a known concept in the dictionary, if the object is to combine the indicated vectors, superposition operates correctly.

Consider the (preliminary) proposition that the sum of two state vectors corresponds to the superposition of the states of the addends. If state vector addition corresponds to superposition of states, the question then naturally comes to mind, "What happens when we superpose a state with itself?" Ockham's razor suggests that the result of such an operation should yield the same state. From this we conjecture that if a state vector corresponding to a state is multiplied by any non-zero scalar, the resulting state vector represents the same state. Put more succinctly, semantic state is entailed in the direction of the state vector.

Determining Semantic Abstracts

Figure 26:
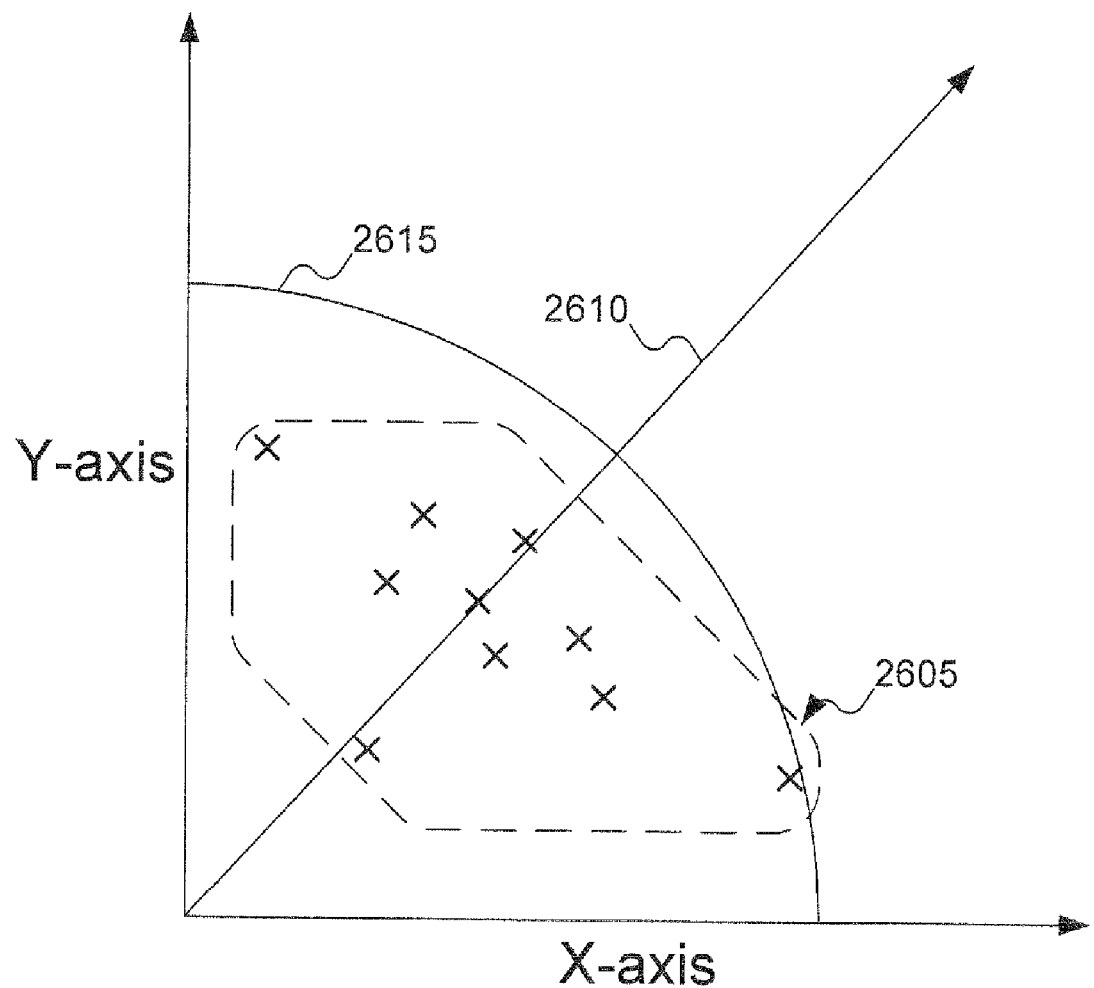
FIG. 26 shows a two-dimensional topological vector space in which state vectors are used to determine a semantic abstract for a document.

Now that superposition of state vectors has been shown to be feasible, one can construct semantic abstracts representing the content of the document as a vector within the topological vector space. FIG. 26 shows a two-dimensional topological vector space in which state vectors are used to determine a semantic abstract for a document. (FIG. 26 and FIG. 27 to follow, although accurate representations of a topological vector space, are greatly simplified for example purposes, since most topological vector spaces will have significantly higher dimensions.) In FIG. 26, the "x" symbols locate the heads of state vectors for terms in the document. (For clarity, the line segments from the origin of the topological vector space to the heads of the state vectors are eliminated.) Most of the state vectors for this document fall within a fairly narrow area of semantic content 2605 in the topological vector space. Only a few outliers fall outside the core of semantic content 2605.

The state vectors in semantic content 2605 are superpositioned to form the semantic abstract. By taking the vector sum of the collected state vectors (the state vectors within semantic content 2605), a single state vector 2610 can be calculated as the semantic abstract.

Unit circle 2615 marks all the points in the topological vector space that are a unit distance from the origin of the topological vector space. (In higher dimensional topological vector spaces, unit circle 2615 becomes a unit hyper-sphere.) State vector 2610 can be normalized to a unit distance (i.e., the intersection of state vector 2610 and unit circle 2615).

Normalizing state vector 2610 takes advantage of the (above-discussed) fact that semantic state is indicated by vector direction, and can compensate for the size of semantic content 2605 used to construct state vector 2610. One way to normalize state vector 2610 is to divide the vector by its length: that is, if v is a state vector, $v/\|v\|$ is the unit vector in the direction of v.

Measuring Distance Between State Vectors

As discussed above, semantic state is entailed by the direction of the state vector. This makes sense, as the vector sum of a state with itself should still be the same state. It therefore makes the most sense to measure the distance between semantic abstract state vectors through the angle between the state vectors. In the preferred embodiment, distance is measured as the angle between the state vectors.

Distance can be measured as the distance between the heads of the state vectors. But recall that changing the length of two state vectors will change the distance between their heads. Since semantic state is entailed by the direction of the state vector, state vectors can be normalized without affecting their states before measuring distance as the difference of state vectors. Normalizing the state vectors allows a given distance between vectors to have a consistent meaning across different bases and state vectors.

Figure 27:
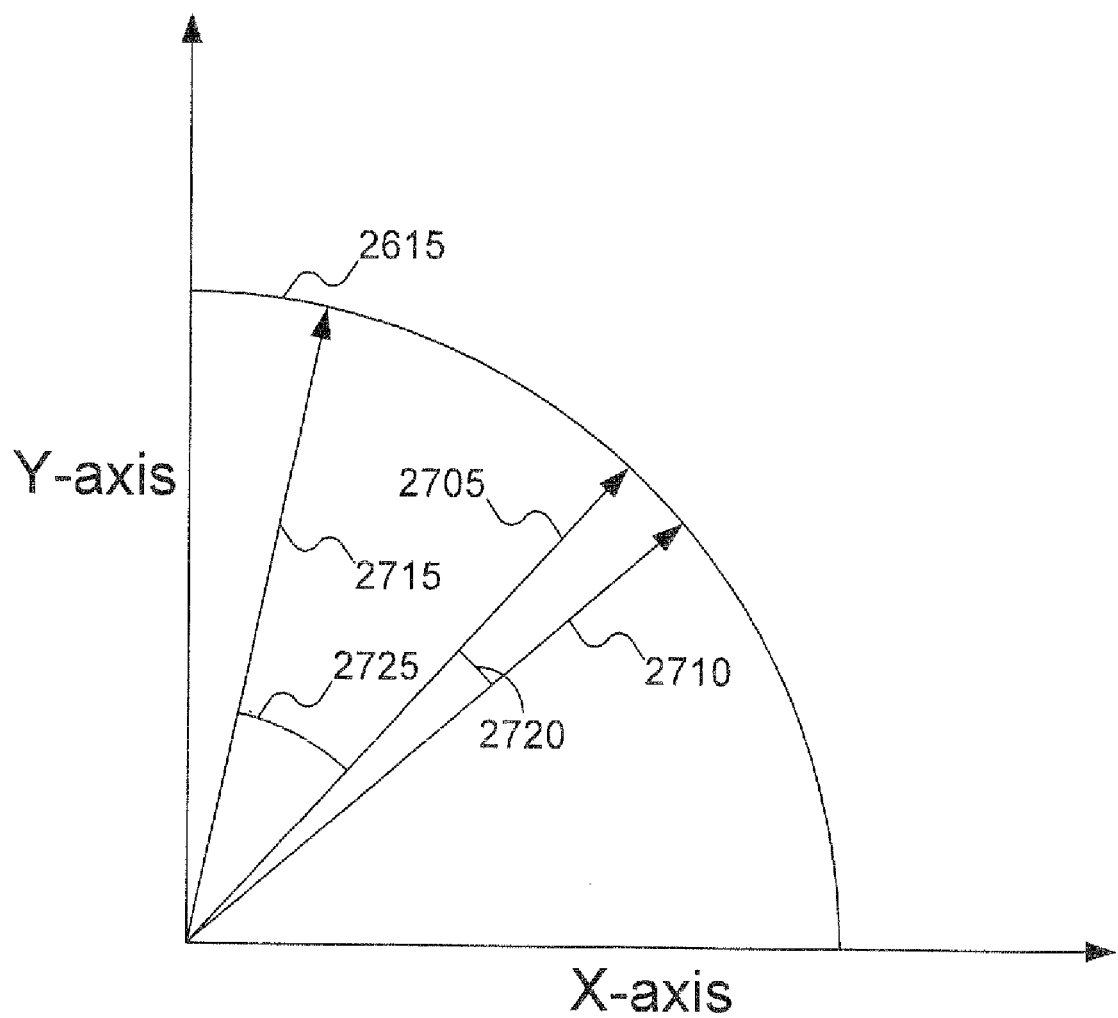
FIG. 27 shows a two-dimensional topological vector space in which semantic abstracts for three documents are compared.

FIG. 27 shows a two-dimensional topological vector space in which semantic abstracts for three documents are compared. In FIG. 27, three semantic abstracts represented as single state vectors 2705, 2710, and 2715 are shown. Semantic abstract 2705 (normalized from state vector 2610 in FIG. 26) is the semantic abstract for the known document; semantic abstracts 2710 and 2715 are semantic abstracts for documents that may be similar to the document associated with semantic abstract 2705. (Note that semantic abstracts 2710 and 2715 are also normalized.) Recall that distance can be measured as the angle between state vectors. The angle 2720 between semantic abstracts 2705 and 2710 is relatively small, suggesting the two documents have similar content. In contrast, the angle 2725 between semantic abstracts 2705 and 2715 is relatively large, suggesting the two documents have differing content.

Procedural Implementation

Figure 28:
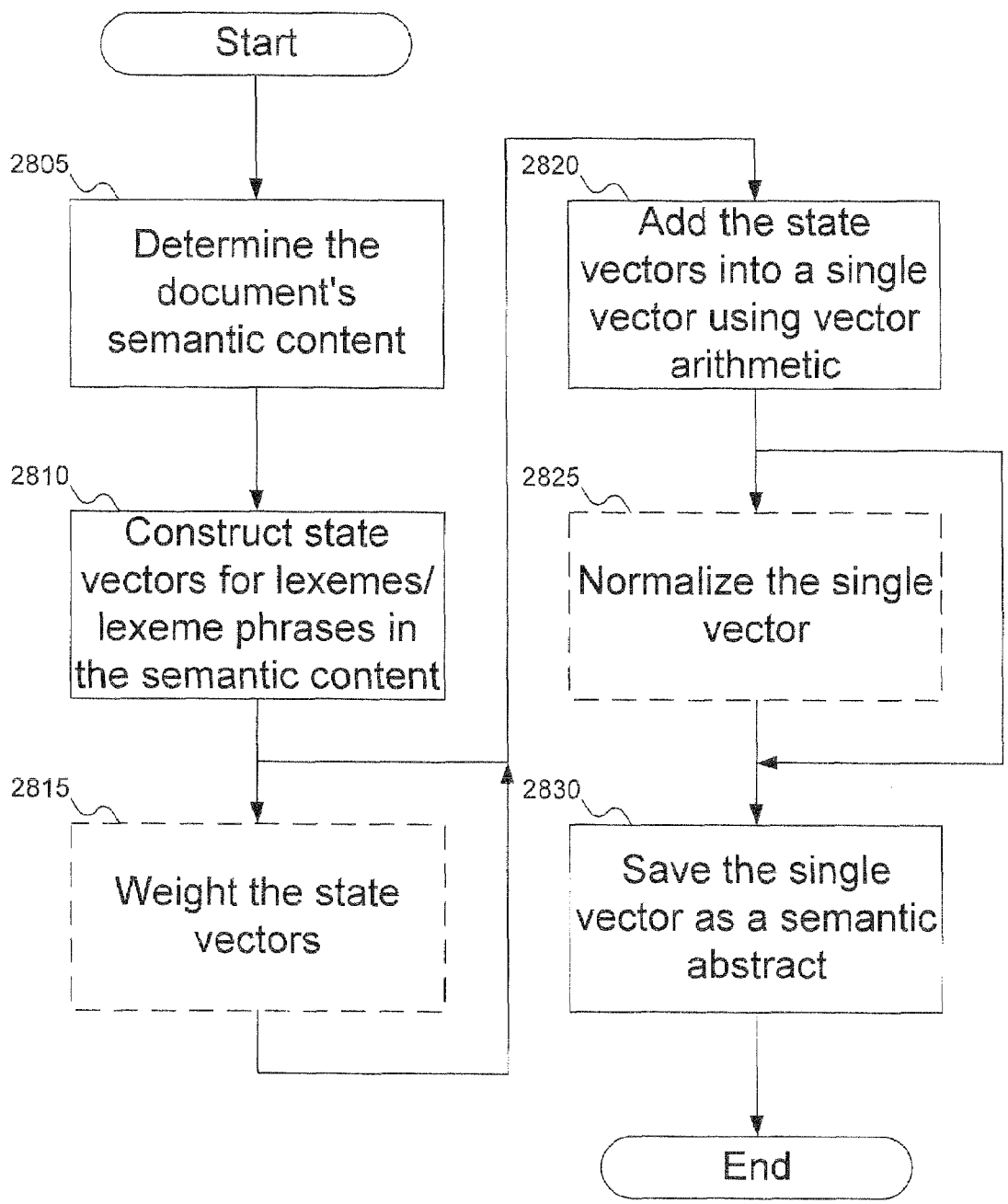
FIG. 28 is a flowchart of a method to construct a single vector semantic abstract for a document in the system of FIG. 24.

FIG. 28 is a flowchart of a method to determine a semantic abstract for a document in the system of FIG. 24. At step 2805, the document's semantic content is determined. The semantic content of the document can be determined by using dominant vectors or dominant phrase vectors, as described in the Semantic Abstract application. (As further described in the Semantic Abstract application, after the vectors are constructed, they can be filtered to reduce the number of vectors factored into constructing the single vector for the semantic abstract.) At step 2810, state vectors are constructed for each lexeme/lexeme phrase in the semantic content. At step 2815, the state vectors are weighted, for example by multiplying the vectors with scaling factors. At step 2820, the state vectors are superpositioned into a single vector using vector arithmetic. At step 2825, the single vector is normalized. Finally, at step 2830, the single vector is saved as the semantic abstract for the document. Note that steps 2815 and 2825 are both optional. For example, the state vectors do not have to be weighted. Weighting the state vectors makes possible minimizing the weight of lexemes that are part of the semantic content but less significant to the document. And normalizing the single vector, although highly recommended, is not required, since distance can be measured through angle.

The advantage of superpositioning the state vectors into a single vector is that the amount of storage required to store the semantic abstract. Whereas in the Semantic Abstract application, storing the semantic abstract requires storing several multi-dimensional state vectors, the invention only requires storing one multi-dimensional state vector. And, as shown above, because superpositioning state vectors does not lose information, storing the single state vector is as complete as storing the individual state vectors before superposition.

Figure 30:
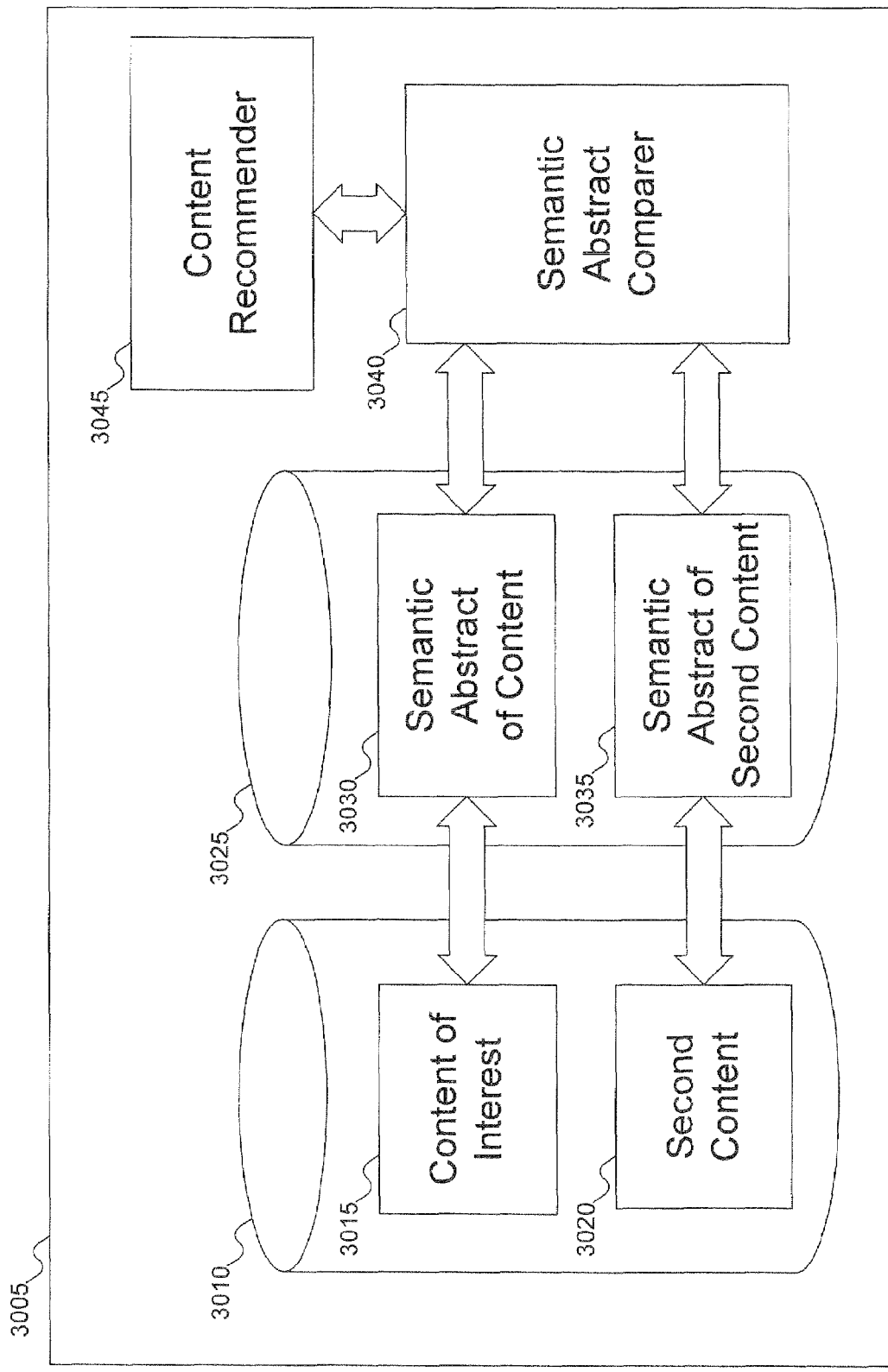
FIG. 30 shows a system configured to compare two semantic abstracts and recommend a second content that is semantically similar to a content of interest, according to an embodiment of the invention.

FIG. 30 shows a system configured to compare two semantic abstracts and recommend a second content that is semantically similar to a content of interest, according to an embodiment of the invention. Computer 3005 can be a personal computer, a notebook computer, a server, a set top box such as enhanced TV device 110, a handheld device, etc. Computer 3005 includes content library 3010 storing content of interest 3015 and content 3020. Content of interest 3015 and content 3020 can be audiovisual programs, such as television programs, audio programs, documents, or a combination of content, such web pages with embedded video content. Content of interest 3015 and content 3020 can be received over a television signal, via a computer network, or on a media such as a DVD, or CD.

For the purposes of this application, content of interest 3015 refers to any content in which the user is interested. In an embodiment of the invention, a television program viewed by a user, or a document downloaded over the Internet, can be determined to be "of interest" because the content is viewed by the user. In another embodiment of the invention, identification of filter words, as shown above in FIG. 4, can also identify content of interest 3015. In yet another embodiment of the invention, a user interface can be used for identification of content of interest 3015.

Computer 3005 also includes semantic abstract storage 3025. Semantic abstract storage 3025 stores semantic abstract 3030 and semantic abstract 3035. Semantic abstract 3030 is a semantic abstract of content of interest 3015 and semantic abstract 3035 is a semantic abstract of content 3020. Semantic abstracts 3030 and 3035 can be generated as discussed above. In an embodiment of the invention, semantic abstract storage 3025 provides a way to identify the content that a particular semantic abstract represents. For example, semantic abstract storage 3025 can be linked directly to the content it represents, or identifying information can be stored with a semantic abstract to indicate how to locate an associated content. By linking a semantic abstract with the content it represents, it is possible to compare semantic abstracts, and then locate the appropriate content if the semantic abstracts are within a threshold distance. Although FIG. 30 shows semantic abstract 3030 linked to content of interest 3015, in an embodiment of the invention, it is sufficient to know that semantic abstract 3030 is for a content of interest without linking the semantic abstract to the content of interest. In fact, it is even not necessary to store content of interest 3015, if its corresponding semantic abstract is identified as being for a content of interest. For example, semantic abstract storage 3025 can store semantic abstracts for content of interest, so that as new content becomes available, a semantic abstract can be generated for that new content, the content can be recommended to the user if the semantic abstracts are within a threshold distance.

In addition, computer 3005 includes semantic abstract comparer 3040 to compare two or more semantic abstracts, and content recommender 3045 to recommend content to a user. The above description of FIGS. 12 and 13 describes ways in which semantic abstract comparer 3040 can compare two semantic abstracts. For example, semantic abstract comparer 3040 can compare semantic abstracts 3030 and 3035 by measuring the Hausdorff distance between the semantic abstracts. Semantic abstract comparer 3040 can also compare semantic abstracts by measuring the angle between centroid vectors for the semantic abstracts.

Content recommender 3045 recommends content 3020 to the user if semantic abstract 3035 is "close" to semantic abstract 3030. If a distance can be measured between semantic abstracts 3030 and 3035, the contents can be considered "close" when the distance is within some threshold distance. The threshold distance determines how similar the semantic abstracts are to be in order to recommend a content to a user. Content recommender 3045 can present the content to the user (such as by loading the content in an Internet browser on the user's computer). Content recommender 3045 can also present a link to the uniform resource locator (URL) of the content in content library 3010 or on the Internet. Content recommender 3045 can also present a calendar entry or alert about the recommended content to notify the user of a future presentation of content 3020. Finally, although a single computer is shown in FIG. 30, in another embodiment of the invention the components of computer 3005 can be included on multiple computers connected to computer 3005. For example, a second computer can include storage for other content, such as homemade content, documents retrieved over the Internet, or content received via other media, such as a DVD, while semantic abstract storage 3025 resides on computer 3005. Or semantic abstract storage 3025 can be located other than in computer 3005. A person skilled in the art will recognize other ways to divide the components shown in computer 3005.

Figure 31:
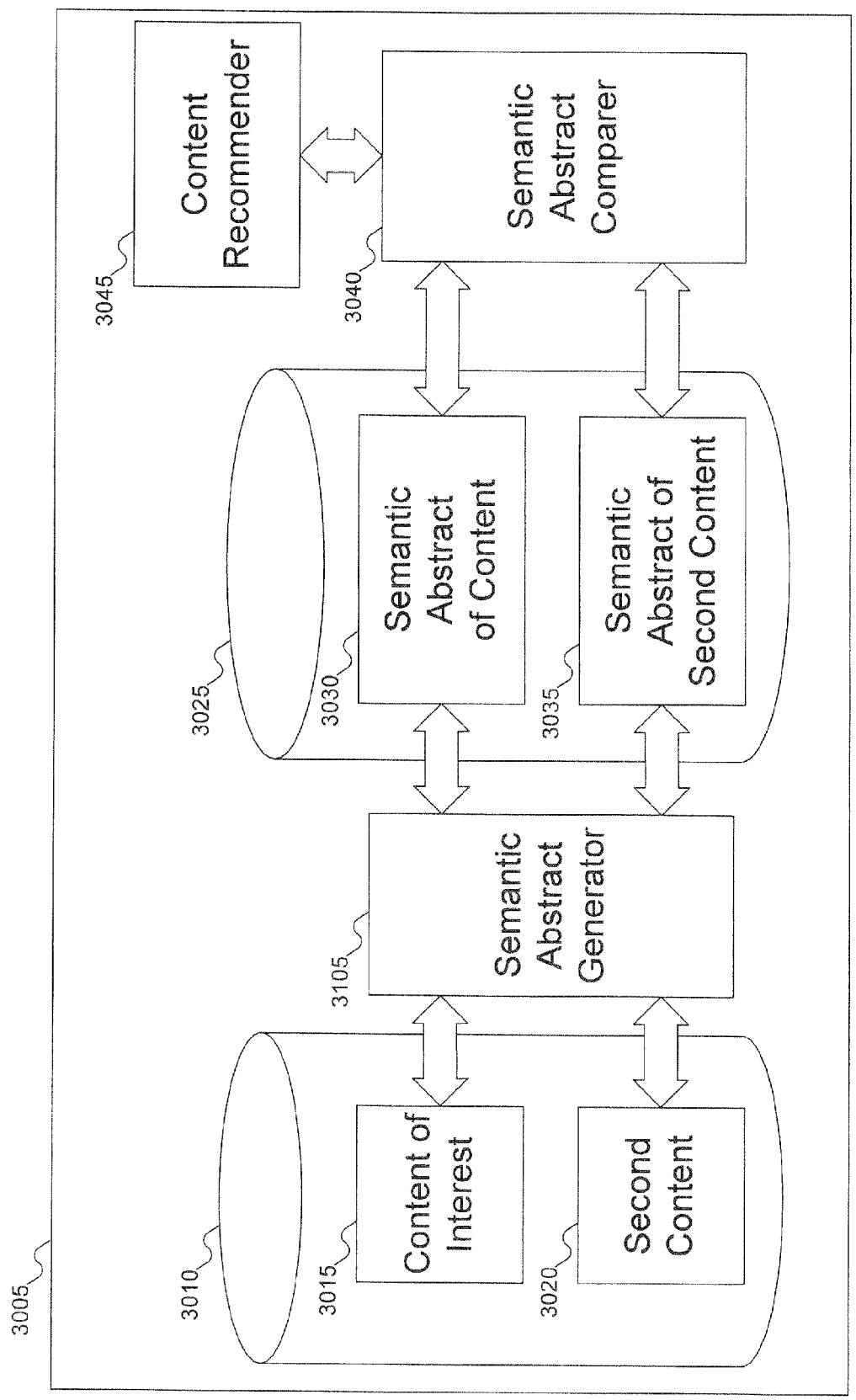
FIG. 31 shows the system of FIG. 30 with a semantic abstract generator to generate a semantic abstract for a particular content.

FIG. 31 shows the computer system of FIG. 30 with a semantic abstract generator to generate a semantic abstract for a particular content. In an embodiment of the invention, semantic abstract generator 3105 generates semantic abstracts 3030 and 3035 for content of interest 3015 and content 3020 stored in content storage 3010. Semantic abstract generator 3105 can then store the generated semantic abstracts in semantic abstract storage 3025. The above description of FIG. 11 describes how semantic abstract generator 3105 generates a semantic abstract for a document using state vectors. In addition, semantic abstract generator 3105 can use superpositioning as described above with reference to FIG. 24 to create a single vector semantic abstract.

Figure 32:
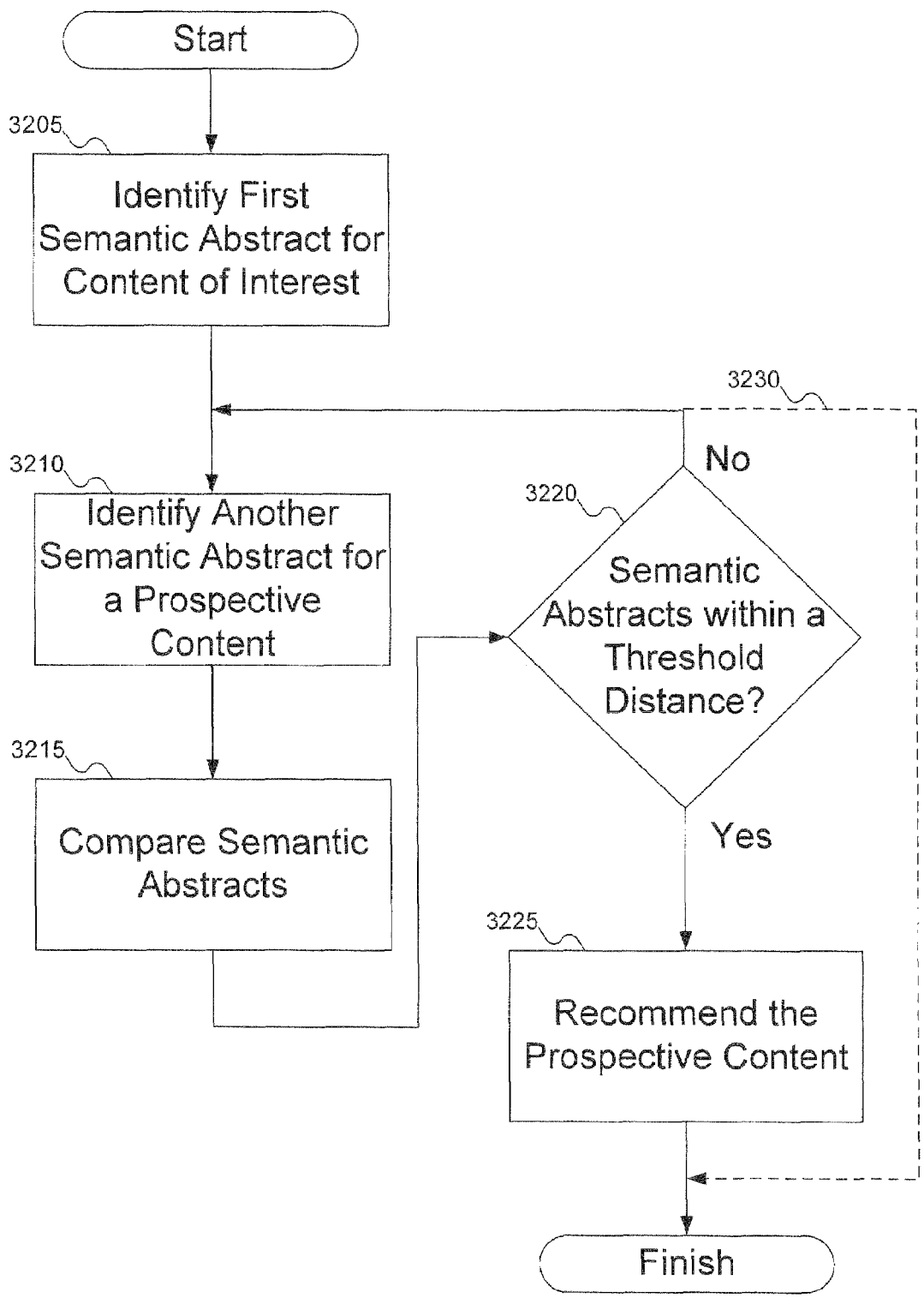
FIG. 32 shows a flowchart of the process comparing two semantic abstracts and recommending a second content that is semantically similar to a content of interest, according to an embodiment of the invention.

FIG. 32 shows a flowchart of the process comparing two semantic abstracts and recommending a second content that is semantically similar to a content of interest, according to an embodiment of the invention. At step 3205 the semantic abstract for the content of interest is identified. At step 3210, another semantic abstract representing a prospective content is identified. In either or both steps 3205 and 3210, identifying the semantic abstract can include generating the semantic abstracts from the content, if appropriate. At step 3215, the semantic abstracts are compared as described above with reference to FIGS. 12 and 13. Next, decision block 3220 determines if the semantic abstracts are "close": FIG. 32 uses a threshold distance to determine if the semantic abstracts are "close", but a person skilled in the art will recognize other ways in which two semantic abstracts can be "close". If the semantic abstracts are within the threshold distance, then at step 3225, the second content is recommended to the user on the basis of being semantically similar to the first content of interest. If the other semantic abstracts are not within a threshold distance of the first semantic abstract, then the process returns to step 3210, where yet another semantic abstract is identified for another prospective content. Alternatively, if no other content can be located that is "close" to the content of interest, processing can end as shown by arrow 3230.

In an embodiment of the invention, steps 3210 through steps 3225 are performed for multiple prospective contents at the same time. In this embodiment, all prospective contents corresponding to semantic abstracts within the threshold distance of the first semantic abstract can be recommended to the user. Alternatively, the content recommender can also recommend the prospective content with the semantic abstract nearest to the first semantic abstract.

Figure 33:
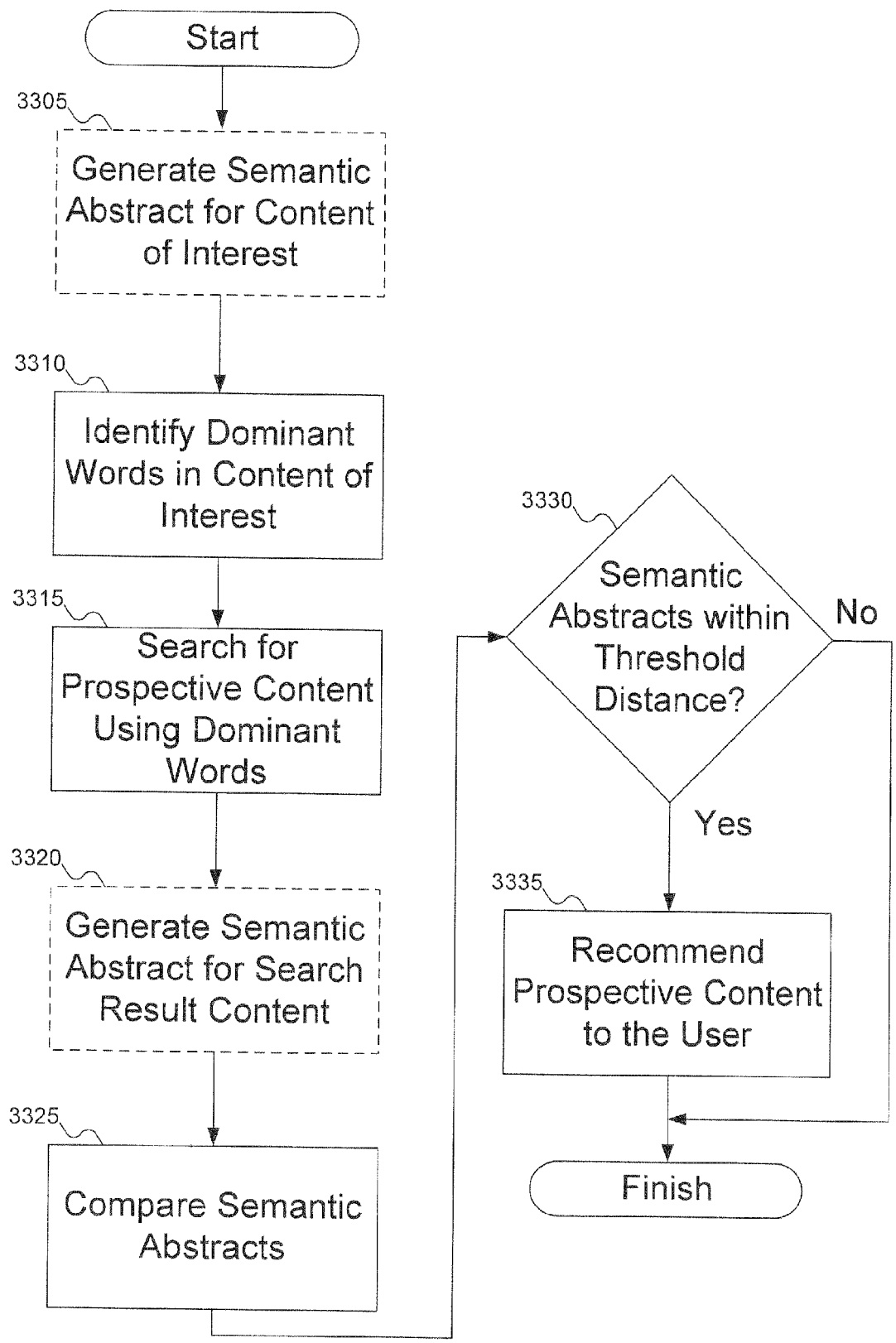
FIG. 33 shows a flowchart of the process of using a search engine to identify a second content, and using the comparison of the semantic abstracts to determine if the second content is semantically similar to the content of interest of FIG. 30.

FIG. 33 shows a flowchart of the process of using a search engine to identify a second content, and using the comparison of the semantic abstracts to determine if the second content is semantically similar to the content of interest of FIG. 30. At step 3305 a semantic abstract is generated for the content of interest. Note that this step is optional if the semantic abstract is provided along with the content of interest. Step 3305 can be performed at any time before step 3325, below.

At step 3310, dominant words are identified in the content of interest. The dominant words can be identified by looking at the title of the content of interest, a summary of the content of interest, frequency of use in the content, etc. In addition, any number of dominant words can be used, as appropriate for the content of interest. At step 3315, a search engine is used to search for prospective content using the dominant words identified in step 3310. The search engine can be any search engine. For example, the search engine can be a publicly available search engine used to search content on the Internet or a local desktop. The search engine can also be a custom search engine used to search content in a local content library.

At step 3320, a semantic abstract is generated for a search result content returned by the search engine. Just as step 3305 can be an optional step, the same is true of step 3320. If the search engine is capable of returning a semantic abstract with a link to the content, then it is not necessary to generate a semantic abstract. Similarly, if a local semantic abstract storage corresponds to a content library being searched, then step 3320 can be omitted.

Once there is a semantic abstract for the content of interest, as well as a semantic abstract for a prospective content, at step 3325 the semantic abstracts are compared. Note that step 3325 can be performed for any number of results from the search. The above description of FIG. 27 describes comparing multiple semantic abstracts. For example, if 300 documents are returned from the search query, semantic abstracts for the first ten results can be compared to the semantic abstract for the content of interest. Or if there are only three results for the search query, then it might make sense to compare the semantic abstracts of all three search results at the same time.

Decision block 3330 asks if any semantic abstracts are within a threshold distance of each other. If there is a semantic abstract that is within the threshold distance of the semantic abstract for the content of interest, then at step 3335, the content represented by the closest semantic abstract to the semantic abstract of the content of interest is selected and recommend to the user.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments and examples, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system to recommend content to a user, comprising:
    a computer;
    a content of interest to the user stored on the computer;
    a first semantic abstract representing the content of interest stored on the computer, the first semantic abstract including a first plurality of state vectors;
    a second semantic abstract representing a second content, the second semantic abstract including a second plurality of state vectors;
    a semantic abstract comparer to compare the first semantic abstract to the second semantic abstract; and
    a content recommender to recommend the second content if the first semantic abstract is within a threshold distance of the second semantic abstract, wherein:
a dictionary includes a directed set of concepts including a maximal element and directed links between pairs of concepts in the directed set, the directed links defining "is a" relationships between the concepts in the pairs of concepts, so that each concept is either a source or a sink of at least one directed link;
for each concept in the directed set other than the maximal element, at least one chain in the directed set includes a set of directed links between pairs of concepts connecting the maximal element and the concept;
a basis includes a subset of the chains; and
each state vector in the first semantic abstract and the second semantic abstract measures how concretely a concept is represented in each chain in the basis by identifying the smallest predecessor in the chain in relation to the concept.

2. A system according to claim 1, further comprising:
a content receiver to receive the content of interest;
a content presenter to present the content of interest to the user; and
a content of interest identifier to identify the content of interest after receiving a user request for the content of interest.

3. A system according to claim 1, further comprising:
a content monitor to monitor the content of interest;
a phrase extractor to extract phrases in the content of interest; and
a semantic abstract generator to generate the first semantic abstract for the content of interest using the phrases.

4. A system according to claim 3, wherein the semantic abstract generator includes:
a state vector constructor to construct state vectors in a topological vector space for each phrase extracted by the phrase extractor; and
a collector to collect the state vectors into the first semantic abstract for the content of interest.

5. A system according to claim 1, further comprising an interface to receive a level of interest for the content of interest.

6. A system according to claim 1, further comprising a content library to store at least one of the content of interest and the second content.

7. A system according to claim 6, wherein the content recommender includes a link to the second content.

8. A system according to claim 1, wherein the content recommender includes an alert to notify the user of a future presentation of the second content.

9. A system according to claim 1, further comprising a preferred semantic abstract storage to store the first semantic abstract for the content of interest.

10. A system according to claim 9, wherein the preferred semantic abstract storage includes a preferred semantic abstract storage for a community of users.

11. A method implemented in a computer, including a processor and a memory, for identifying and recommending content to a user, comprising:
identifying a first semantic abstract corresponding to a content of interest, the first semantic abstract including a first plurality of state vectors, wherein a dictionary includes a directed set of concepts including a maximal element and directed links between pairs of concepts in the directed set, the directed links defining "is a" relationships between the concepts in the pairs of concepts, so that each concept is either a source or a sink of at least one directed link, for each concept in the directed set other than the maximal element, at least one chain in the directed set includes a set of directed links between pairs of concepts connecting the maximal element and the concept, a basis includes a subset of the chains, and each state vector in the first semantic abstract measures how concretely a concept is represented in each chain in the basis by identifying the smallest predecessor in the basis chain in relation to the concept;
identifying a second semantic abstract corresponding to a second content, the second semantic abstract including a second plurality of state vectors, each state vector in the second semantic abstract measuring how concretely a concept is represented in each chain in the basis by identifying the smallest predecessor in the basis chain in relation to the concept;
measuring a distance between the first semantic abstract to the second semantic abstract; and
recommending the second content if the first semantic abstract is within a threshold distance of the second semantic abstract.

12. A method according to claim 11, further comprising:
receiving the content of interest;
identifying the content of interest after receiving a user request for the content of interest; and
presenting the content of interest.

13. A method according to claim 11, further comprising:
monitoring the content of interest;
extracting dominant phrases from the content of interest; and
generating the semantic abstract for the content of interest using the dominant phrases.

14. A method according to claim 13, wherein generating the semantic abstract for the content of interest includes:
identifying the directed set of concepts as the dictionary;
selecting the subset of the chains to form a basis for the dictionary;
measuring how concretely the dominant phrases are represented in each chain in the basis and the dictionary;
constructing at least one state vector in the topological vector space for each dominant phrase in using the measures of how concretely each dominant phrase is represented in each chain in the dictionary and the basis; and
collecting the state vectors into the semantic abstract for the content of interest.

15. A method according to claim 14, wherein measuring a distance includes measuring a Hausdorff distance between the first semantic abstract and the second semantic abstract.

16. A method according to claim 11, wherein identifying a second semantic abstract corresponding to a second content includes:
identifying dominant words in the first content; and
searching for the second content using the dominant words.

17. A method according to claim 16, further comprising:
generating the second semantic abstract for the second content; and
confirming the second content is similar to the content of interest if the first semantic abstract is within a threshold distance of the second semantic abstract.

18. A method according to claim 11, wherein identifying a first semantic abstract includes identifying the first semantic abstract in a semantic abstract storage.

19. A method according to claim 11, wherein recommending the second content includes presenting a link to the second content.

20. A method according to claim 11, wherein recommending the second content includes alerting the user about a future presentation of the second content.

21. An article, comprising a storage medium, said storage medium having stored thereon instructions, that, when executed by a machine, result in:
- identifying a first semantic abstract corresponding to a content of interest, the first semantic abstract including a first plurality of state vectors, wherein a dictionary includes a directed set of concepts including a maximal element and directed links between pairs of concepts in the directed set, the directed links defining "is a " relationships between the concepts in the pairs of concepts, so that each concept is either a source or a sink of at least one directed link, for each concept in the directed set other than the maximal element, at least one chain in the directed set includes a set of directed links between pairs of concepts connecting the maximal element and the concept, a basis includes a subset of the chains, and each state vector in the first semantic abstract measures how concretely a concept is represented in each chain in the basis by identifying the smallest predecessor in the basis chain in relation to the concept;
- identifying a second semantic abstract corresponding to a second content, the second semantic abstract including a second plurality of state vectors, each state vector in the second semantic abstract measuring how concretely a concept is represented in each chain in the basis;
- comparing the first semantic abstract to the second semantic abstract; and
- recommending the second content if the first semantic abstract is within a threshold distance of the second semantic abstract.

22. An article according to claim 21, further comprising:
- receiving the content of interest;
- identifying the content of interest after receiving a user request for the content of interest; and
- presenting the content of interest, 23. An article according to claim 21, further comprising:
- monitoring the content of interest;
- extracting dominant phrases from the content of interest; and
- generating the semantic abstract for the content of interest using the dominant phrases.

24. An article according to claim 23, wherein generating the semantic abstract for the content of interest includes:
- identifying the directed set of concepts as the dictionary;
- selecting the subset of the chains to form a basis for the dictionary;
- measuring how concretely the dominant phrases are represented in each chain in the basis and the dictionary;
- constructing at least one state vector in the topological vector space for each dominant phrase in using the measures of how concretely each dominant phrase is represented in each chain in the dictionary and the basis; and
- collecting the state vectors into the semantic abstract for the content of interest.

25. An article according to claim 24, wherein measuring a distance includes measuring a Hausdorff distance between the first semantic abstract and the second semantic abstract.

26. An article according to claim 21, wherein identifying a second semantic abstract corresponding to a second content includes:
- identifying dominant words in the first content; and
- searching for the second content using the dominant words.

27. A method according to claim 26, further comprising:
- generating the second semantic abstract for the second content; and
- confirming the second content is similar to the content of interest if the first semantic abstract is within a threshold distance of the second semantic abstract.

* * * * *

UNITED STATES PATENT AND TRADEMARK OFFICE
CERTIFICATE OF CORRECTION

PATENT NO. : 7,672,952 B2
APPLICATION NO. : 11/616154
DATED : March 2, 2010
INVENTOR(S) : Scott Isaacson et al.

It is certified that error appears in the above-identified patent and that said Letters Patent is hereby corrected as shown below:

Column 7, line 34, the word "31O" should read -- 310 --;
Column 9, line 47, the word "URL," should read -- URL --;
Column 9, line 60, the word "If" should read -- If, --;
Column 29, line 34, the word "construct" should read -- construct the --;
Column 30, line 35, the words "form a" should read -- form the --;
Column 31, line 35, the word "interest," should read -- interest. --;
Column 32, line 10, the words "form a" should read -- form the --.

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

PATENT NO.      : 7,672,952 B2
APPLICATION NO. : 11/616154
DATED           : March 2, 2010
INVENTOR(S)     : Scott A. Isaacson and Stephen R. Carter It is certified that error appears in the above-identified patent and that said Letters Patent is hereby corrected as shown below:

On the title page, Item (75) Inventors: the words "Scott Isaacson,...." should read
-- Scott A. Isaacson-- ;

In the Specification

On column 13, line 40, the words "$\varphi(s) = \langle g_1(s), g_2(s), g_3(s), g_k(s) \rangle$" should read -- $\varphi(s) = \langle g_1(s), g_2(s), g_3(s), \ldots, g_k(s) \rangle$ -- ;

On column 15, line 3, the expression "$u \in \mathbb{R}(S)$" should read -- $u \in \mathcal{H}(S)$ -- ;

On column 21, line 32, the equation "$(\alpha + \beta)v = \beta v + \beta v$" should read -- $(\alpha + \beta)v = \alpha v + \beta v$ -- ;

On column 22, line 13, the expression "(i.e., Hom(Q, R$\mathbb{R}$))" should read -- (i.e., Hom(Q, $\mathbb{R}$)) -- ;

On column 22, line 38, the expression "$(\lambda_i s_i + \lambda_j s_j)$" should read -- $(\lambda_i s_i + \lambda_j s_j)$ -- ;

On column 22, line 57, the equation "$\cap_k = s$," should read -- $\cap C_k = s$, --.

Signed and Sealed this
Third Day of September, 2013

Teresa Stanek Rea
*Acting Director of the United States Patent and Trademark Office*